US011519935B2

(12) United States Patent
Labuda et al.

(10) Patent No.: US 11,519,935 B2
(45) Date of Patent: Dec. 6, 2022

(54) ATOMIC FORCE MICROSCOPE

(71) Applicant: Oxford Instruments Asylum Research, Inc., Goleta, CA (US)

(72) Inventors: Aleks Labuda, Goleta, CA (US); Basile Pottier, Goleta, CA (US); Ludovic Bellon, Goleta, CA (US)

(73) Assignee: Oxford Instruments Asylum Research, Inc., Goleta, CA (US)

( * ) Notice: Subject to any disclaimer, the term of this patent is extended or adjusted under 35 U.S.C. 154(b) by 0 days.

(21) Appl. No.: 16/996,403

(22) Filed: Aug. 18, 2020

(65) Prior Publication Data

US 2022/0057429 A1   Feb. 24, 2022

(51) Int. Cl.
*G01Q 20/02* (2010.01)

(52) U.S. Cl.
CPC .................................. *G01Q 20/02* (2013.01)

(58) Field of Classification Search
CPC ........ G01Q 20/00; G01Q 20/02; G01Q 60/24; G02B 9/02
See application file for complete search history.

(56) References Cited

U.S. PATENT DOCUMENTS

| 5,315,373 | A |   | 5/1994  | Kubo et al. |             |
|-----------|---|---|---------|-------------|-------------|
| 5,324,935 | A | * | 6/1994  | Yasutake    | G01N 27/82  |
|           |   |   |         |             | 250/234     |
| 5,825,020 | A | * | 10/1998 | Hansma      | G01Q 20/02  |
|           |   |   |         |             | 250/234     |
| 6,020,963 | A |   | 2/2000  | DiMarzio    |             |
| 6,330,824 | B1| * | 12/2001 | Erie        | G01Q 10/045 |
|           |   |   |         |             | 850/37      |
| 7,224,463 | B1|   | 5/2007  | Zumberge et al. |         |
| 7,907,288 | B2|   | 3/2011  | Kawasaki et al. |         |
| 8,220,066 | B2|   | 7/2012  | Humphris    |             |

(Continued)

FOREIGN PATENT DOCUMENTS

| JP | 2012149928 A  * | 8/2012 |            |
|----|-----------------|--------|------------|
| WO | WO-2017136721 A1 * | 8/2017 | G01B 9/02001 |

OTHER PUBLICATIONS

Cunningham et al, "A Differential Interferometer for Scanning Force Microscopy", Meas. Sci. Technol. 5 (1994) 1350-1354 (Year: 1994).*

(Continued)

*Primary Examiner* — David E Smith
(74) *Attorney, Agent, or Firm* — Brooks, Cameron & Huebsch, PLLC

(57) ABSTRACT

An atomic force microscope ("AFM") based interferometer, uses a light source, and a splitting optical interface, splitting the light beam into a signal light beam and a reference light beam. Both the signal and reference light beams are focused in the vicinity of an AFM cantilever. A beam displacer introduces a lateral displacement between the signal light beam and reference light beam, the lateral displacement being such that, in at least one plane between the beam displacer and the focusing lens structure, the center of the signal light beam is separated from the center of the reference light beam by more than half a sum of their beam diameters on that plane. A detector operates to determine differences in optical path length between the signal light beam and reference light beam to determine information about movement of the cantilever.

54 Claims, 25 Drawing Sheets

(56) References Cited

U.S. PATENT DOCUMENTS

| | | |
|---|---|---|
| 8,294,980 B2 | 10/2012 | Wang et al. |
| 8,370,960 B2 | 2/2013 | Proksch et al. |
| 8,479,310 B2 | 7/2013 | Humphris |
| 8,528,110 B2 | 9/2013 | Humphris |
| 2002/0000511 A1* | 1/2002 | Schaffer ................. G01Q 70/06 250/216 |
| 2006/0087658 A1 | 4/2006 | Sesko et al. |
| 2008/0223117 A1* | 9/2008 | Watanabe .............. G01Q 60/34 73/105 |
| 2011/0167525 A1* | 7/2011 | Humphris .......... G01B 11/0608 850/33 |
| 2014/0317790 A1* | 10/2014 | Labuda ................. G01Q 20/02 850/6 |
| 2015/0285836 A1* | 10/2015 | Humphris .............. G01Q 70/06 850/1 |

OTHER PUBLICATIONS

U.S. Appl. No. 10/338,096, filed Jul. 2, 2019, Labuda et al.

\* cited by examiner

PRIOR ART

PRIOR ART

ATOMIC FORCE MICROSCOPE

BACKGROUND

Atomic force microscopes (AFMs) employ a microscopic cantilever to convert nanoscale forces between a sharp tip on the cantilever and a sample under study into a measured displacement of the tip. While numerous technologies exist for sensing the deflection of +the cantilever, most AFMs have adopted technologies that reflect a focused light beam off the back of the cantilever as these techniques provide high sensitivity, low noise, and ease of use. These optical methods will broadly be divided into two categories in this document: interferometric detection methods and variants of the optical beam deflection (OBD) method.

Thanks to its design simplicity, high sensitivity and good noise performance, most commercial AFMs have adopted the OBD method. In this method, the reflected light beam is directed towards a split photodetector that allows the measurement of the angular deflection of the cantilever. Using a four-quadrant photodetector allows the measurement of angular deflection in two dimensions, referred to as normal and lateral deflection. The lateral deflection is particularly of interest to researchers studying tribology.

However, the angular deflection of the cantilever measured by the OBD method is an indirect measure of the tip displacement. Consequently, numerous calibration methods have been devised to infer the tip displacement from the photodetector signals. Despite careful calibration of the measured cantilever angular deflection into a tip displacement, it may be difficult to reduce the calibration error below 10%. Since there is a lack of an easily accessible standard for many cantilever measurement modes, errors are often not apparent to the user. In this case, large and systematic errors may be present in the signal, yet the user may mistakenly believe that the OBD angular deflection signal represents the true cantilever tip displacement.

Another limitation of the OBD method is that optimal signal-to-noise ratio (SNR) is achieved when the light spot size is matched to the cantilever size. This makes it difficult to achieve optimal SNR with one instrument on a variety of cantilevers. For a given spot size, larger cantilevers will have higher noise. Furthermore, some cantilevers have a triangular shape with a hollow base such that the light spot must be limited in size and therefore provide suboptimal SNR.

On the other hand, interferometry is an alternative optical method that directly measures the displacement of the cantilever end, which is directly related to the displacement of its tip. This enables researchers to measure the quantity of interest—tip displacement—without the need for additional calibration methodologies that are time consuming and may be highly inaccurate. Since the calibration is based on the wavelength of light, the calibration errors can be reduced to below a few percent. Furthermore, interferometry can achieve better noise performance than OBD method because the light spot size does not need to be matched to the size of the cantilever to optimize SNR. In other words, the displacement of cantilevers of various shapes and sizes can be measured with high SNR using a small focused light spot.

Whereas there is no shortage of academic papers about designs of interferometric AFMs and their advantages, commercial AFMs have not widely adopted such technologies in the mainstream due to their complexity. Fiber-based interferometers have also been widely adopted by academic researchers; however, such interferometers lack the ease of use expected from commercial AFMs because of the painstaking positioning of the fiber near the cantilever and limited optical access.

Typical interferometers that enable high quality optical access to the measured target object, as well as ease of use, introduce a signal laser beam through an objective lens; meanwhile, the reference light beam is reflected off a reference object, such as a mirror, at some distance from the target object. Typically, the reference light beam does not exit the optical system of the interferometer. Such interferometers can be used to measure vibrations of the target object, but suffer from very poor stability at low frequencies, as the path of the signal light beam and reference light beam are very different and therefore subject to different thermal drift and vibrations. These artifacts are indistinguishable from the displacement of the target object. To reduce this problem, a whole class of differential interferometers have adopted a design principle where the signal light beam and reference light beam both traverse the objective lens. The signal light beam is focused on the target object, and the reference light beam is focused on a reference object that is near the target object. The difference between the positions of the target object and the reference object becomes the measured interferometric signal. Maintaining the signal and reference light beams in proximity to each other rejects most of the undesirable drift and vibrations of the instrument through the common-mode rejection principle known to those skilled in the art. Since such differential interferometer designs for AFM, in the prior art, are reliant on birefringent prisms located near the cantilever, they greatly hinder the optical quality of imaging through the objective lens, and consequently they may have poor ease of use. Alternatively, other prior art designs place birefringent prisms at the back focal plane of an imaging lens, thereby also preventing high quality optical access to the target object. Therefore, there is a tradeoff between high-performance differential interferometry in the context of AFM versus ease of use and high-quality optical access to the cantilever.

A clear difference between AFMs based on the OBD method and interferometric methods is the requirements of the light source. Interferometers used for AFM make use of high-coherence laser sources, such as a Helium-Neon (HeNe) laser or a laser diode, as the light source—thereby ensuring a high contrast interferometric signal. Also, the narrow spectral bandwidth of such laser sources prevents any loss in signal contrast that may be caused by the dispersion of the optical glasses used in the optical design. On the other hand, because OBD AFMs do not rely on the coherence of the light source, they may also employ either high-coherence laser sources, or they may instead employ low-coherence sources such as superluminescent diodes (SLDs). The benefits of using low-coherence sources include better long-term stability of the measurement and reduction of measurement artifacts caused by the undesirable interference of back-reflections, for example. For these reasons, it is known to anyone skilled in the art that superluminescent diodes are preferred for certain experiments using OBD AFMs where back-reflections may cause artifacts, while high-coherence lasers are required for interferometric AFMs.

On the other hand, SLDs may have higher noise relative to lasers, especially at high frequencies (U.S. Pat. No. 8,370,960B2). For this reason, some manufacturers of OBD AFMs offer the option to select from a SLD light source or a laser diode light source. Depending on the experiment that the OBD AFM will be used for, it may be more beneficial to take advantage of the lower noise of a laser diode, or the reduction in back-reflection artifacts of a SLD.

Unlike AFMs based on the OBD method, interferometric AFMs have seen a wide variety of different implementations throughout the years. The simplest implementation of an interferometer is the Michelson interferometer, invented in the 1880's. It remains the basis behind much of today's interferometric technology.

FIG. 1 depicts a simple design of a Michelson interferometer in the context of AFM. A laser 010 is coupled into a polarization-maintaining optical fiber 020 that ends with an optical fiber connector 030. The laser light diverges out of the fiber end. The source light beam 040 is collimated from the diverging light by a collimating lens 050. The diameter 060 of the collimated source light beam 040 is determined by the focal length of the collimating lens, along with the divergence of the light beam exiting the optical fiber 030. A polarizer 070 is used to ensure that the polarization is highly linear and orientated preferentially relative to the remainder of the optical system at an optimal angle to maximize the measurement sensitivity. Such a polarizer may be an absorptive film polarizer, a wire grid polarizer, a polarizing cube beamsplitter (as drawn), or any such optical component with a function to transmit or reflect a single linear state of polarization.

Alternatively, the optical fiber can be omitted, and the collimated light beam emitted directly from a free-space laser source, such as a Helium Neon laser or laser diode, can be used in place of a fiber-coupled laser.

The collimated light beam is split up into two light beams by a half-silvered mirror 080 or any equivalent optical beamsplitter. The two light beams will be referred to herein as the signal light beam 090 and the reference light beam 100. Note that some people refer to the "signal" light beam as the "measurement" light beam.

The signal light beam 090 that is reflected off the half-silvered mirror 080 is focused through a microscope objective lens 110 onto a microscopic cantilever 120 (the target object) which is tethered to a cantilever support chip 130 for handling purposes. The diameter 062 of the signal light beam 090 is shown to decrease as the light reaches the cantilever. A cantilever support chip is the macroscopic object that AFM user touches, typically with tweezers, in order to introduce the cantilever into the AFM and secure it by holding the cantilever support chip down using some clamping mechanism. The cantilever support chip is typically on the order of a few millimeters in length and width, and usually less than a millimeter thick. The focused signal light beam 090 reflects off the cantilever and returns through the objective. The objective lens collimates the signal light beam 090 and that beam then returns to the half-silvered mirror 080.

The reference light beam 100 that is transmitted through the half-silvered mirror 080 reaches a reference mirror 140. The reference mirror 140 can be moved by a displacement mechanism 150 that is either manual or automated to some degree. The reference light beam that is reflected off the reference mirror returns to the half-silvered mirror 080. Tip and tilt adjustment mechanisms may be required for the reference mirror 140 in order to ensure that the returning reference light beam 100 spatially overlaps with the signal light beam 090, as described next.

Both returning light beams are recombined at the half-silvered mirror 080. A portion of each beam is recombined into the recombined light beam 200 and directed towards a light photodetector 160. The remaining fraction of the returning light beams returns along the light path of the source light beam 040 towards the light source, because the law of conservation of energy requires that the total amount of light remains unchanged. The amount of light reaching the light photodetector 160 is a sinusoidal function of the difference in the optical path length traversed by the signal light beam 090 and the optical path length traversed by the reference light beam 100, and the periodicity of that sinusoidal function is $\lambda/2$ as determined by the wavelength $\lambda$ of the laser source. This is shown in FIG. 1b. Note that the optical path length of the signal light beam 090 includes the sum of the path lengths along the incoming part, before reflection from the cantilever, added to the sum of the path lengths along the returning part (after reflection from the cantilever). Similarly, the optical path length of the reference light beam 100 is the sum of the incoming and returning optical path lengths.

To optimize sensitivity, the displacement mechanism 150 attached to the reference mirror 140 is adjusted so that half the light returns to the source, and half the light reaches the light photodetector 160. This condition, herein referred to as a "centered interferometer", can be achieved by displacing the reference mirror 140 by at most $\lambda/4$. This mechanism is necessary because, when either all or none of the light reaches the light photodetector 160, the sensitivity goes to zero, such that no signal can then be detected. Also, the position of maximum sensitivity for the interferometer coincides with the position of maximum linearity, where the sinusoidal response function is locally linear. That is, the signal response to a change in cantilever displacement will be most linear if the interferometer is centered by appropriate positioning of the displacement mechanism 150.

More generally, the prior art teaches the advantages of having a means for tuning or modulating a phase difference between the signal light beam 090 and the reference light beam 100. While the displacement mechanism 150 is one way of achieving this, in other cases a liquid crystal device is used to tune or modulate a phase difference between two light beams. Note that to operate an interferometer in the "centered interferometer" condition, the means for tuning the phase difference must be maintained in the correct state. If the tuning means is an electrically activated mechanism such as a piezoelectric element or liquid crystal device, it must remain continuously activated or energized throughout the interferometric measurement. This may introduce noise and/or drift into the measurement.

By translating the displacement mechanism 150 through roughly one wavelength cycle, the sensitivity of the interferometer may be calibrated if the wavelength of the laser source is known. At that point, any change in power at the light photodetector 160 can be calibrated into an accurate displacement measurement of the cantilever tip, in units of meters.

The simple Michelson interferometer design depicted in FIG. 1 has a major drawback: half the light returns into the laser source which can cause lasing instabilities. Such instabilities result in optical power fluctuations that erroneously may resemble a cantilever displacement as measured by the light photodetector 160. A change in power is indistinguishable for a cantilever displacement for this design. To reduce lasing instabilities, a Faraday isolator 170 may be installed along the optical fiber as shown in FIG. 2. Alternatively, for a free-space laser, a free-space isolator may be used with similar benefits.

This interferometer arrangement does not allow for a viewing system with access to the cantilever. The alternative arrangement shown in FIG. 3 uses a beamsplitter 180 that is added between the clean-up polarizer 070 and the half-silvered mirror 080 of the design of FIG. 2. This creates visual access for a camera system 190 that can be used to create an image of the cantilever and focused laser spot seen through the microscope objective 110. The camera system 190 typically includes an image sensor, lenses to focus parallel light to the image sensor, a white light illumination system, and a beamsplitter to introduce the illumination light. These elements may be disposed in various ways, modified, or omitted, depending on the characteristics of the microscope objective 110 and the intended applications of the AFM. While allowing access for the camera system 190, the half-silvered mirror 080 also returns both the signal light beam 090 and reference light beam 100 towards the beamsplitter 180, which then reflects a portion of the light towards the light photodetector 160. Note that, in this case, the recombined light beam 200 that will be measured is returned along the source light beam 040 before being redirected to the light photodetector 160. As before, the optical power at the light photodetector 160 is a measure of the cantilever displacement and varies sinusoidally with respect to cantilever displacement. In a different arrangement, the positions of the light photodetector 160 and camera system 190 may be interchanged with similar functionality and performance.

The design of this interferometer has a dynamic range that is limited by the wavelength of light λ. The full range of motion of the cantilever displacement is λ/4. At either extreme of this range, the sensitivity goes to zero, and therefore the interferometer cannot measure cantilever displacement at these positions. In practice, the usable range of the interferometer is much smaller than λ/4, especially if high accuracy and low noise is desired and non-linearities are to be avoided.

The limited dynamic range of the interferometer can be overcome by quadrature detection, such as used in U.S. Pat. No. 6,020,963. Instead of monitoring the optical power in the path of the recombined light beam 200, the polarization state of the recombined light beam 200 is used to measure the optical path difference between the path of the signal light beam 090 and the path of reference light beam 100. Measuring the polarization state is more involved than simply measuring an optical power using a photodetector. This measurement scheme is employed by the design of FIG. 4.

Rather than splitting the source light beam 040 into two paths using a half-silvered mirror 080, the signal light beam 090 and reference light beam 100 in a quadrature interferometer are generated by splitting the source light beam 040 into two orthogonal polarization states using a polarizing beamsplitter 210. When both signal light beam 090 and reference light beam 100 are recombined into the recombined light beam 200, the optical power does not change as a function of cantilever displacement as it does in a Michelson interferometer. Rather, the polarization state changes between linear, elliptical and circular as a function of cantilever displacement. The degree of ellipticity of the light beam polarization state (of which linear and circular polarization are limiting cases) is directly related to the cantilever displacement. A portion of the recombined light beam 200 that is reflected by the polarizing beamsplitter 210 can be analyzed to determine the degree of ellipticity of its polarization by using a quadrature phase analyzer 220.

One possible configuration of a quadrature phase analyzer is shown in FIG. 4b. It involves splitting the light beam into two arms using a non-polarizing beamsplitter 230. Along one arm, referred to as the "in-phase" arm, the two polarization states are mixed using a half-wave retardation plate 240 with its birefringence extraordinary axis rotated to 22.5° with respect to the polarization axis of the signal light beam 090 or the polarization axis of the reference light beam 100. Next, a polarizing beamsplitter 250 is used to direct half of each of the signal light beam 090 and reference light beam 100 towards two photodetectors 260 and 262, such as in U.S. Pat. No. 6,020,963. Along the other arm, referred to as the "quadrature" arm, the two polarization states are mixed using a quarter-wave retardation plate 270 with its birefringence extraordinary axis rotated to 45° with respect to the polarization axis of the signal light beam 090 and polarization axis of the reference light beam 100. In this arm, a polarizing beamsplitter 280 is also used to direct half of each of the signal light beam 090 and reference light beam 100 towards two photodetectors 264 and 266.

The difference in optical power between the photodetector 260 and the photodetector 262 from the in-phase arm is calculated, and this difference is divided by the sum of both photodetector optical powers; this normalized difference becomes the in-phase signal I. Analogously, the quadrature signal Q is measured as well using both photodetectors 264 and 266 in the quadrature arm. Plotting Q versus I results in a Lissajous plot, as shown in FIG. 4c. In an ideal interferometer, the response is a unit circle 284. In that case, any optical path configuration between signal light beam 090 and reference light beam 100 at any instant in time results in a point on the unit circle, referred to as the phase state point 290. A vector 286 can be defined between the origin point of the Lissajous plot and the phase state point 290. The angle φ between this vector and the x-axis of the Lissajous plot can be calculated using the two-argument arctangent function, namely $$\varphi = \operatorname{atan2}(Q, I),$$

where $$\operatorname{atan2}(Q, I) \equiv \arctan\left(\frac{Q}{I}\right) + m\pi$$

and both the integer m and the branch of the arctangent function are chosen to give a result that is continuous over an interval of width 2π such as φ∈(−π, π]. This two-argument form of the arctangent function, a tan 2, is known to those skilled in computer programming; it appears in the FORTRAN language, the Perl language, and standard math libraries for Java, C, .NET, and Python.

As the cantilever is displaced by λ/2, the phase state point 290, as measured by the quadrature phase analyzer 220, goes around the Lissajous by one full circle. The angle φ is a direct measurement of the phase difference between the signal light beam and the reference light beam, and can be used to infer the cantilever displacement d by $$d = \frac{\lambda}{4\pi n}\varphi = \frac{\lambda}{4\pi n}\operatorname{atan2}(Q, I).$$

where n is the index of refraction of the medium surrounding the cantilever. In other words, the change in optical path length of the signal arm caused by a displacement of the cantilever results in a phase difference between the signal light beam and the reference light beam that is measured as a change in angle on the Lissajous plot. To avoid discontinuities in the displacement signal d, the output of the function a tan 2 should be unwrapped using methods known to those skilled in the art. This unwrapping is particularly important if the displacement signal will vary over a range greater than λ/2.

Due to imperfections of the optical components and the optical system assembly, the response to cantilever displacements measured by the quadrature phase analyzer 220 is generally an ellipse 282 on the Lissajous plot rather than an ideal unit circle 284. Simply assuming an ideal response results in cyclical error of the reconstructed displacement signal. To prevent cyclical error and ensure high accuracy measurement of the cantilever displacement, the measured response on the ellipse 282 can be corrected to infer the corresponding ideal-unit-circle 284 response of the system by the following calibration procedure. The model used for correcting deviations from ideal circular Lissajous is an elliptical Lissajous model, such as presented in Bellon et al., Opt. Commun. 207, 49-56 (2002). Measuring the five parameters that define the size, location, and angle of the ellipse involves modulating the optical path difference between the signal and reference arms (by displacing the cantilever deliberately, for example) and recording a Lissajous shape. Then, an elliptical function is fit using non-linear least-squares method to determine the most accurate parameters that describe the Lissajous shape. Subsequently, these recorded five parameters are used to interpret the photodetector responses as an accurate cantilever displacement. It may be necessary to perform this calibration procedure before every experiment since aligning the AFM may change one or more of these five parameters.

Generating this cantilever displacement signal from both the I and Q signals requires a non-linear calculation that can be performed using digital electronics, such as a field-programmable gate array (FPGA). The calculation must be performed at a frequency much higher than the cantilever displacement that is being measured in order to reconstruct an accurate cantilever displacement signal.

The primary advantage of the quadrature analyzer scheme is that the signal dynamic range can now exceed λ/4, while maintaining the low-noise performance irrespective of cantilever displacement—within some limit set by the optical system. Furthermore, the signal linearity does not depend on the starting condition of the interferometer, and the linearity is not limited to a displacement <<λ/4. In other words, the interferometer does not need to be "centered" as described earlier because any starting point in the optical path difference between paths of the signal light beam 090 and reference light beam 100 is equivalent and allows for high-linearity and low-noise measurements.

Many configurations of the quadrature phase analyzer 220 have been proposed. Some place the quarter-wave plate before the first beamsplitter (TaeBong Eom et al., Meas. Sci. Technol. 12, 1734 (2001)). Some omit the half-wave retardation plate by rotating the quadrature phase analyzer 220 mechanically by 45° around the optical axis of the light beam (Bellon et al., Opt. Commun. 207, 49-56 (2002)). Other use birefringent crystals instead of polarizing cube beamsplitters (Paolino et al., Rev. Sci. Instrum. 84, 095001 (2013)). Other designs only use a total of two photodetectors, one in each arm, to perform the polarization measurement (Weber et al., Rev. Sci. Instrum. 90, 083503 (2019)). More involved designs (US 2006/0087658A1) generate four phase-shifted signals (0°, 90°, 180°, 270°) that all pass through polarizers prior to reaching respective photodetectors with the goal of reducing common-mode errors at the expense of light lost at the polarizers. Each configuration has some trade-off between performance and manufacturing simplicity.

One disadvantage of the design in FIG. 4 is that it is not differential. Therefore, any mechanical motion, such as vibration or thermally-induced drift, in either arm (signal light beam 090 or reference light beam 100) can be erroneously perceived as a cantilever displacement. In addition, the longer the path lengths of the signal light beam 090 and reference light beam 100, the more prone the system becomes to these sources of error.

In prior art, several differential-interferometer configurations have been proposed to reduce the optical path difference between the paths of both polarization states by using birefringent materials close to the cantilever (Schonenberger et al., Rev. Sci. Instrum. 60, 3131 (1989)). This is shown in FIG. 5, where a calcite window 300 is placed close to the cantilever to split the source light beam 040 into two parallel beams with orthogonal polarization states. A disadvantage of this design is the presence of a fragile crystal, easily damaged by liquids, near the cantilever. Also, the camera view of the cantilever and sample has double vision due to the birefringence of calcite, since information from light with different polarizations is offset differently at the camera. Because the source light beam 040 is split into signal light beam 090 and reference light beam 100 near the cantilever, the polarizing beamsplitter 210 used in previous implementations is here replaced by a dichroic mirror 310. The benefits are that all the light coming from the laser is reflected towards the cantilever in the incoming path (prior to reflection from the cantilever) and also fully reflected on the returning path (after reflection from the cantilever), while allowing some light of different wavelengths to reach the camera system 190 for viewing. The diameter 064 of the reference light beam 100 converges in a manner similar to the diameter 062 of the signal light beam 090 because both light beams are focused through the same lens.

The signal light beam 090 travels toward the AFM cantilever, reflects from the cantilever, and then travels away from the cantilever along substantially the same signal light beam path. Where necessary to distinguish them, we refer to the signal light beam before reflection from the cantilever as the "incoming" signal light beam and the signal light beam after reflection from the cantilever as the "returning" light beam. Due to their spatial overlap they are not distinguishable in the figures, and are both designated 090 in the figures. Similarly, the reference light beam 100 is referred to as "incoming" before it reflects and "returning" after it reflects from the cantilever.

FIG. 6 shows a configuration where a split-angle birefringent prism 320 can be used to split both polarization states into two beams that can be focused at two different locations on the cantilever (den Boef et al., Rev. Sci. Instrum. 62, 88 (1991)). In this configuration, it is preferable to use a birefringent prism, such as used in U.S. Pat. No. 5,315,373 that creates two light beams with different angles, such as a Wollaston, Rochon, or Senarmont prism. For reasons explained below, in this design the microscope objective 110 shown in previous figures is replaced by an imaging lens 340. The geometry of the split-angle birefringent prism 320 can be tuned to create angular separation of both light beams that is specifically chosen for the imaging lens 340 in order to achieve a desired separation of the light beams at the cantilever. In order to ensure that both beams have the same incidence angle on the cantilever, the split-angle birefringent prism 320 must be located at the back focal plane 330 of the imaging lens 340.

Note that a microscope objective 110 cannot be used in this arrangement because the back focal plane 330 of the microscope objective 110 is physically located inside the microscope objective 110 and it would not be possible to place the birefringent prism 320 at the back focal plane 330. As such, the imaging lens 340 that must be employed instead is a lower quality lens, such as an achromatic doublet, singlet lens, or other simple imaging lens. Not only does the imaging lens 340 provide a lower quality image of the cantilever and its surrounding, but the split-angle birefringent prism 320 creates two images at the camera system 190 because it splits orthogonal polarizations into separate paths that have different angles.

In this scenario, the signal light beam 090 and the reference light beam 100 follow very similar paths alongside each other. The split-angle birefringent prism 320 geometry and optical properties are optimized in the design stage to create a prescribed separation distance between the signal light beam 090 and reference light beam 100 at the cantilever. In this design the ideal separation distance is slightly smaller than the length of the cantilever that is being measured. The signal light beam 090 is at the cantilever end (target object), while the reference light beam 100 is at the cantilever base (reference object). This allows measuring the displacement difference between these two locations, which changes as the cantilever deflects under sample forces.

It is clear from FIG. 6 that this design cannot readily accommodate cantilevers of various sizes. However, commercial cantilevers are available from roughly 10 µm to 500 µm in length, and in a variety of shapes. One solution is to adopt a beam separation that is larger than the cantilever length such that one beam is focused on the cantilever and the other is focused on the cantilever support chip (Paolino et al., Rev. Sci. Instrum. 84, 095001 (2013)). In the case of a 500 µm long cantilever, this would imply a separation greater than 500 µm, with the reference light beam 100 focused onto the cantilever support chip 130, which is the reference object in this context. However, the thickness of the cantilever support chip can be larger than the depth of field of the laser focused through the imaging lens 340, which leads to a reduced contrast or even total lack of signal. Therefore, it is beneficial to introduce a difference in the axial focus position of the two beams such that each beam can be focused on the surface that it reflects from. As proposed by Cunningham et al. in 1994 (Cunningham at al., Meas. Sci. Technol. 5(11), 1350 (1994)), a defocusing glass window 350 is added to the signal light beam, as shown in FIG. 7, so as to focus the signal light beam 090 onto the cantilever 120 and, simultaneously, the reference light beam 100 onto the cantilever support chip 130. In this arrangement, the deflection of both small and large cantilevers can be measured with the same optical system. Furthermore, the deflection of the cantilever 120 is measured with respect to the stationary cantilever support chip 130, and therefore the measurement does not depend on the separation distance between the signal light beam 090 and reference light beam 100.

Alternatively, Goto et al. have used a birefringent defocusing lens to slightly defocus one of the polarizations in the source light beam 040 in order to change the relative focus of the signal light beam 090 and reference light beam 100 at the cantilever (Goto et al., Rev. Sci. Instrum. 66, 3182 (1995)). A birefringent lens is necessary because both signal light beam 090 and reference light beam 100 are both spatially substantially overlapping, such that standard optics cannot be used on one of those light beams without affecting the other.

Note that the diameter 060 of the source light beam 040 in combination with the focal length of the microscope objective 110 or imaging lens 340 determines the divergence of the focused light beam at the cantilever, the light spot diameter, and the depth of field of the focused light beam. For straight cantilevers that are not curved due to residual or thermally-induced internal stress, a wide range of diameters of the source light beam 040 would result in high contrast signals. That is because the light beams will overlap substantially after reflection off the cantilever 120 and chip 130 and recombination into the recombined light beam 200. Conversely, for curved cantilevers as illustrated in FIG. 7b, the reflected signal light beam 090 will return along a path slightly different from the incoming signal light beam 090 path. Consequently, the signal light beam 090 and reference light beam 100 will only partially overlap when recombined into the recombined light beam 200. This leads to a reduced interferometric contrast, lower signal, and higher measurement noise. However, increasing the diameter of the source light beam 040 ensures more overlap between reference light beam 100 and signal light beam 090 in the recombined light beam 200 leading to a higher signal, and consequently lower noise. In conclusion, choosing a larger diameter of the source light beam 040 makes the system more tolerant to undesirable cantilever curvature.

On the other hand, increasing the diameter of the source light beam 040 results in a decreased depth of field, which makes the system less tolerant to cantilever support chip thickness variability. Errors in in chip thickness, as illustrated in FIG. 7b, may arise due to differences in substrates and micromachining processes used to fabricate the cantilever. The consequence of chip thickness errors is that the returning signal light beam 090 and reference light beam 100 will be defocused with respect to each other when they are recombined into the recombined light beam 200. This leads to a reduced interferometric contrast, lower signal, and higher measurement noise. However, for a given error in cantilever support chip thickness with respect to the design thickness, a smaller beam diameter will lead to a smaller loss of contrast, higher signal, and lower measurement noise. In conclusion, there is a trade-off when choosing the source light beam 040 diameter: a smaller diameter 060 of the source light beam 040 results in more tolerance to chip thickness error but less tolerance to cantilever curvature, and vice versa.

Similarly, a larger beam diameter 060 of the source light beam 040 leads to less tolerance for chip tilt errors. Chip tilt errors, as illustrated in FIG. 7b, can arise due to machining tolerances of the chip holder, for example. Any error in the chip tilt causes a relative defocus between the signal light beam 090 and reference light beam 100 since the two beams are separated by some distance. For any given amount of chip tilt error, the relative defocus between the returning light beams will be larger for larger light beam diameters. In other words, a smaller beam diameter 060 of the source light beam 040 results in more tolerance to chip tilt errors, and vice versa. An appropriate beam diameter 060 of the source light beam 040 must be chosen to compromise between cantilever curvature, errors in chip thickness, and chip tilt. In the prior art, the ability to make these design choices was limited, and therefore it was difficult to customize the characteristics of the interferometer to the desired applications of atomic force microscopy.

SUMMARY OF THE INVENTION

This invention relates to an atomic force microscope that uses differential interferometry for direct displacement measurements of cantilever deflection caused by forces between the cantilever tip and a sample under study. The differential interferometer works by splitting the collimated light from a fiber-coupled light source into two arms with orthogonal polarization states using a lateral displacement beamsplitter; the signal arm light beam is focused through an objective lens onto the cantilever and the reference arm light beam is focused onto the cantilever support chip through the same objective lens. A key feature of this invention is the complete spatial separation of the signal and reference light beams prior to focusing those light beams through the objective lens. This geometry allows the separate manipulation of these light beams using standard optics, as opposed to birefringent optics. An optical wedge is used to impart an angular deviation onto the reference arm light beam such that it targets the cantilever support chip rather than the cantilever. The same wedge is appropriately positioned to ensure that the signal and reference light beams intersect at the back focal plane of the objective lens. An optical lens is used in the reference arm to defocus the light beam with respect to the signal arm such that it is well focused on the cantilever support chip of specified thickness and tilt angle. After reflection, both light beams are collimated and recombined by the same optical system that delivered the light beams. Thanks to a quarter-wave plate that both the signal and reference light beams traverse twice, the recombined light is redirected by the lateral displacement beamsplitter towards a quadrature phase analyzer instead of returning to the light source. This quadrature phase analyzer measures the optical path length difference between the reference and signal light beams using a quadrature detection optical scheme that distributes the light onto four photodetectors using polarization optics. The interferometer is calibrated by modulating a liquid crystal device and observing the response. Subsequently, digital electronics reconstruct a cantilever displacement signal from the four photodetector signals based on the calibration and the known wavelength of the light source.

The aforementioned light source may be a laser or preferably may be a low-coherence light source, such as a superluminescent diode. Due to the low coherence of such a source, a compensation window is used to match the optical group path length between the signal and reference light beam paths. Furthermore, the aforementioned wedge can be mechanically actuated to change the optical group path length very precisely between both light beam paths to maximize the interferometric contrast prior to each experiment. Additionally, switchable lenses, each with a specific focal length, thicknesses and material, allow to reconfigure both the focus and optical group path length of the reference arm so as to accommodate different types of cantilevers of various thicknesses. Also, additional optics can be inserted or removed from the optical system to compensate for changes in focus and optical group path length caused by the introduction of different fluids around the cantilever, such as water.

Additionally, a beamsplitter is used to pick off part of the light beam returning from the cantilever and redirect this partial light beam towards a four-quadrant photodetector. This allows the measurement of the angular deflection of the cantilever in two dimensions using the optical beam deflection method, also known as the optical lever method. This additional measurement occurs simultaneously to the interferometric displacement measurement obtained from the quadrature detection.

BRIEF DESCRIPTION OF THE DRAWINGS

FIG. 7B shows error sources in cantilever and chip;
FIG. 11b shows how an off-axis lens can be manufactured from a standard lens by grinding away some fraction of it;
FIG. 12B shows the lateral displacement beamsplitter using a triangular prism;
FIG. 16b shows the paths of the incoming signal light beam and incoming reference light beam;
FIG. 16c shows the paths of the returning signal light beam and returning reference light beam.

DETAILED DESCRIPTION

Figure 1:
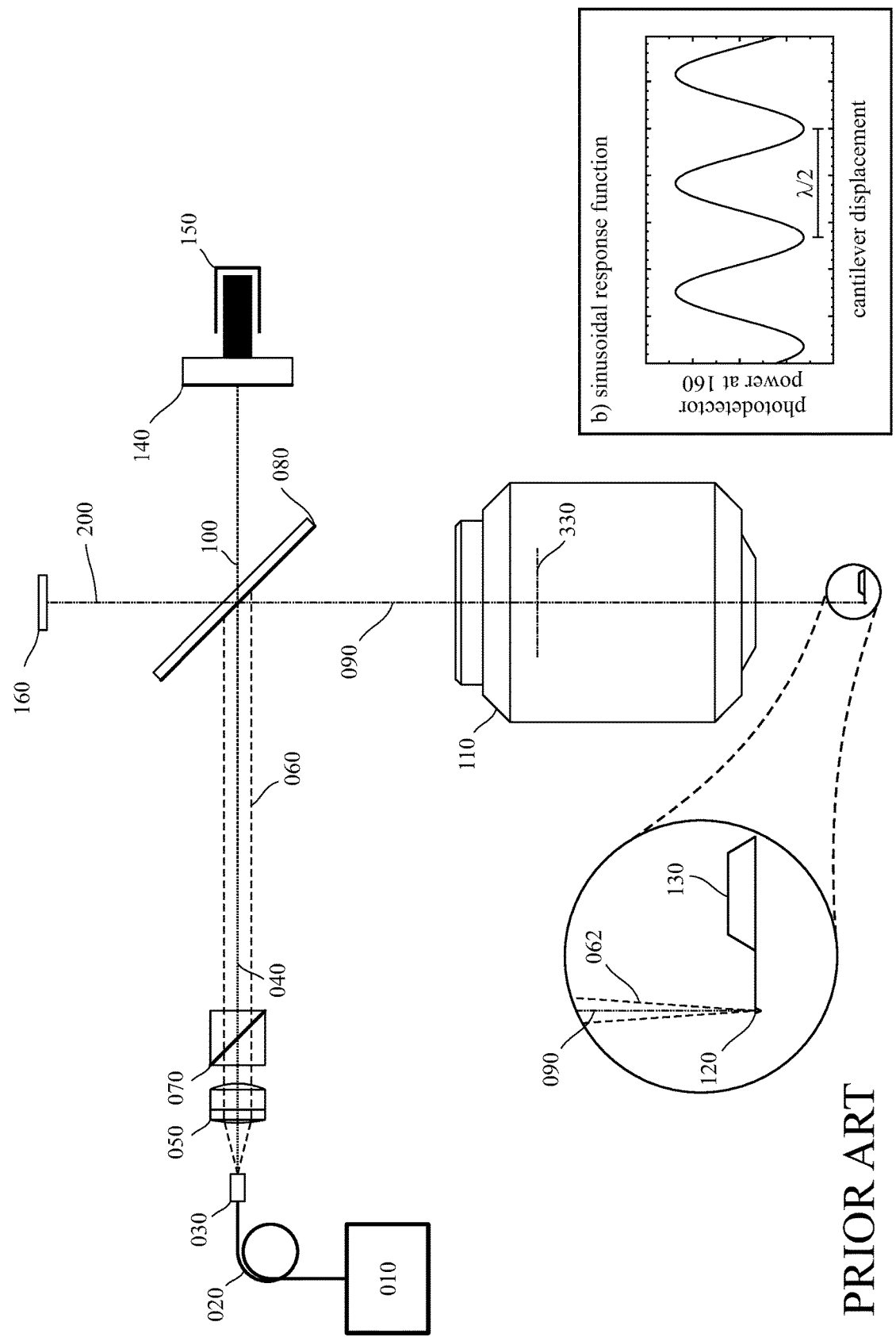
FIG. 1 depicts a simple design of a Michelson interferometer in the context of AFM.
Figure 2:
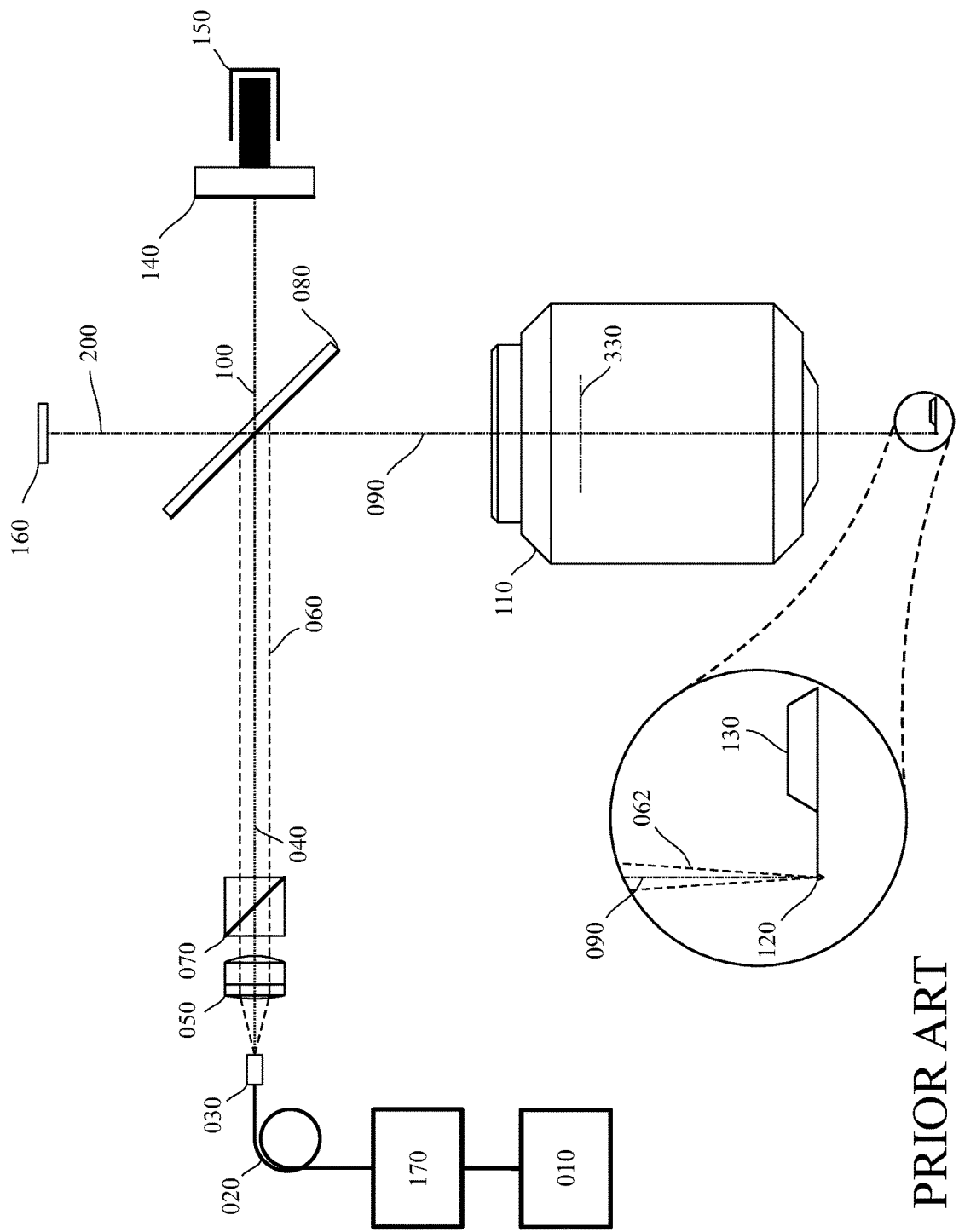
FIG. 2 shows a Michelson interferometer, where a Faraday isolator is added.
Figure 3:
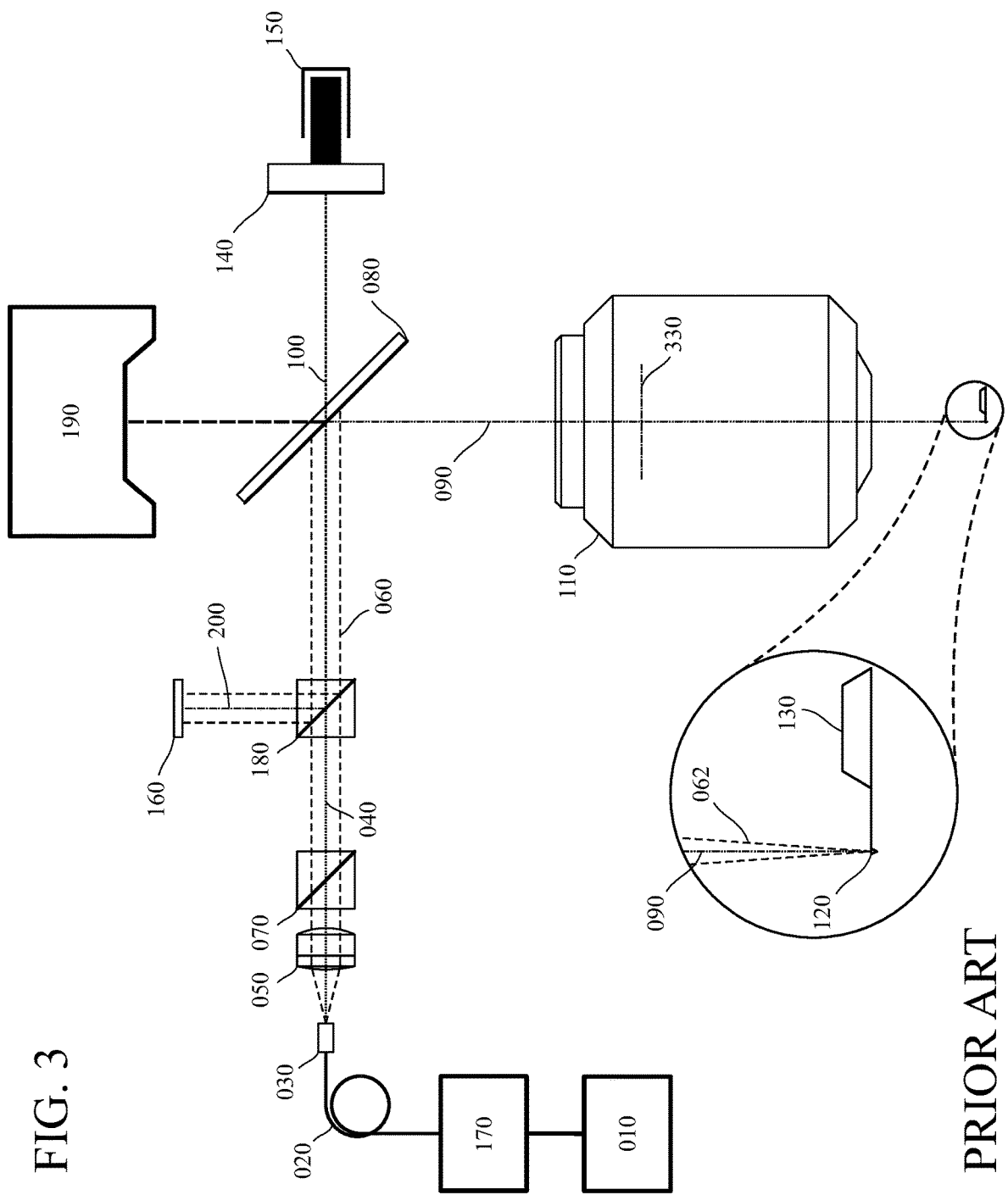
FIG. 3 shows a Michelson interferometer using a beamsplitter.
Figure 4:
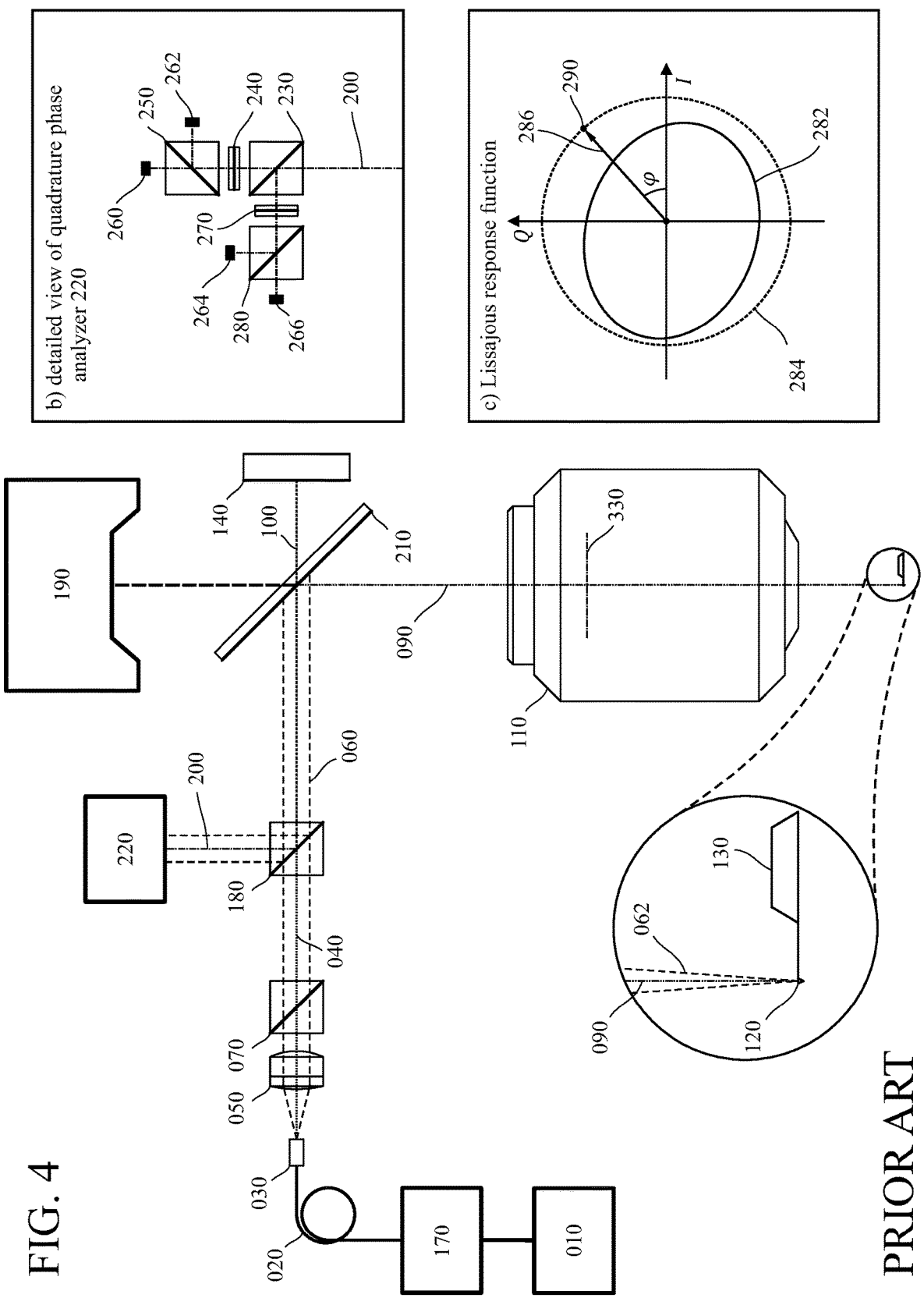
FIG. 4 shows a Michelson interferometer that measures polarization state.
Figure 5:
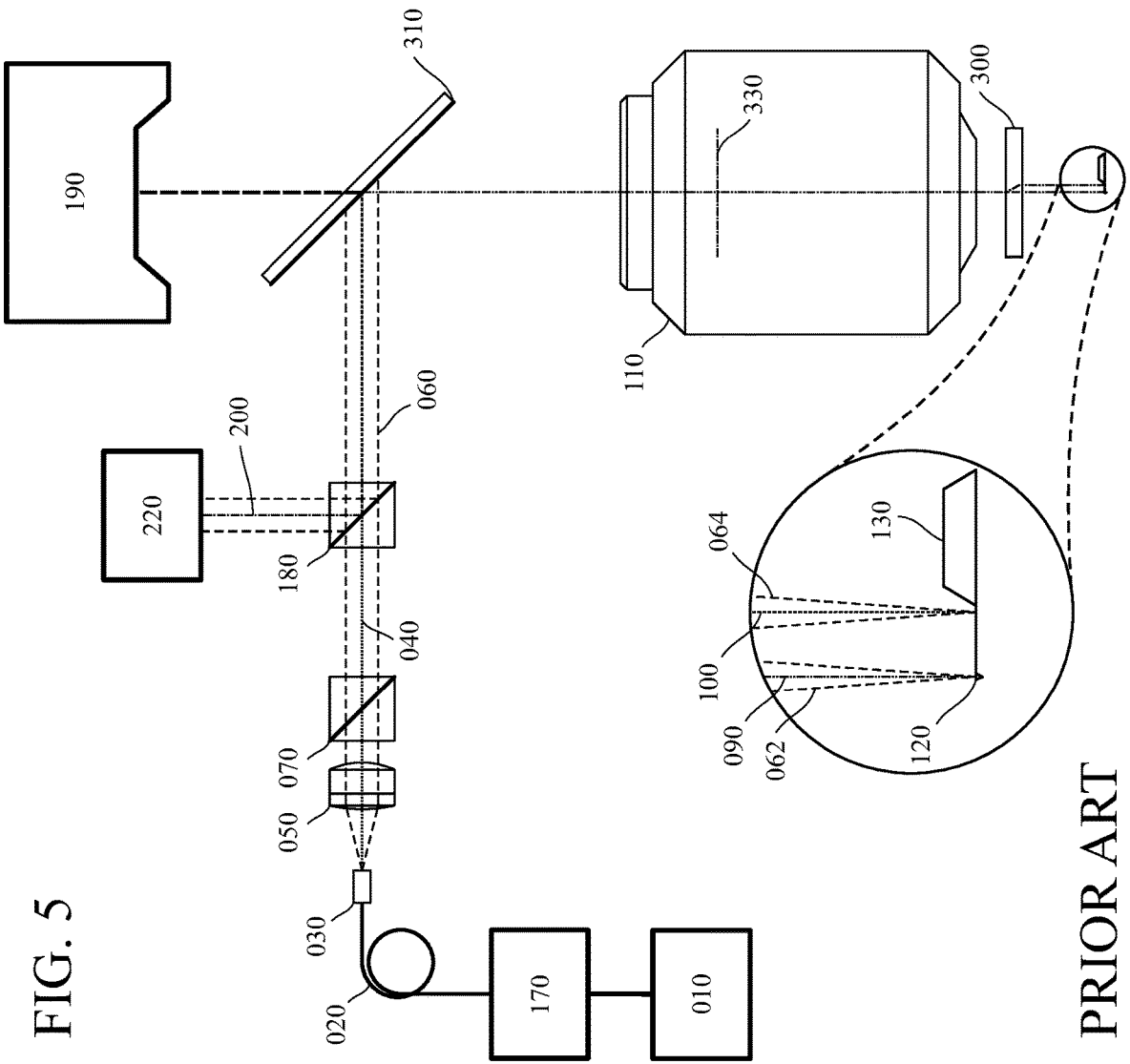
FIG. 5 shows a differential-interferometer configuration to reduce the optical path difference between the paths of both polarization states by using birefringent materials close to the cantilever.
Figure 6:
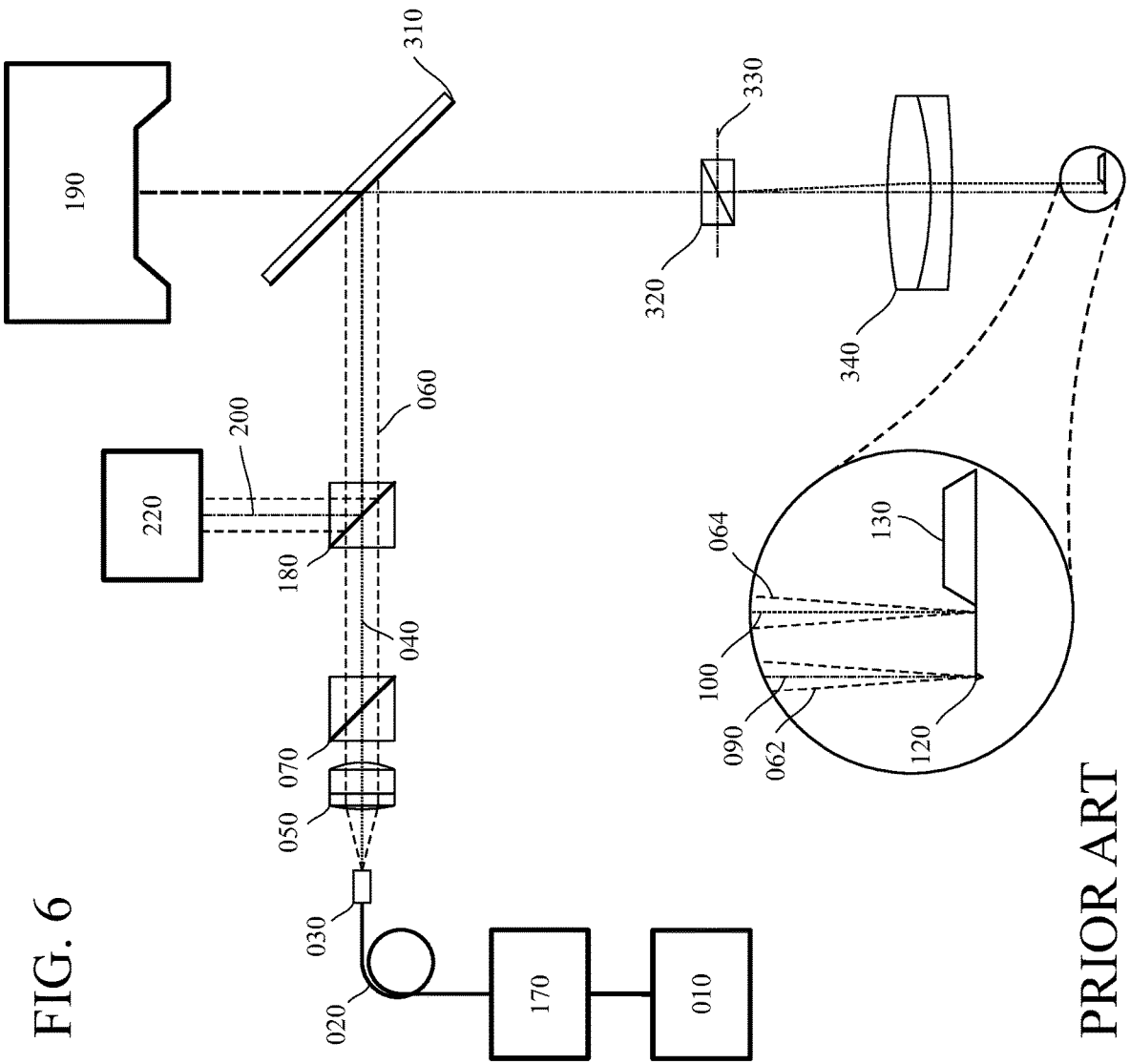
FIG. 6 shows a configuration using a split-angle birefringent prism.
Figure 7:
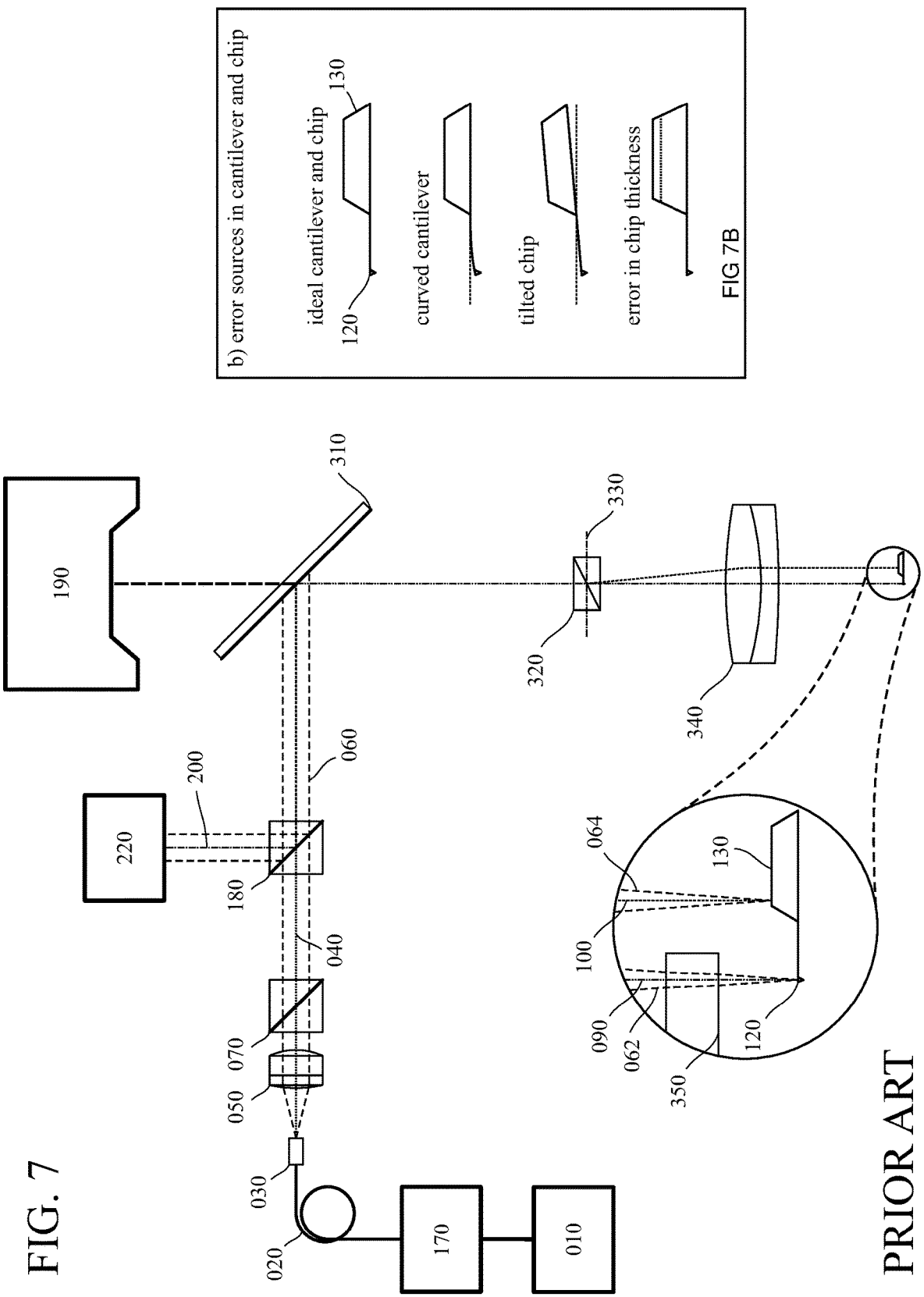
FIG. 7 shows a defocusing glass window added to the signal light beam.
Figure 8:
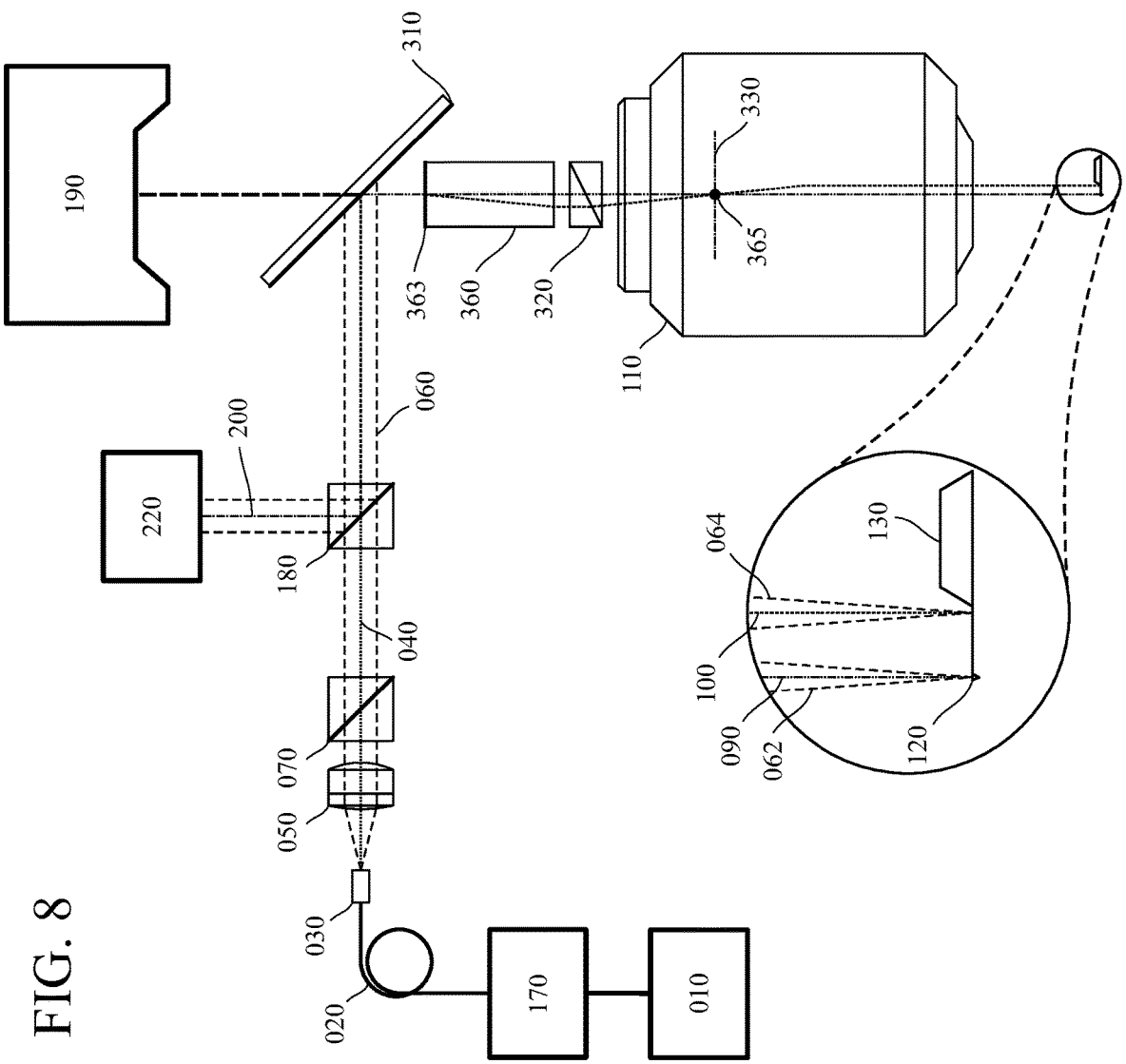
FIG. 8 depicts a novel arrangement of a differential interferometer.

FIG. 8 depicts a novel arrangement of a differential interferometer and is the first embodiment of the present invention. In this embodiment, the introduction of a birefringent lateral beam displacer 360 in conjunction with a split-angle birefringent prism 320 allows the signal light beam 090 and reference light beam 100 to intersect at a point outside both prisms. Note that the source light beam 040 refracts and splits at the birefringent interface 363, creating the signal light beam 090 and reference light beam 100. The birefringent lateral beam displacer 360 introduces a lateral displacement between the signal light beam 090 and reference light beam 100, while the split-angle birefringent prism 320 introduces an angular deviation to the reference light beam 100 with respect to the signal light beam 090.

A lateral displacement between two light beams is defined as a translation of the axis of propagation of either light beam, relative to the axis of the other light beam, in a direction substantially perpendicular to either axis. That direction may be called the transverse direction. Commonly, a lateral displacement is introduced via refraction and/or reflection of one or both beams. As defined here, a lateral displacement does not generally refer to the changes in distance between two non-parallel propagating light beams that are caused simply because they are non-parallel.

The embodiment shown in FIG. 8 of the present invention allows the point of intersection 365 of the signal light beam 090 with the reference light beam 100 to be positioned outside both the birefringent lateral beam displacer 360 and the split-angle birefringent prism 320. This point of intersection 365 can then be positioned inside a microscope objective 110, such as the microscope objective 110 used in previous arrangements. This is convenient since it is optimal to position the point of intersection 365 at the back focal plane 330 of the microscope objective 110 to ensure that the light beams are orthogonal to both the cantilever and chip upon reflection. Other embodiments using different arrangements of birefringent prisms are possible to achieve the same effect. For instance, two split-angle birefringent prisms 320 or a specially designed single split-angle birefringent prism 320 may be used to generate a point of intersection 365 in an arbitrary location in space, such as the back focal plane 330 of the microscope objective 110.

Figure 9:
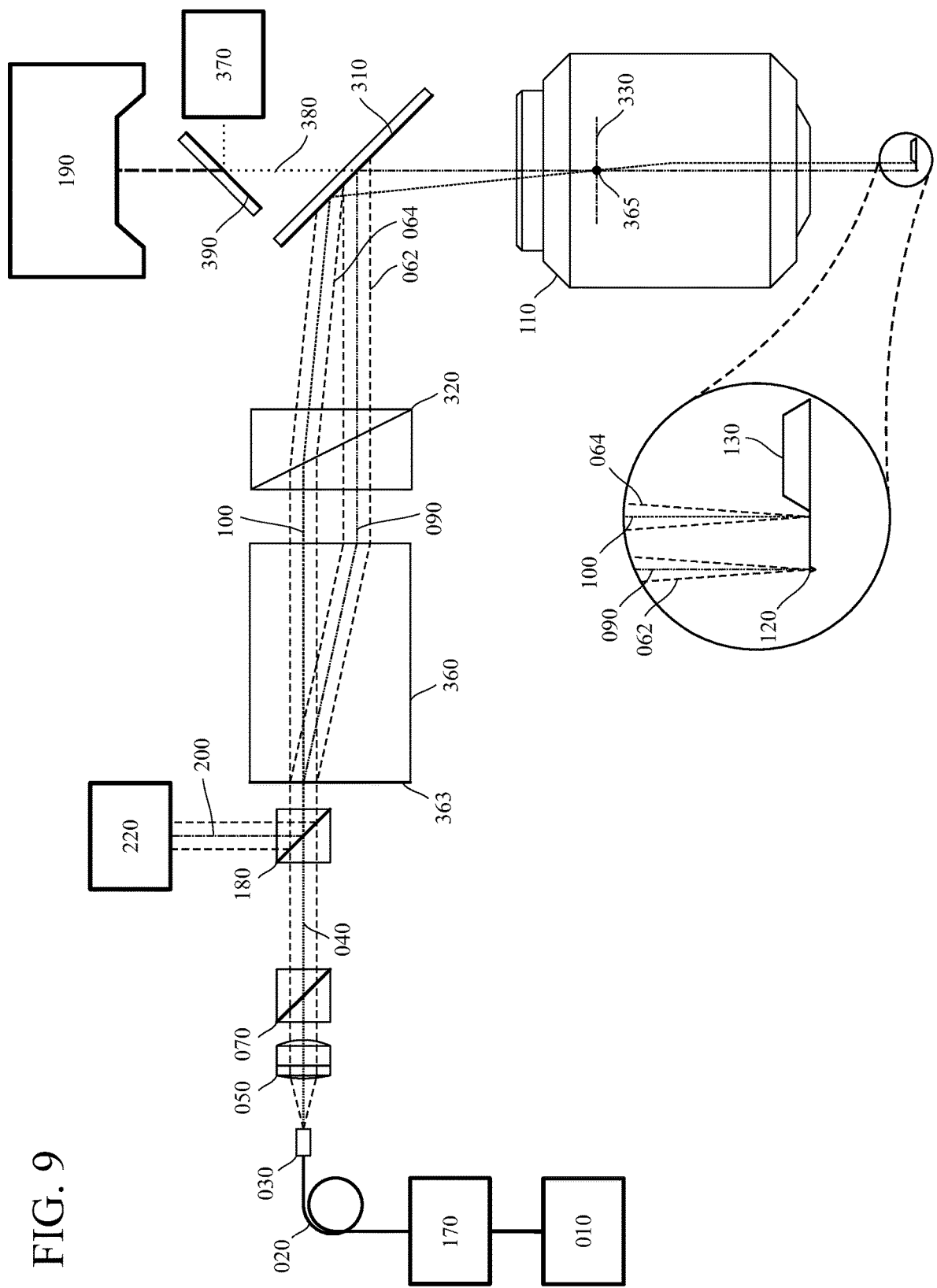
FIG. 9 shows moving the prism pair outside of the path between the microscope objective and the camera system.

Moving the prism pair outside of the path between the microscope objective 110 and the camera system 190 creates another embodiment of the present invention, as shown in FIG. 9. The source light beam 040 is separated into the signal light beam 090 and reference light beam 100 prior to reflection from the dichroic mirror 310.

This allows higher quality imaging of the cantilever as seen by the camera system 190. In addition, the optical access allows for additional optical beam positioning units 370, such as described in patent Ser. No. 13/999,614 and Labuda et al., Appl. Phys. Lett. 106, 253103 (2015), to be introduced into the optical system using an auxiliary dichroic mirror 390. The auxiliary dichroic mirror 390 may be any type of beamsplitting optic, but preferably reflecting a specific wavelength range of interest while transmitting other wavelengths. This allows one or more auxiliary light beams 380 (only one shown in FIG. 9) to be introduced into the optical system with functions such as photothermal excitation of the cantilever, localized thermal probing, photovoltaic excitation of the sample, vibrational spectroscopic excitation of the sample (as required for localized Raman or Fourier-transform infrared spectroscopy), photo-electron- or photo-hole-generation to name a few examples. These examples may all benefit from the auxiliary light beams 380 focusing on or near the cantilever and being independently controlled from the signal light beam 090 and reference light beam 100.

It is worth noting that the optical system drawn in FIG. 9 may have the dichroic mirror 310 reflections oriented differently from the real implementation for illustrative reasons. This technique is referred to as "folding the optical system" in order to aid drawing on a two-dimensional page. In reality, the preferred embodiment may instead have the dichroic mirror 310 reflection direct the light beam at various angles into or out of the plane defined by the page. Similarly, due to the limits of drafting, other figures herein present light beams in the plane of the page that may in an embodiment of the invention be directed into or out of the page. Also, figures herein may show elements of the apparatus as being in the plane of the page when in fact they are disposed in front of or behind the plane of the page.

Figure 10:
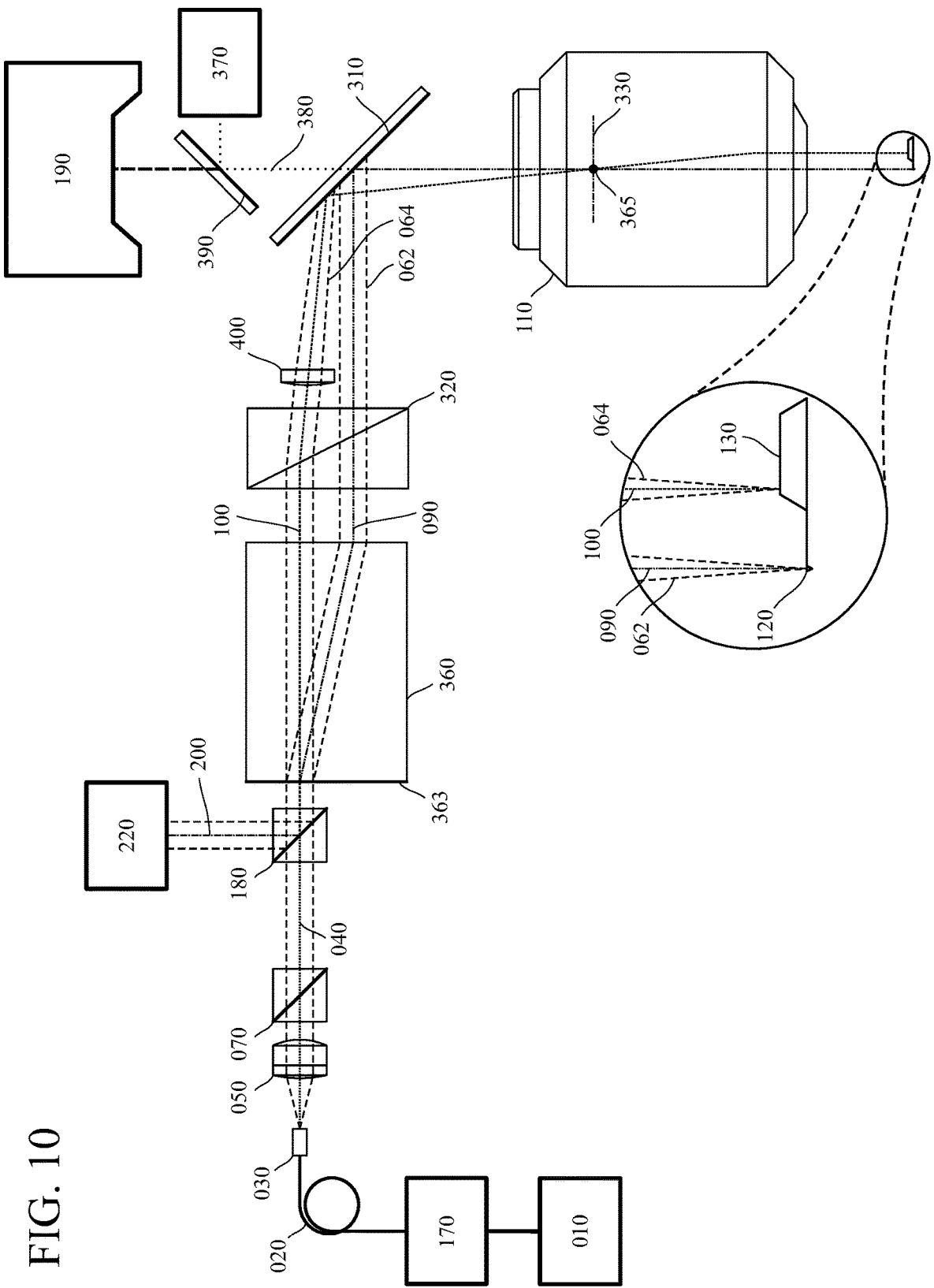
FIG. 10 shows a reference beam defocusing lens.

Beyond a certain distance from their point of intersection 365, the signal light beam 090 and reference light beam 100 become separated by a distance larger than their diameters 060. At that distance and beyond, the beams are considered spatially separated. The benefits of having the signal light beam 090 and reference light beam 100 spatially separated is that each beam can independently be shaped using standard optics, and the optical path length of each arm can be tuned independently. Birefringent lenses, as described in the prior art, are not necessary because both polarization states are spatially separated. For example, FIG. 10 shows how a reference beam defocusing lens 400 can slightly defocus the reference light beam 100 such that it is focused on the cantilever support chip rather than the cantilever while the signal light beam 090 remains focused on the cantilever.

So far, the diameter of the source light beam 040 was chosen by optical design in order to reduce the combined error between cantilever curvature, and the defocus caused by chip thickness error and tilt error of the chip. The advantage of the current embodiment is that both diameters of the signal light beam 090 and reference light beam 100 can be independently tuned. The signal light beam 090 diameter can be tuned to accommodate expected errors in cantilever curvature. Meanwhile the diameter of the reference light beam 100 can be tuned to reduce the combined error between cantilever curvature, defocus caused by chip tilt errors, and defocus caused by chip thickness errors. In other words, this additional degree of freedom allows the design of an optical system more tolerant to errors from all these three sources.

Figure 11:
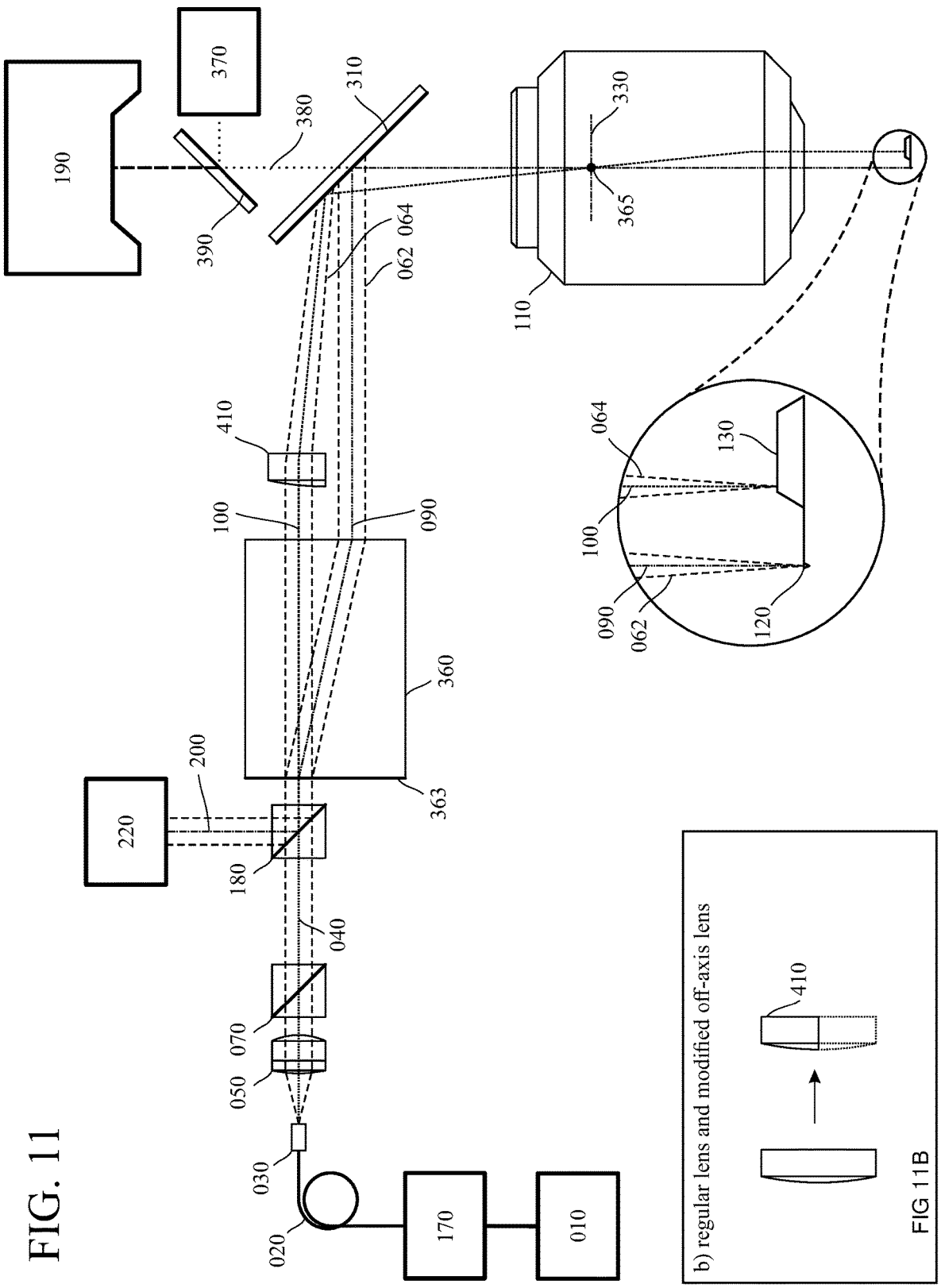
FIG. 11 shows an off-axis lens for defocusing the light beam and imparting a desired angular deviation.

An off-axis lens 410 may also be used to fulfill two functions simultaneously: defocusing the light beam and imparting a desired angular deviation. This is shown in FIG. 11, where the off-axis lens 410 both deviates the reference light beam 100 and defocuses it. FIG. 11b shows how an off-axis lens can be manufactured from a standard lens by grinding away some fraction of it to achieve this property. Alternatively, a lens can be used off-axis without changing the lens geometry. However, the grinding operation is necessary in this specific design because of the proximity between signal light beam 090 and reference light beam 100; only the reference light beam 100 is designed to traverse the off-axis lens 410. Other designs may use a single lens large enough that focuses both the signal light beam 090 and reference light beam 100 while imparting an angular deviation only to one light beam and not the other, or imparting some degree of angular deviation to both light beams that depends on the position of the lens axis relative to the axes of both light beams.

Figure 12:
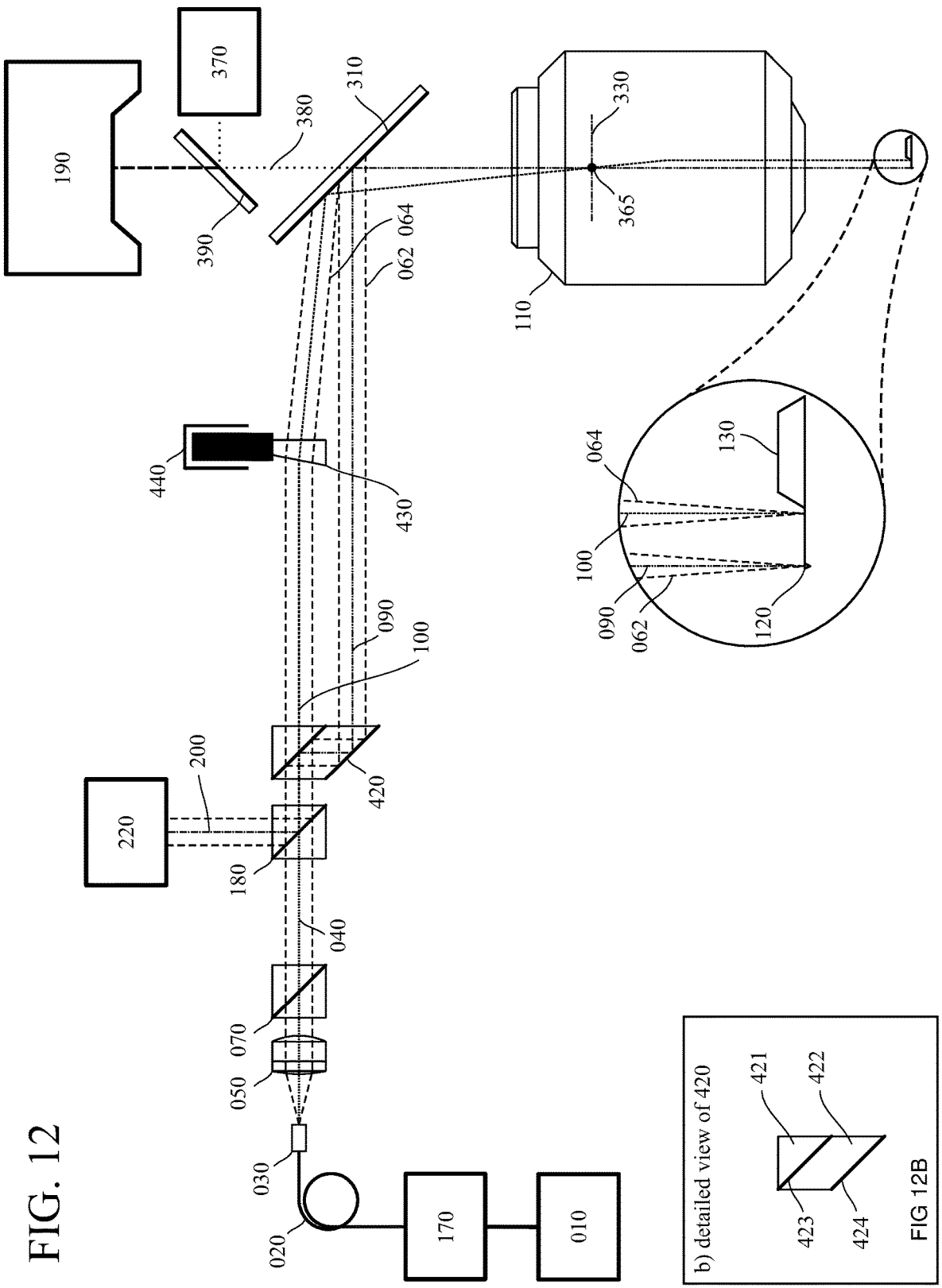
FIG. 12 shows using a lateral displacement beamsplitter.

An alternative embodiment of the present invention is shown in FIG. 12 that also achieves a spatially separated light beam geometry without the use of birefringent crystals such as birefringent lateral beam displacer 360. A lateral displacement beamsplitter 420 separates the source light beam 040 into the signal light beam 090 and reference light beam 100. The lateral displacement beamsplitter 420 is composed of a triangular prism 421 that is bonded to a parallelogram prism 422, as shown in FIG. 12b. Unlike lateral beam displacers that use refraction to separate light, the lateral displacement beamsplitter 420 uses a partially-reflective optical interface 423 to split the source light beam 040 into the signal light beam 090 and reference light beam 100; then, a fully-reflective optical interface 424 that is parallel to the partially-reflective optical interface 423 is used to reflect the first reflected beam such that this doubly reflected beam and the initially transmitted beam both emerge from the lateral displacement beamsplitter as parallel beams that are separated by some distance in the transverse direction. In the embodiment described by FIG. 12, a polarizing partially-reflective optical interface 423 is used, such the signal light beam has a polarization state that is substantially orthogonal to the polarization state of the reference light beam. However, a non-polarizing lateral displacement beamsplitter may also be used at the expense of reduced signal-to-noise ratio. In FIG. 12, the partially-reflective optical interface 423 has a polarization-selective coating that reflects the signal light beam 090 and transmits the reference light beam 100. However, an equivalent optical arrangement exists where the signal light beam 090 is transmitted and the reference light beam 100 is reflected. Meanwhile, the fully-reflective optical interface 424 that redirects the signal light beam 090 to be parallel to the reference light beam 100 may make use of total internal reflection, a metallic coating, or a dielectric coating.

After the signal light beam 090 and reference light beam 100 leave the lateral displacement beamsplitter 420, an angular deviation is imparted on the reference light beam 100 using an optical path wedge 430. (Note that this wedge is termed "optical path wedge" as it will later be used to change the optical path length of the light beam.) A wedge, in this context is a prism or window designed such that both optical faces that transmit the light beam are purposefully not parallel in order to impart an angular deviation to a light beam traversing it. The angle between both optical faces is the wedge angle. The angular deviation $\Delta\theta$ of the transmitted light is prescribed by the wedge angle $\alpha$ and index of refraction of the glass $n_{glass}$ used to manufacture the wedge, by $$\Delta\theta \approx \alpha n_{glass},$$

which is a good approximation for small angles $\alpha$. The angular deviation can be designed to achieve a desired light beam separation between signal light beam 090 and reference light beam 100 at the cantilever. This separation is a function of the focal length of the microscope objective 110 and the angular deviation between the reference light beam 100 and the signal light beam 090. This design is more compact than the previous embodiment that relied on large birefringent optics. Also, the optical components in this embodiment can be manufactured at lower cost and at higher optical quality in certain respects than birefringent materials.

The embodiment illustrated in FIG. 12 makes use of a lateral displacement beamsplitter 420 to create two parallel beams, one of which is subsequently deviated using the optical path wedge 430. However, a single optical component may perform both functions. For example, an alternative beamsplitter to the lateral displacement beamsplitter 420, where the parallelogram prism 422 is replaced by a trapezoidal prism, can split the source light beam 040 into a signal light beam and a reference light beam that have a prescribed angle between them. The angle between both light beams emerging from such a beamsplitter is a function of the angle between both reflective surfaces of the trapezoidal prism and the index of refraction of the material of the trapezoidal prism. Alternatively, a beamsplitter with similar geometry to the lateral displacement beamsplitter 420 but where the triangular prism 421 and the parallelogram prism 422 are made from different glass types can deviate the transmitted light beam by an angle determined by the index of refraction of both glass types. These two proposed mechanisms would result in an angular deviation between the signal and reference beams without the need of a wedge prism.

Note that the lateral displacement beamsplitter 420 may also be replaced by two polarizing cube beamsplitters with either an air gap or that are cemented together. Alternatively, a polarization cube beamsplitter and a mirror may be used to fulfill the same functions as the lateral displacement beamsplitter 420. These designs allow to reduce cost as such prisms are readily available from most optical manufacturers. It should be noted that a function of the lateral displacement beamsplitter 420 is to impart a lateral displacement between a first beam and a second beam; namely, a displacement in a direction perpendicular to the axis of the first beam. Many optical arrangements can be used to introduce such a function using a combination of basic optical components. However, arrangements where both reflective interfaces are part of a bonded assembly of optical elements are optimal as they reduce the potential for drift and vibrations between both reflective interfaces that may introduce errors in measurements of the cantilever displacement.

The optical path wedge 430 is attached to an actuator 440. The actuator 440 can translate the optical path wedge 430 in one direction which varies the amount of glass that the light beam traverses without changing the angular deviation of the light beam. The actuator may be a piezoelectric transducer, a stepper motor, an inertial motor, to name a few examples. The translation axis of the actuator can be in-plane with either of the wedge optical faces, or at some angle with respect to those optical faces. Displacements that cause changes in traversed glass thickness on the order of a wavelength of light allow the optical path difference between the paths of the reference light beam 100 and signal light beam 090 to be varied. This allows the Lissajous to be calibrated by measuring and fitting the interferometric response function measured during the movement of the optical path wedge 430. Note that the optical path wedge 430 performs two functions: angular deviation of the reference light beam 100 to achieve the designed spot separation at the cantilever, as well as calibration of the Lissajous by actuation of the optical path wedge 430 with the actuator 440.

Alternatively, the lateral displacement beamsplitter 420 may be tilted to change the optical path difference between the paths of the reference light beam 100 and signal light beam 090 by roughly one wavelength of light. This may be achieved by actuating a piezoelectric transducer to impart an angular deviation to the lateral displacement beamsplitter 420. Whereas the optical path wedge 430 requires a translation to change the optical path length between the paths of the signal light beam 090 and reference light beam 100, the lateral displacement beamsplitter 420 requires a rotation to perform the same function. Other optical components may also be actuated to impart an optical path length difference between the path of the signal light beam 090 and the path of the reference light beam 100 to calibrate the Lissajous. The optical path length difference required to properly calibrate the Lissajous is ideally at least half the wavelength of light, but smaller fractions may be sufficient to provide enough of an elliptical arc in order to fit an accurate Lissajous model to the acquired data.

Piezoelectric actuators can move optical elements with high speed and nanometer resolution. In the present invention, this would permit the user to calibrate the Lissajous very rapidly and with very high resolution. This has advantages in some applications. However, in other applications, it may be advantageous to calibrate the Lissajous using a method that is highly stable. Piezoelectric actuators are subject to creep with time and temperature, and this creep may cause the optical path difference between signal light beam 090 and reference light beam 100 to change with time undesirably, even after the actuation signal is stopped. Such changes of the optical path difference may be mistaken for a cantilever displacement.

Figure 13:
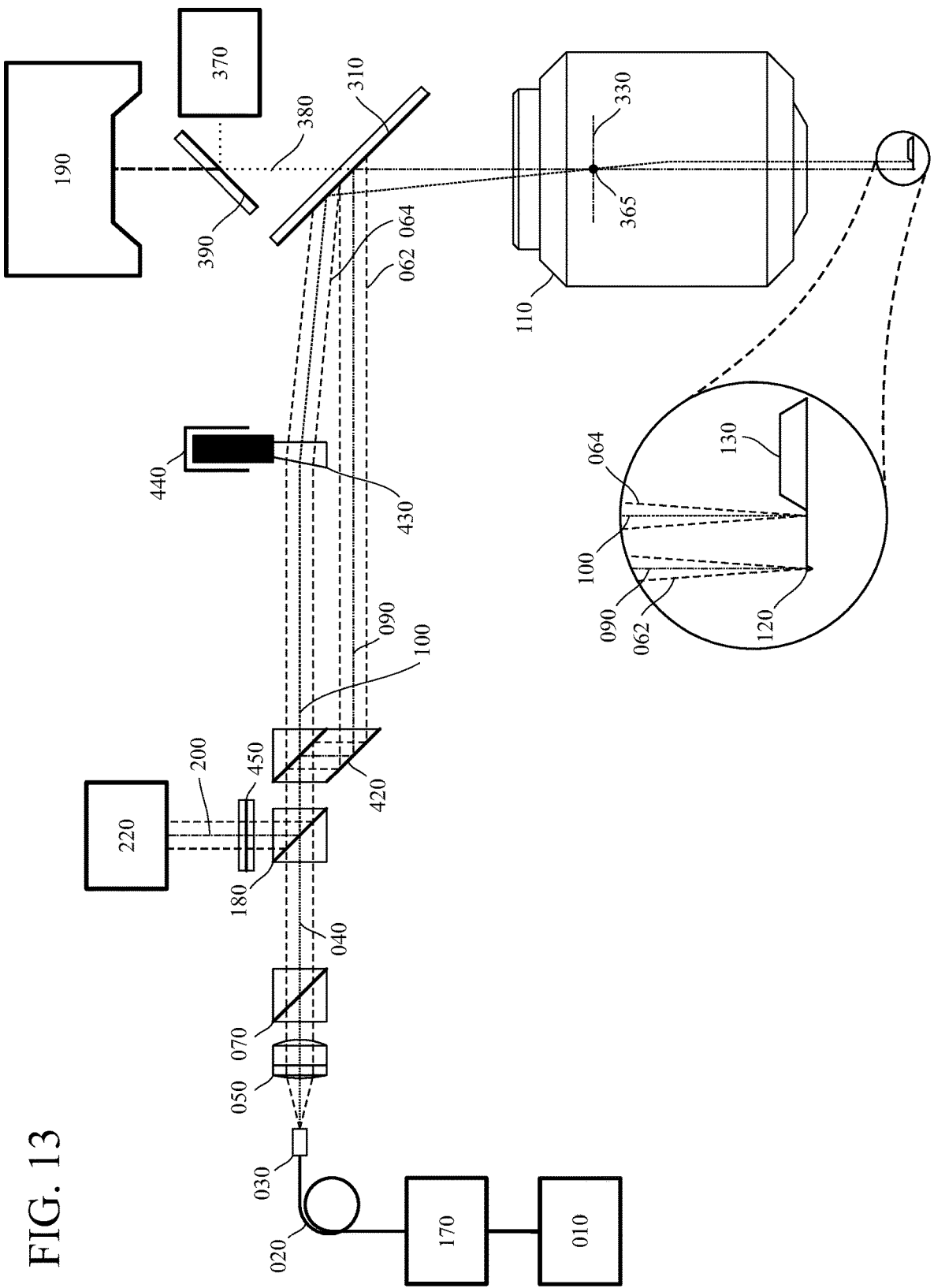
FIG. 13 shows calibrating the Lissajous.

FIG. 13 shows an embodiment of the present invention that offers a more stable way to calibrate the Lissajous. Alternatively to actuating the optical path wedge 430 or other optical components in order to modulate the phase difference between reference light beam 100 and signal light beam 090, a liquid crystal device 450 is here used to impart a phase shift between the reference light beam 100 and signal light beam 090 light beams. A liquid crystal device is a device that orients the molecules of a special liquid between two transparent electrodes in order to change the liquid's birefringent properties. The orientation of the molecules is induced by an electric field stemming from an applied voltage to the electrodes. The degree of phase shift produced by the liquid crystal device 450 is dependent on the magnitude of the voltage applied to the liquid crystal device 450. The thickness of the liquid crystal material is selected to achieve roughly one circle around the Lissajous when fully activated. Liquid crystals typically have a non-linear relationship between imparted difference with respect to applied voltage. The non-linearity of the liquid crystal response is beneficial because it prevents noise and drift to occur when the liquid crystal device is turned off after calibration. Below a certain voltage (typically around 1 V), the liquid crystal is stable with a fixed and stable phase shift between both polarization states. When the liquid crystal device voltage is set close to 0 V, noise on the voltage applied to the liquid crystal device has a negligible effect on the measured cantilever displacement. Therefore, it is beneficial to electrically activate and use the liquid crystal device 450 for calibrating the interferometer response during experiment setup, but also beneficial to turn off the liquid crystal device and maintain it in a deactivated state (close to 0 V) during the measurement, unlike in the prior art. Electrically deactivating the liquid crystal device after Lissajous calibration prevents the liquid crystal device from increasing the noise of the cantilever displacement measurement. It may also be beneficial at times to pause the measurement, electrically activate the liquid crystal device 450 to recalibrate the interferometer response and Lissajous shape, electrically deactivate the liquid crystal device, and continue the measurement.

The liquid crystal device 450 can be placed into the path of the signal light beam 090 or the path of the reference light beam 100. Alternatively, the liquid crystal device 450 can be placed into the path of source light beam 040 or the path of the recombined light beam 200 and oriented accordingly to impart a maximal phase shift to either the polarization axis of the signal light beam 090 or the polarization axis of the reference light beam 100. However, liquid crystal devices can cause both wavefront aberrations and large back-reflections which reduce the contrast of the interferometric signal. To reduce the effects of this non-ideal behavior, the liquid crystal device 450 may be positioned in the recombined light beam 200 as shown in FIG. 13. By orienting the polarization axis of the liquid crystal device 450 to match the polarization axis of either the signal light beam 090 or reference light beam 100, the liquid crystal device 450 can impart a phase shift preferentially to one polarization axis while not substantially affecting the other. In that case, modulating the liquid crystal device voltage introduces a phase shift that allows the calibration of the Lissajous by mimicking the effects of a cantilever displacement. Importantly, if the liquid crystal device 450 is placed in the path of the recombined light beam 200 (rather than the separate paths of the signal light beam 090 or reference light beam 100), moderate distortions of the wavefront by the liquid crystal device 450 will not substantially degrade the contrast at the photodetectors 260, 262, 264, and 266. This is because such wavefront distortions will affect the signal light beam and the reference light beam equally. When the signal light beam interferes with the reference light beam within the quadrature phase analyzer 220, the phase of the signal light beam is subtracted from the phase of the reference light beam, and the phase shifts from any moderate wavefront distortions will subtract out.

Figure 14:
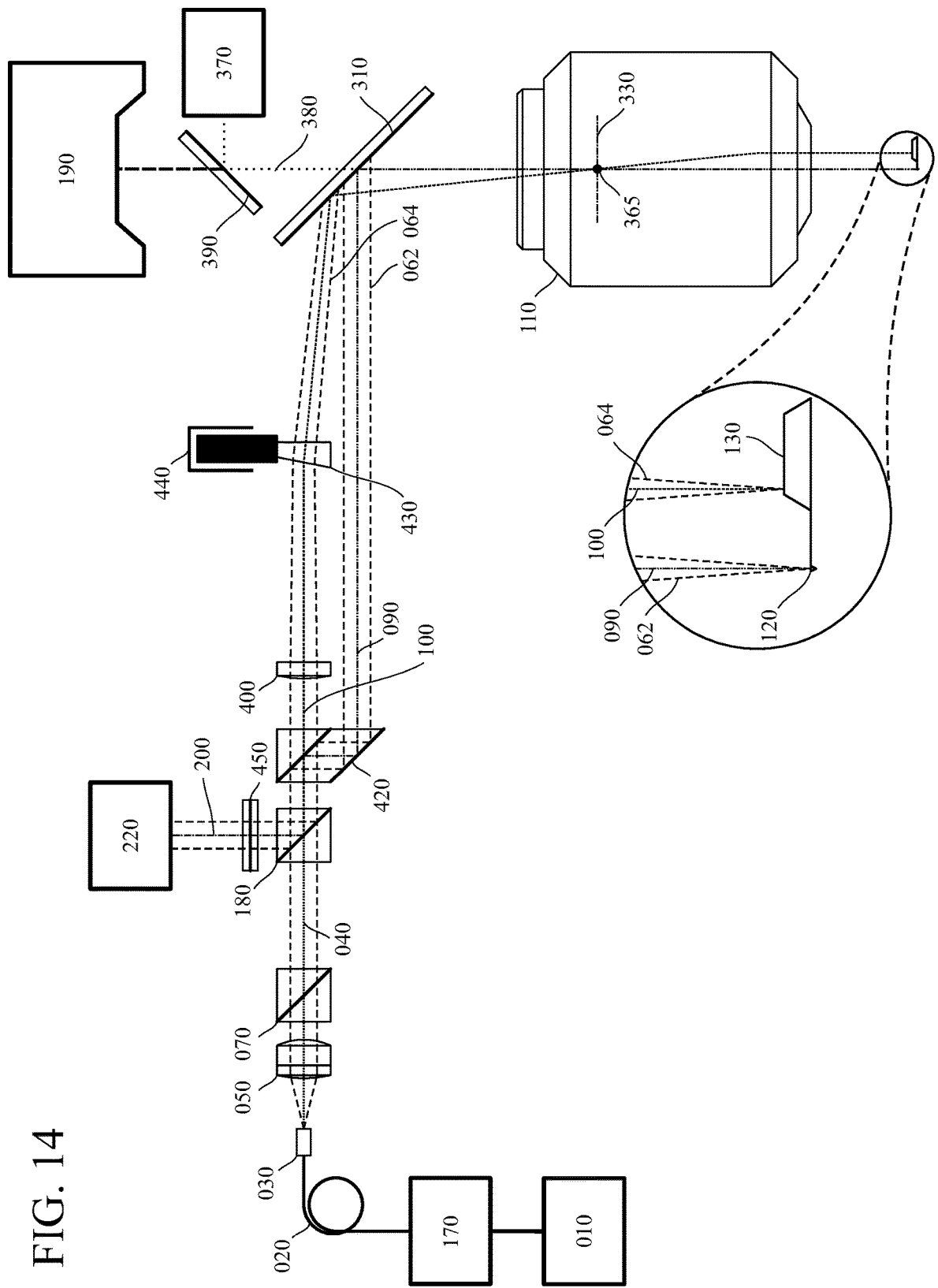
FIG. 14. Shows a reference beam defocusing lens in combination with a lateral displacement beamsplitter and liquid crystal device.

For the same reasons that the reference beam defocusing lens 400 was introduced in FIG. 10, a reference beam defocusing lens 400 can be used in combination with the lateral displacement beamsplitter 420 and liquid crystal device 450, for similar reasons and with similar benefits. This yields another embodiment of the present invention, as shown in FIG. 14.

Figure 15:
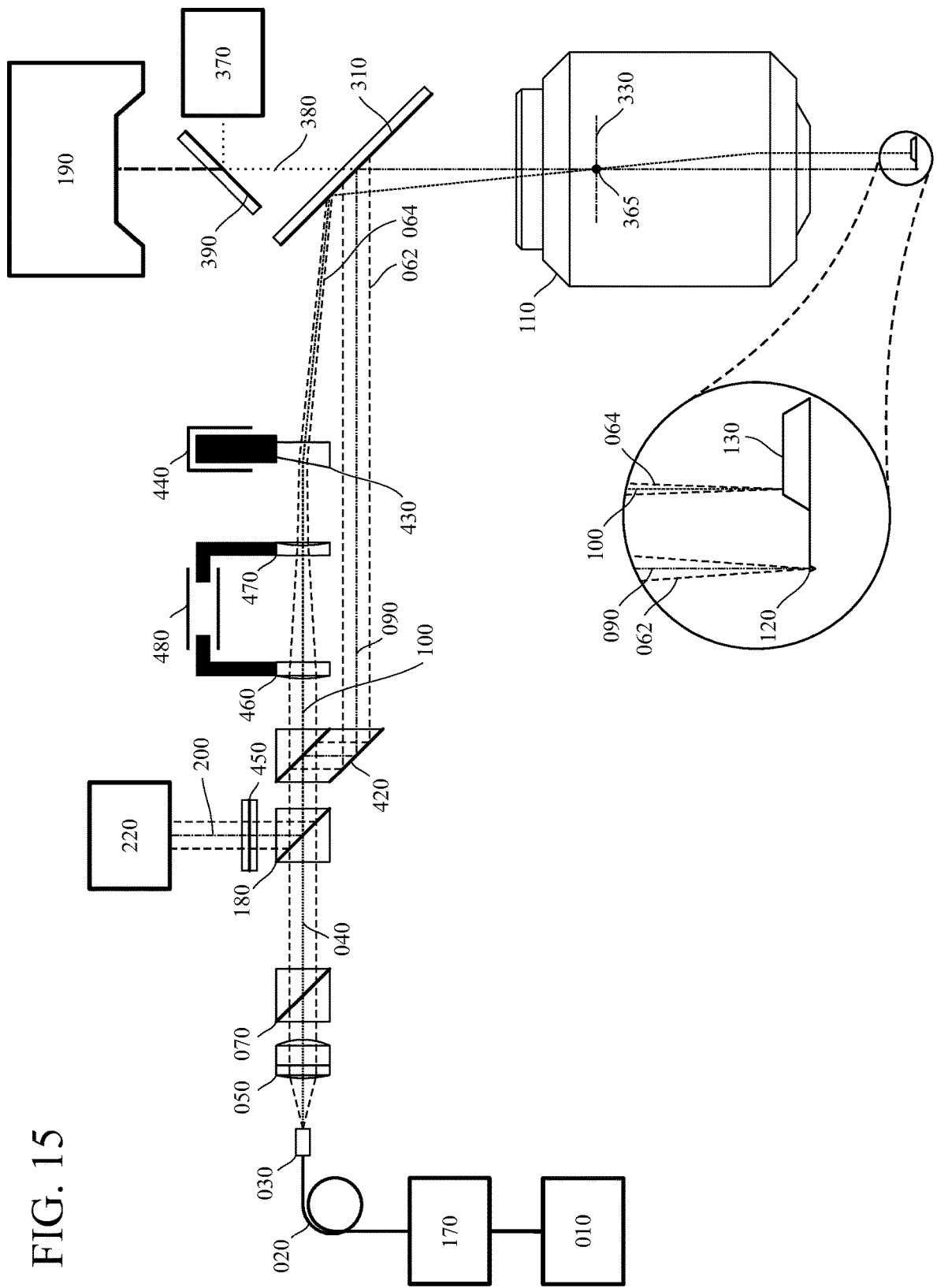
FIG. 15 shows an embodiment providing reduction of the beam diameter.

The embodiment of the present invention shown in FIG. 15 demonstrates an optical scheme where the reference light beam 100 passes through a beam expander composed of a positive lens 460 and a negative lens 470. Appropriate selection of these lenses and the distance between them will result in desired reduction of the beam diameter 064 of the reference light beam 100 with respect to the beam diameter 062 of the reference light beam 100. Reversing the order of the lenses allows increasing the beam diameter 064 of the reference light beam 100. As discussed previously, controlling this beam diameter allows the optimization of the divergence and depth of focus of the reference light beam in the vicinity of the AFM cantilever. Depending on the situation, a different amount of reduction or increase in beam diameter may be desirable to optimize the interferometric contrast for any given situation. Analogously, these optical components may be placed in the signal light beam 090 path to tune the divergence of the signal light beam 090 near the cantilever 120.

FIG. 15 also shows an actuation mechanism, referred to here as a beam expander actuator 480, that may be attached to one or both lenses (460 and 470) to change the distance between them. The actuation mechanism may be manual or computer-controlled. This allows careful tuning of the focus at the cantilever support chip while running the instrument. This may be beneficial for increasing contrast for various cantilever support chip thicknesses, especially if the depth of field of the light beam is smaller than the variability in the cantilever support chip thicknesses.

Figure 16:
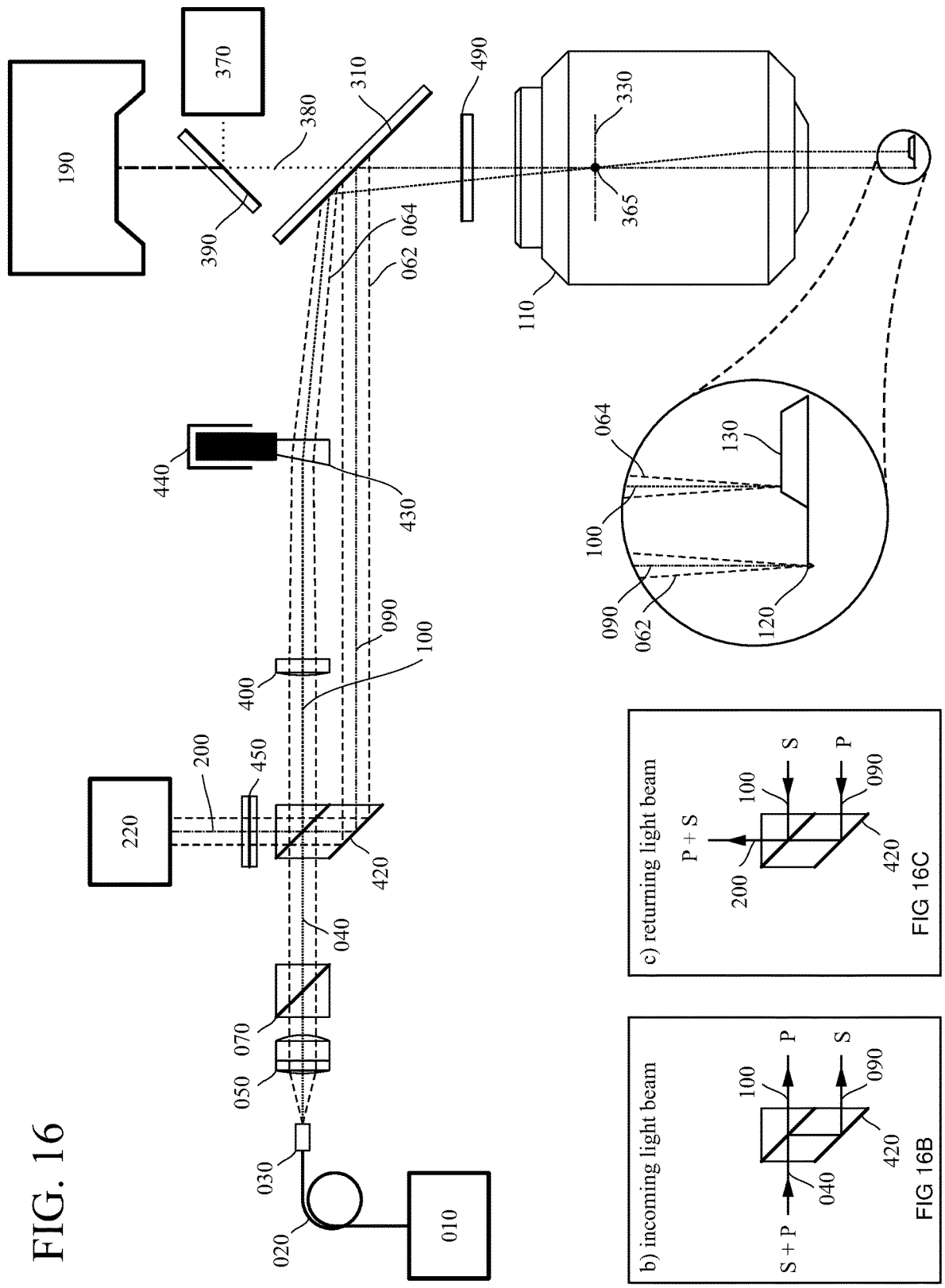
FIG. 16 shows an embodiment using a quarter-wave plate.

In the embodiments discussed so far, a Faraday isolator 170 was used to prevent light from returning to the light source and causing instabilities. This is a consequence of the beamsplitter 180 which reflected only a portion of the recombined light beam 200 towards the quadrature phase analyzer 220. The remainder of the light beam returned to the light source. In FIG. 16, an embodiment of this invention is presented wherein a quarter-wave plate 490 is used such that the polarization state can be rotated by 90° between the incoming and returning light for both the signal light beam 090 and reference light beam 100. The polarization states of the incoming and returning light beams are labelled "S" and "P" in FIG. 16 according to standard optics nomenclature for the lateral displacement beamsplitter 420. A single quarter-wave plate 490, through which both beams pass, can be used to perform this 90° rotation on both the signal light beam 090 and reference light beam 100. Alternatively, a first quarter-wave plate can be placed in the signal light beam 090 and a second quarter-wave plate can be placed in the reference light beam 100. FIG. 16b shows the paths of the incoming signal light beam 090 and incoming reference light beam 100. FIG. 16c shows the paths of the returning signal light beam 090 and returning reference light beam 100, in which case the quarter-wave plate 490 has interchanged the "S" and "P" polarizations for both beams. The consequence of this operation is that the recombined light beam 200 does not return along the path of the source light beam 040; rather, the polarization-selective coating in the lateral displacement beamsplitter 420 redirects both returning reference light beam 100 and returning signal light beam 090 out of the side facet of the lateral displacement beamsplitter 420. This allows the elimination of the beamsplitter 180 used in the previous embodiment. Furthermore, the Faraday isolator 170 may be omitted as nearly all the light is now guided towards the quadrature phase analyzer 220 and a negligibly small amount of the light returns to the light source in this configuration.

Figure 17:
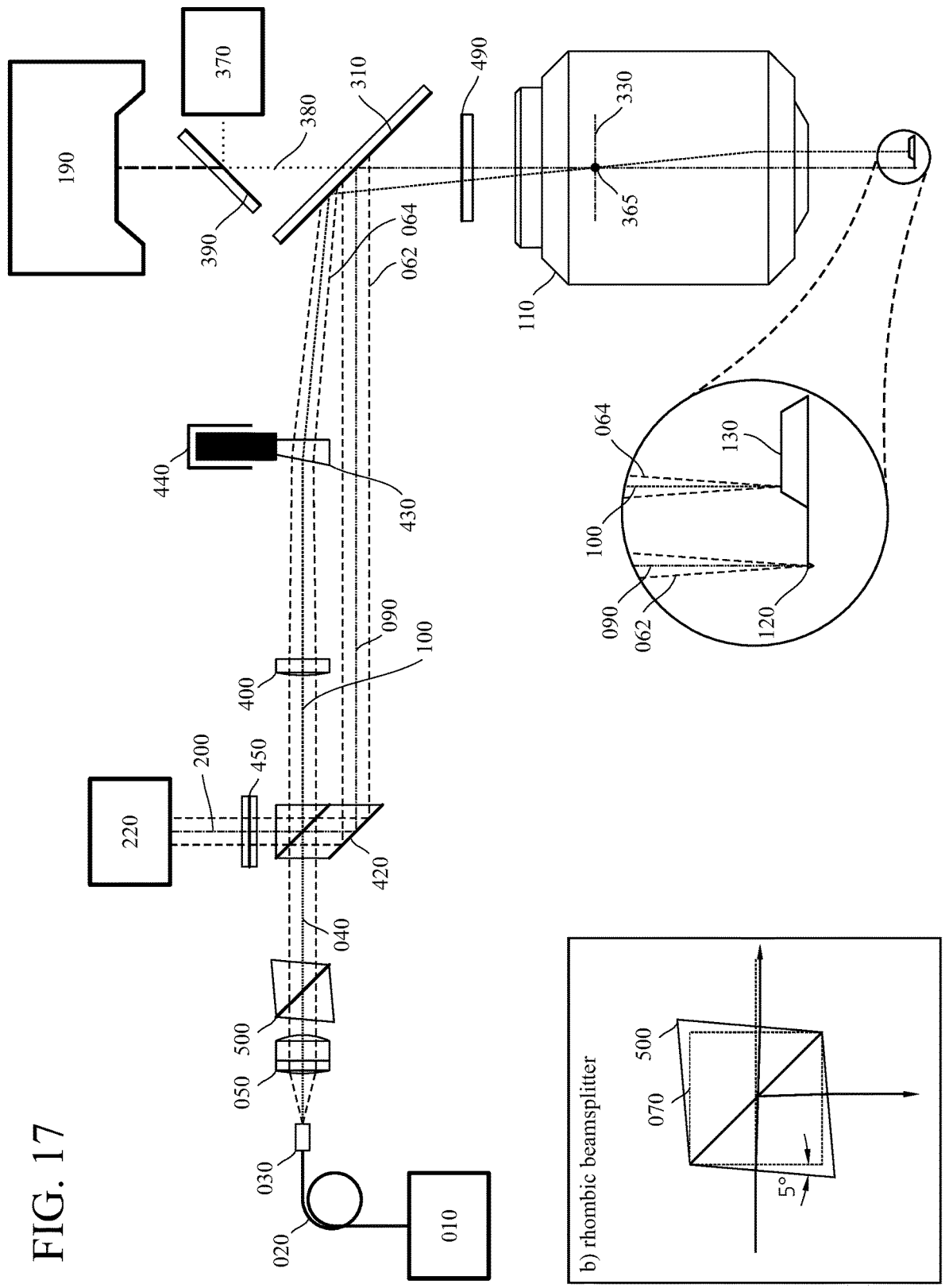
FIG. 17 shows an embodiment with a polarizing rhombic beamsplitter 500 that avoids perpendicular incident and transmitted light beams.

It is desirable to reduce the amount of back-reflections that may return into the laser 010, especially after the removal of the Faraday isolator 170. Typical cube beamsplitters are designed to operate with a light beam that is perpendicular to their optical faces. Such a geometry results in back-reflections that can mostly return into the laser 010, as in the case of the clean-up polarizer 070 shown in FIG. 16. Rotating a cube beamsplitter to prevent back-reflections returning to the laser may result in reduction of the cube beamsplitter performance because the beamsplitting coating is designed for a 45° angle of incidence. Also, rotating the cube may lead to complications during assembly and manufacturing. Plate beamsplitters are not a desirable alternative; they are manufactured as a window with parallel interfaces can cause etalon fringes even when the plate beamsplitter is used at large angles with respect to the light beam axis. In FIG. 17, a novel design is presented of a polarizing rhombic beamsplitter 500 that avoids perpendicular incident and transmitted light beams with respect to the outside faces of the beamsplitter. This ensures that any stray light reflected off the outside faces of the beamsplitter exits the optical system at a large angle rather than mostly return towards the laser 010. FIG. 17b shows a more detailed view of the geometry of the polarizing rhombic beamsplitter and the light paths. The polarizing rhombic beamsplitter is manufactured by bonding two identical isosceles-triangle prisms along their faces corresponding to the base of the triangle. The four faces corresponding to the legs of the triangles make up outside faces of the assembled polarizing rhombic beamsplitter. A polarizing beamsplitting coating is introduced on at least one of the bonded surfaces prior to bonding. Some or all of the outside faces may have anti-reflection coatings that are optimized for the light source wavelength and angle of incidence in order to maximize the transmission of light through the polarizing rhombic beamsplitter. Additionally, some of the faces that are not used in the primary intended function of the beamsplitter may be ground to suppress specular reflections from said faces that may cause undesirable interferences within the optical system. Furthermore, these ground surfaces may be painted black to further reduce any stray light in the optical system by absorption of the stray light that would have otherwise reflected or scattered within the optical system.

While the outside faces of the polarizing rhombic beamsplitter 500 are not orthogonal to each other, the transmitted light beam is parallel to the incident light beam, as with a standard cube beamsplitter. Also, the reflected beam is perpendicular to the incident light beam if the polarizing rhombic beamsplitter is oriented with respect to the incident light beam with the incidence angle that the polarizing rhombic beamsplitter was designed for. A polarizing rhombic beamsplitter designed for an incidence angle of $\theta_{inc}=5°$ is manufactured from isosceles triangle prism with a vertex angle $\psi_{vertex}=80°$ as calculated by $$\psi_{vertex}=90°-2\theta_{inc}.$$

In this case, both prisms used to assemble this polarizing rhombic beamsplitter are 50°-50°-80° triangular prisms. When operated at the design incidence angle, the light beams on the inside of polarizing rhombic beamsplitter 500 are at some angles defined by the angles of the outside faces of the polarizing rhombic beamsplitter 500 and its index of refraction. In that case, the incidence angle on the internal beamsplitting interface can be calculated by $$\theta_{int}=45°+\theta_{inc}-a\sin(\sin(\theta_{inc})/n_{glass})$$

where $n_{glass}$ is the index of refraction of the glass used to manufacture the prisms. For optimal operation, the beamsplitting coating is specifically design for operation at the angle of incidence of $\theta_{int}$. For example, the coating used for the polarizing rhombic beamsplitter 500 was designed to have maximal polarization extinction ratio since the intended application is to ensure a highly linearly polarized light output. As is evident from the FIG. 17b, the incident and transmitted beams are not collinear; therefore, the translation of the transmitted beam must be factored into the optomechanical design. In FIG. 17b, the polarizing rhombic beamsplitter 500 is shown with an incidence angle $\theta_{inc}=5'$; however, any angle sufficiently different from $\theta_{inc}=0°$ (which corresponds to a cube beamsplitter) may benefit the rejection of back-reflections from the optical system.

A similar approach to that of the rhombic polarizing beamsplitter 500 may be applied to the lateral displacement beamsplitter 420. The lateral displacement beamsplitter 420 may be composed of prisms that have angles between faces that differ slightly from 45°, 90°, and 135°, in order to avoid back-reflections from returning to the laser 010.

In the embodiments of the present invention shown so far, due to the large discrepancy in optical path length and total dispersion seen by both signal light beam 090 and reference light beam 100, a high-coherence laser source—namely, a source with a long coherence length—is chosen to ensure high interferometric contrast. As long as the coherence length is larger than the difference of the optical path lengths (including errors due to tolerance stack up of the optical and mechanical design), a high interferometric contrast may be observed. This is the case for a HeNe laser, which has a coherence length on the order of tens of centimeters or more. The use of such a high-coherence source allows for design freedom of the optical system, since no matching between the signal light beam 090 and reference light beam 100 optical paths is necessary to achieve high contrast. However, there are benefits to matching the optical path length of the reference arm and signal arm. For example, a mismatch in the optical path length between signal light beam 090 and reference light beam 100 can result in undesirable drift or discontinuities in the interferometric signal. Any drift in the wavelength of the laser (say, due to temperature changes) causes a drift in the interferometric signal that scales proportionally to the difference in optical path length between signal light beam 090 and reference light beam 100. Similarly, mode-hopping in the wavelength of the laser causes discontinuities in the interferometric signal that are proportional to the difference in optical path length. These problems are greatly reduced if the optical path lengths of signal light beam 090 and reference light beam 100 are matched, which is known to those skilled in the art to be a desirable trait of an interferometer.

For non-coherent light sources with a wider spectral bandwidth, such as superluminescent diodes (SLD), the matching requirements between both arms is very strict because a small mismatch may result in no interferometric signal whatsoever. Superluminescent diodes have a low coherence length of the order of 10 μm. This coherence length is smaller than the tolerance of most optomechanical components. For this reason, although designers routinely employ SLDs for optical beam deflection methods in AFM, the prior art teaches the use of a high-coherence laser source, such as a HeNe laser or a laser diode, as the basis for interferometers in AFM. In other words, expert designers in the prior art choose high-coherence lasers for interferometers despite the potential benefits of SLDs, because the low coherence of SLDs is highly problematic.

Note that due to dispersion and the relatively broad spectral bandwidth of the SLD, the matching criterion between signal light beam 090 and reference light beam 100 to achieve interferometric contrast contains the optical path length argument (previously discussed) as well as a dispersion argument. The optical path length $l_{OPL}$ of an optical component is defined as $$l_{OPL} = x n_0$$

where x is the thickness of the optical component and $n_0$ is the index of refraction at the center wavelength $\lambda_0$ of the low-coherence light source. In contrast, the optical group path length includes the effects of dispersion (to first order), and is defined as $$l_{OGPL} = x\left(n_0 - \lambda_0 \frac{\partial n}{\partial \lambda}\right)$$

where the $$\frac{\partial n}{\partial \lambda}$$

term describes the first order dispersion of the glass. As with optical path length, the optical group path length of the signal light beam 090 is the sum of the optical group path length of the incoming part (before reflection from the cantilever) and the returning part (after reflection from the cantilever), and similarly for the optical group path length of the reference light beam 100.

For an interferometer design where the reference and signal optical paths are not symmetric, matching the optical path length of both arms is not sufficient to achieve interferometric contrast with a SLD. The necessary criterion to ensure high contrast is matching the total optical group path length between both arms, which takes into account the differences in dispersion between both arms that play a role in determining the condition for optical contrast. Henceforth, the criterion for achieving contrast with the SLD will be referred to as "matching the optical group path length" between signal light beam 090 and reference light beam 100, rather than simply "matching the optical path length" which suffices in the absence of dispersion.

Figure 18:
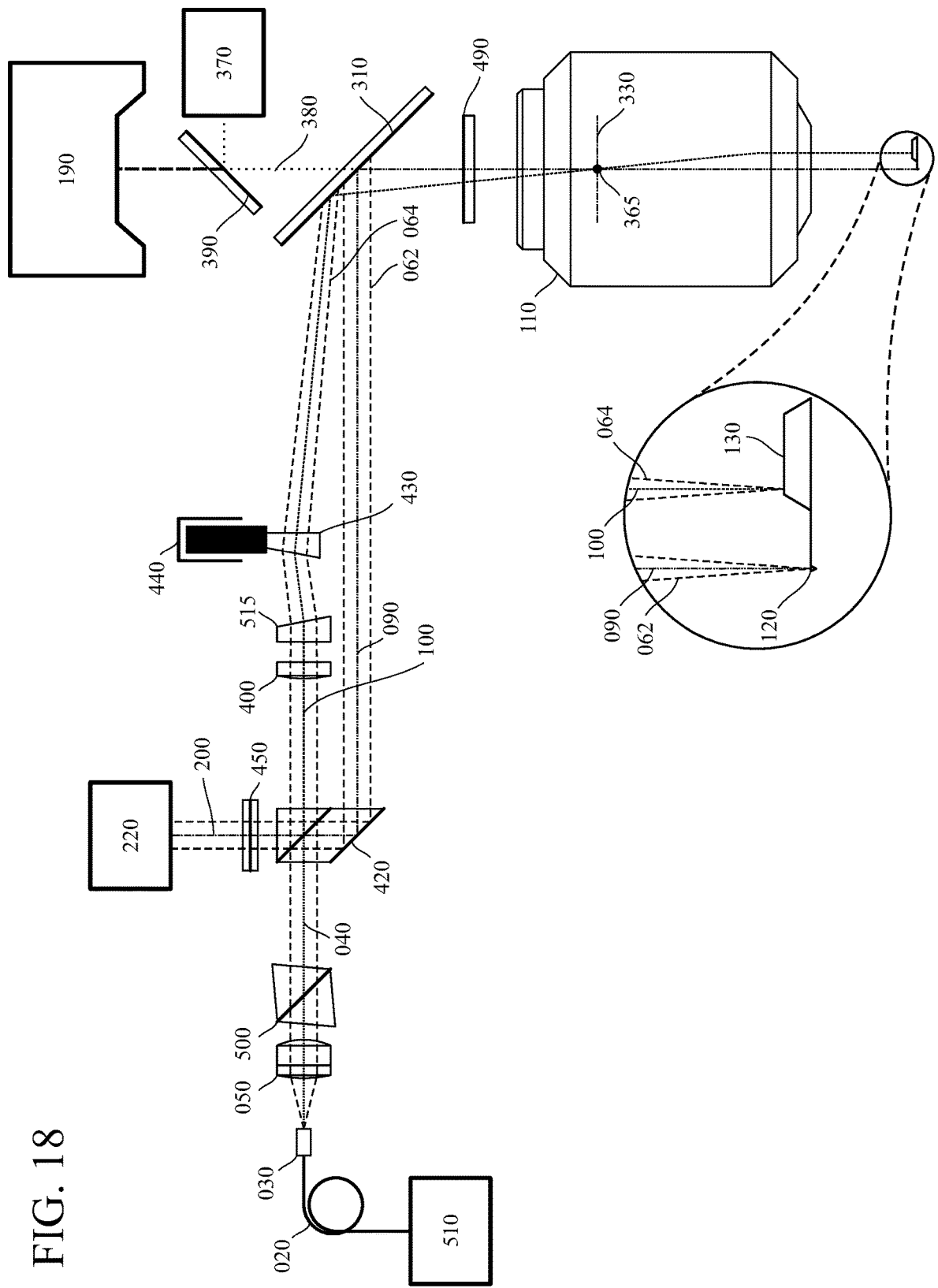
FIG. 18 shows the optical group path length of the reference arm being made longer in order to achieve interferometric contrast between signal light beam and reference light beam, using a wedge prism 515.

In order to use a superluminescent diode 510 in the novel design shown in FIG. 18, the optical group path length of the reference arm must be made longer in order to achieve interferometric contrast between signal light beam 090 and reference light beam 100. This can be achieved by using a wedge prism 515 to deviate the light beam away from the optical axis, as shown in FIG. 18. Then, the optical path wedge 430 can be used to deviate the light beam to the prescribed angle as required by the previous design. The requirement for angle of the optical path wedge 430 in this case is affected by the choice of the chosen angle for the wedge prism 515. The distance between both wedges, as well as the chosen wedge angles can be tuned to ensure that the reference light beam 100 has identical optical group path length to the signal light beam 090. By matching the optical group path length between both arms required by the superluminescent diode 510, the benefits of such low-coherence light sources, such as reduced background signals and periodic errors and artifacts, may be taken advantage of in this context of interferometric AFM. Note that in other embodiments of the present invention, the optical group path length of the signal arm may need to be made longer than the reference arm, in which case similar wedges would be disposed instead in the signal arm. Also, note that the use of a free-space superluminescent diode instead of a fiber-coupled superluminescent diode is optional as mentioned before in the context of a free-space laser source.

Figure 19:
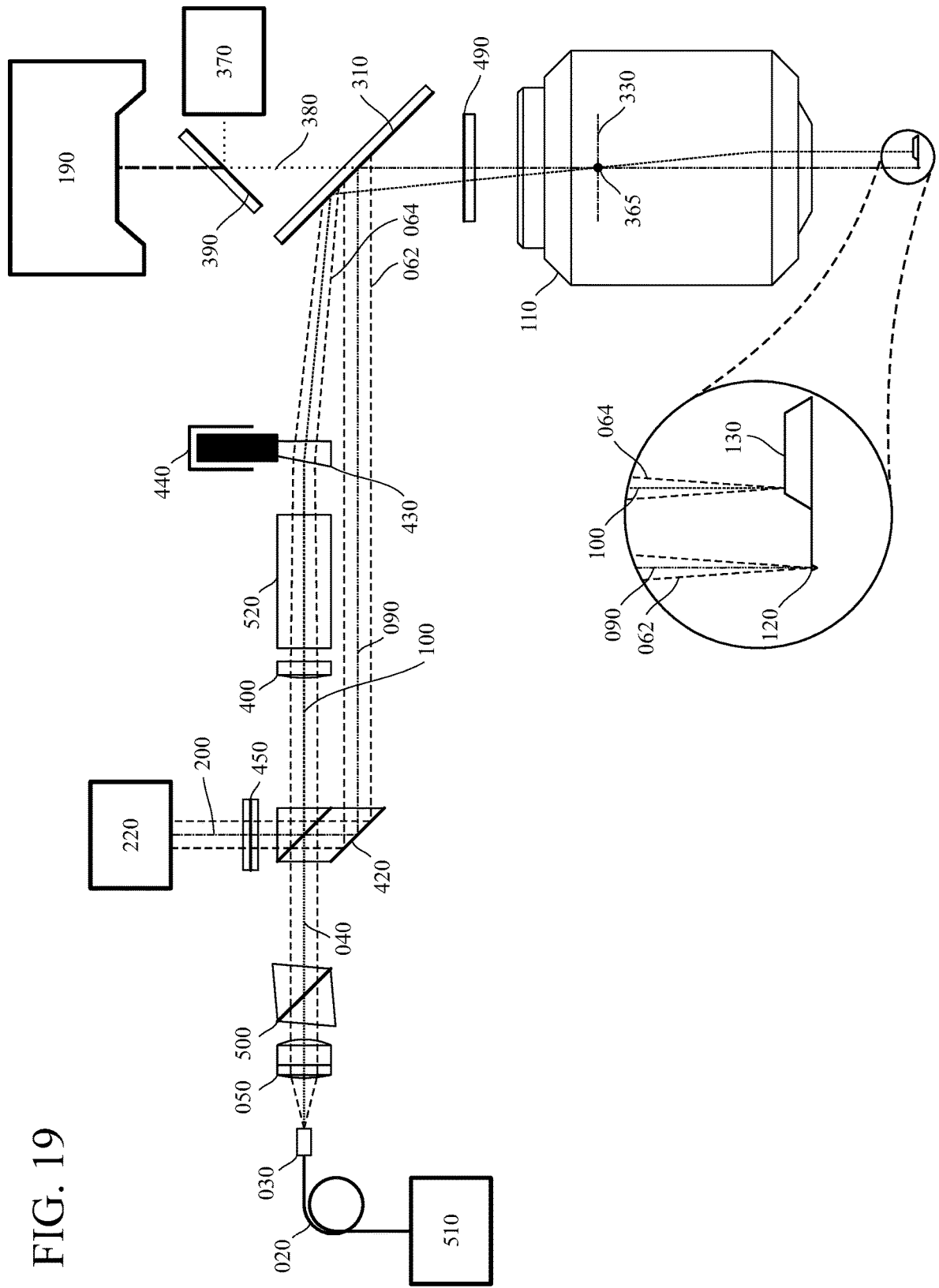
FIG. 19 shows an alternative embodiment to the dual wedge design of FIG. 18.

The embodiment of the present invention shown in FIG. 19 proposes an alternative solution to the dual wedge design presented in FIG. 18. An optical group path matching window 520 is introduced in the reference light beam 100 such that the optical group path lengths of both reference light beam 100 and signal light beam 090 are closely matched. This allows the matching of the optical group path length without deviation of the light beam using multiple wedges. The optical group path matching window 520 in this context is simply an optical window, where the type of glass is carefully selected for its dispersion characteristics and the thickness of the window is precisely tuned to introduce a well-controlled amount of optical group path length to the reference light beam 100 such that it matches the optical group path length of the signal light beam 090. Depending on the scenario, it may be necessary to introduce an optical group path matching window 520 into the signal light beam 090, the reference light beam 100, or both, to achieve ideal optical group path length matching within the geometric optical constraints.

Due to the very short coherence length of the superluminescent diode 510, which is on the order of 10 μm, the matching in the optical group path length of both arms typically cannot be achieved in the manufacturing and production of the instrument. For this reason, it is necessary to introduce a device with a tunable optical group path length in the signal light beam 090 path, the reference light beam 100 path, or both paths in order to match both arms to a fine degree once the instrument is assembled and in operation. Conveniently, the optical path wedge 430 can be moved in a direction perpendicular to the optical axis in order to change the amount of glass that the reference light beam 100 traverses, thus changing the optical group path length of that arm. For a typical wedge angle, this requires an actuator 440 that allows motion of the optical path wedge 430 on the order of 1 mm to achieve enough range to match both arms within optical and metal machining tolerances. Although a separate wedge may be used for the optical group path length matching, it is convenient to use the optical path wedge 430, which was previously used for changing the angle of reference light beam 100, in this context as well. Using the optical path wedge 430 for both purposes reduces the number of optical components that need to be manufactured, as well as reduces the number of back-reflections and reduces the complexity of the optical system. Note that the optical path wedge 430 is used for three functions in this design: imparting an angular deviation on the reference light beam 100, calibrating the Lissajous with small motions on the order of the wavelength of light, and matching the optical group path length between reference light beam 100 and signal light beam 090 with large motions on the order of 1 mm.

Figure 20:
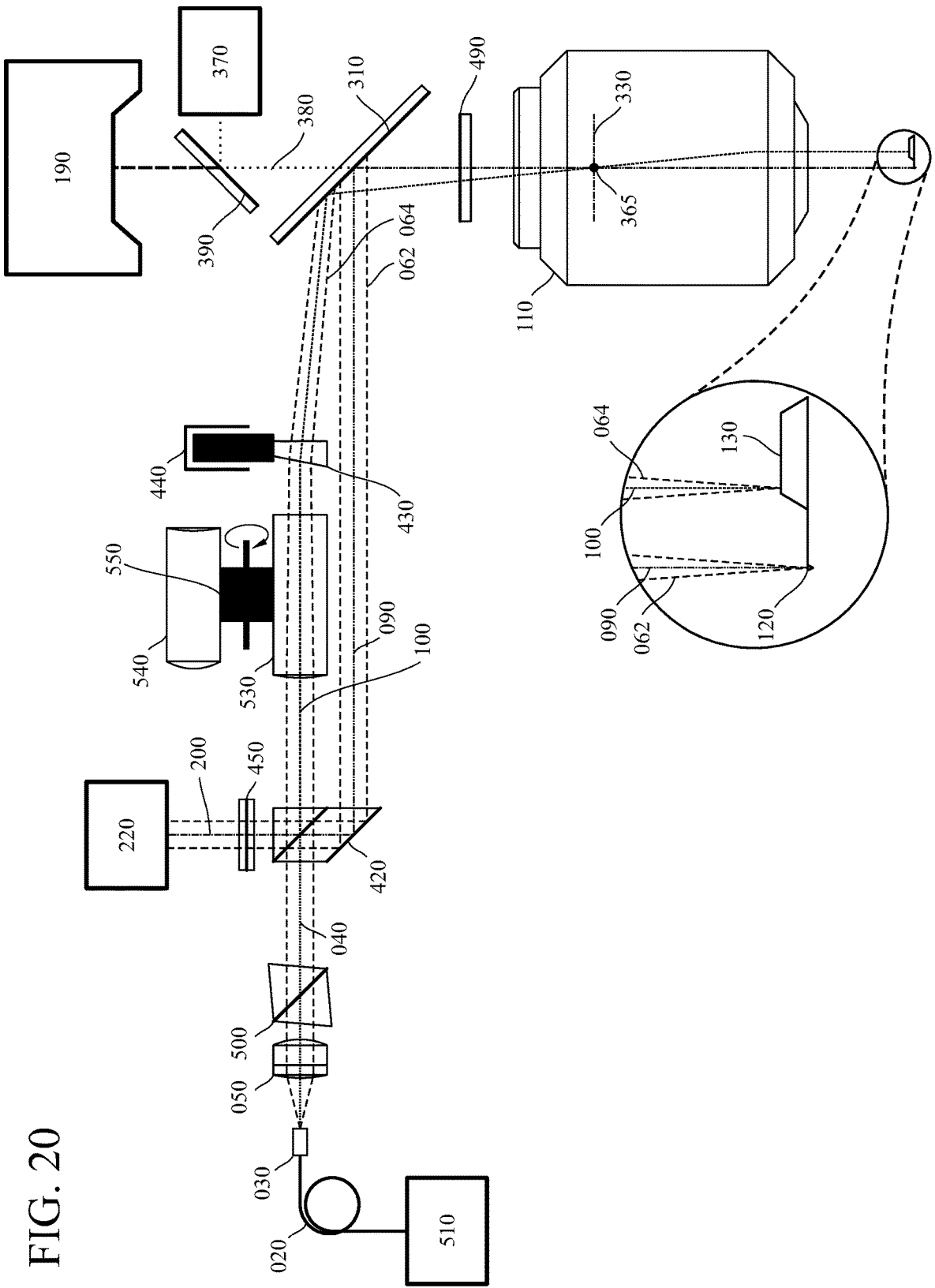
FIG. 20 combines the reference beam defocusing lens and optical group path matching window into a single solid beam defocuser.

Different cantilever types may have very different cantilever support chip thicknesses. For example, silicon chips are usually roughly 300 μm thick, while silicon nitride chips are usually roughly 500 μm thick. Switching between two such cantilevers requires two substantial changes to the optical design to achieve maximal contrast if a low-coherence light source, such as a SLD, is used: the focal length of the reference beam defocusing lens 400 must be changed and the optical group path length must be matched. Whereas the reference beam defocusing lens 400 may be changed to accommodate the different cantilever thicknesses, the change in optical group path length may exceed the range that translation of the optical path wedge 430 can compensate for. For this reason, it may be convenient to switch between different versions of the optical group path matching window 520 when switching between cantilever types. Each optical group path matching window 520 may be optimized for a different cantilever support chip thickness. The fact that two optical components may be required to be replaced after changing cantilever types complicates the optical design of this instrument. Conveniently, the embodiment in FIG. 20 combines the reference beam defocusing lens 400 and optical group path matching window 520 into a single optical component: a solid beam defocuser 530. This optical component fulfills two functions: a change in focus and a change in optical group path length that occurs when changing between cantilever types. This design allows both functions to be combined at the design level, and therefore avoid complications from occurring while operating the instrument. Note that the solid beam defocuser 530 can simply be a singlet lens where the focal length and the thickness are tuned for the specific application, or it may be any other type of optical lens. It may be necessary for the thickness of the solid beam defocuser 530 to greatly exceed its diameter, as depicted in FIG. 20.

Furthermore, a third function may be combined with the design of the solid beam defocuser 530: beam expansion or reduction as described in the context of the embodiment of FIG. 14. In this case, using a thick meniscus lens as the solid beam expander 540 allows to achieve all three functions that can be tailored for any specific application and cantilever design. Note that the solid beam expander 540 and solid beam defocuser 530 may be manufactured from a single piece of glass, or it may instead be manufactured from multiple pieces of glass that are cemented together. Depending on the selection of the thickness and radii of curvature of either interfaces of the solid beam expander 540, the beam diameter 064 of the reference light beam 100 can be tuned to be smaller or larger than the beam diameter 062 of the signal light beam 090.

[aside about beam diameters] In general, the beam diameter 062 of the signal light beam 090 changes along the path of the signal light beam, and similarly the beam diameter 064 changes along the path of the reference light beam 100. When comparing the diameters, it is useful to evaluate the diameter of each light beam at the back focal plane 330 of the microscope objective lens 110. If the diameter of a light beam, measured at the back focal plane 330, is $D_{BFP}$, then the divergence of the same beam in the vicinity of the AFM cantilever is $$\delta_{FFP} = \mathrm{asin}\left(\frac{D_{BFP}}{2f}\right)$$

where $\delta_{FFP}$ is measured as the half cone angle of the corresponding light beam in the vicinity of the cantilever, and f is the focal length of the objective lens 110. However, when determining whether the signal light beam 090 and reference light beam 100 overlap, a plane should be chosen that is substantially perpendicular to either the signal light beam or the reference light beam, and the beam centers and beam diameters should be evaluated within that plane according to methods known to those skilled in the art, e.g. by the first-order moments and second-order moments as described in ISO 11145:2018. For the purposes of this invention, the beams are considered to be separated at a plane, i.e. they do not overlap significantly, if the distance between their centers exceeds half the sum of their diameters.

A mechanical assembly 550 that allows switching between two or more solid beam expanders 540 or solid beam defocusers 530 or some combination thereof is illustrated in FIG. 20. Allowing the user to manually switch between two or more prefabricated solid beam expanders 540 or solid beam defocusers 530 makes the optical system versatile in that it can be designed to accommodate several different cantilever types that may have different chip thicknesses.

Figure 21:
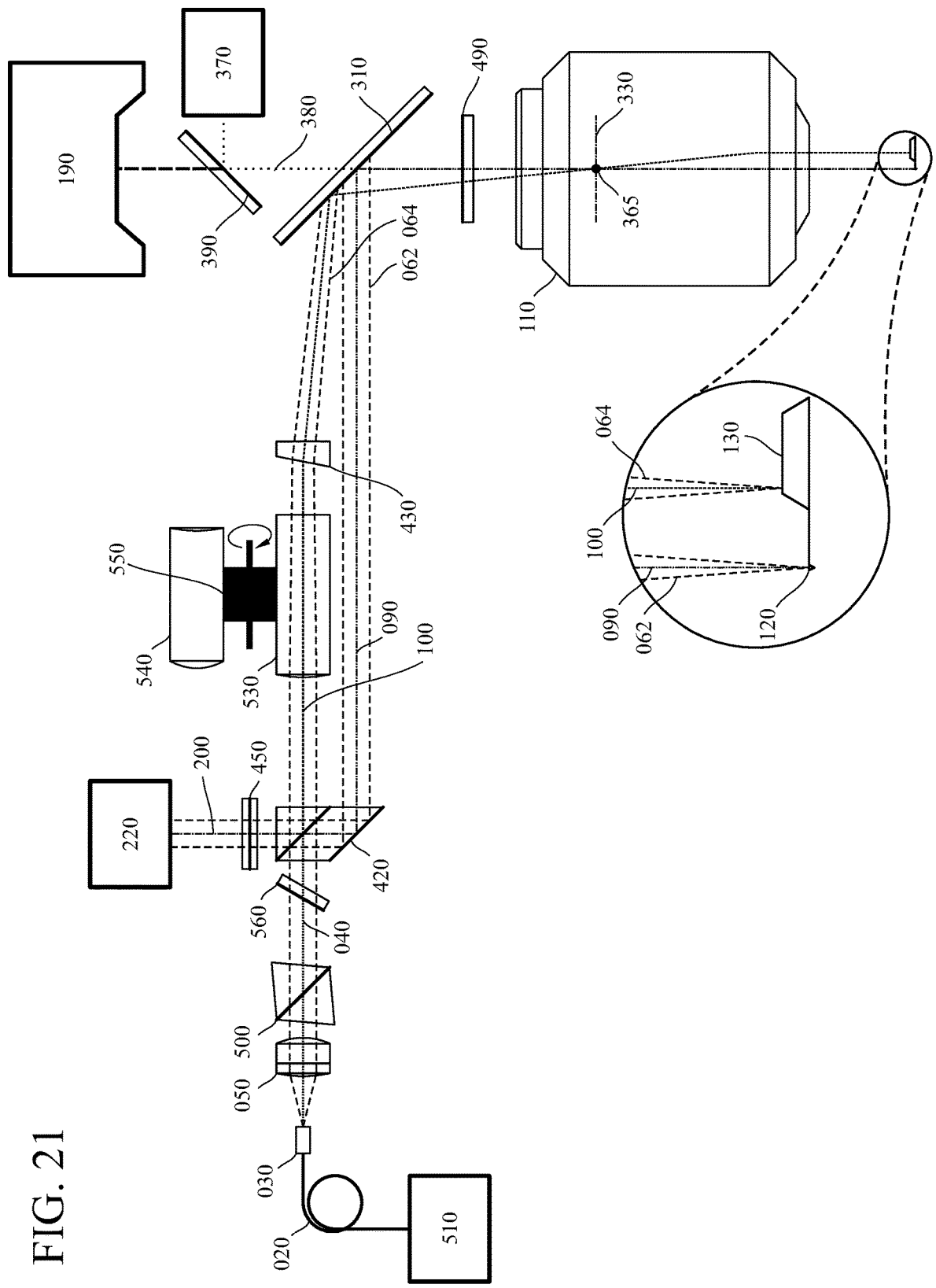
FIG. 21 shows an optical bandpass filter being used to reduce the spectral bandwidth of the superluminescent diode.

An optical bandpass filter 560 may be used to reduce the spectral bandwidth of the superluminescent diode 510, such as shown in FIG. 21. Reducing the spectral bandwidth of the superluminescent diode 510 increases its coherence length at the expense of losing some optical power. The coherence length $l_c$ is a function of the center wavelength $\lambda_0$ of the light source and the spectral bandwidth $\lambda_{BW}$, as in $$l_c = \frac{\lambda_0^2}{\lambda_{BW}}.$$

Reducing the spectral bandwidth increases the range of usable optical path difference between the paths of the signal light beam 090 and reference light beam 100 which is determined by the coherence length. With a coherence length $l_c$ that is larger than the variability in the thickness of the chip 130, the actuator 440 used to move the optical path wedge 430 to maximize the interferometric contrast may be omitted from the design, as shown in FIG. 21. This alternative embodiment simplifies manufacturing and ease of use.

During manufacturing, the optical bandpass filter 560 may be tilted in order to maximize the amount of transmitted light. This method allows the tuning of the effective center wavelength of the optical bandpass filter 560 to the center wavelength of the specific superluminescent diode 510 of the instrument. This tuning may be necessary since the SLDs from a given model typically have a large manufacturer error on the center wavelength.

Figure 22:
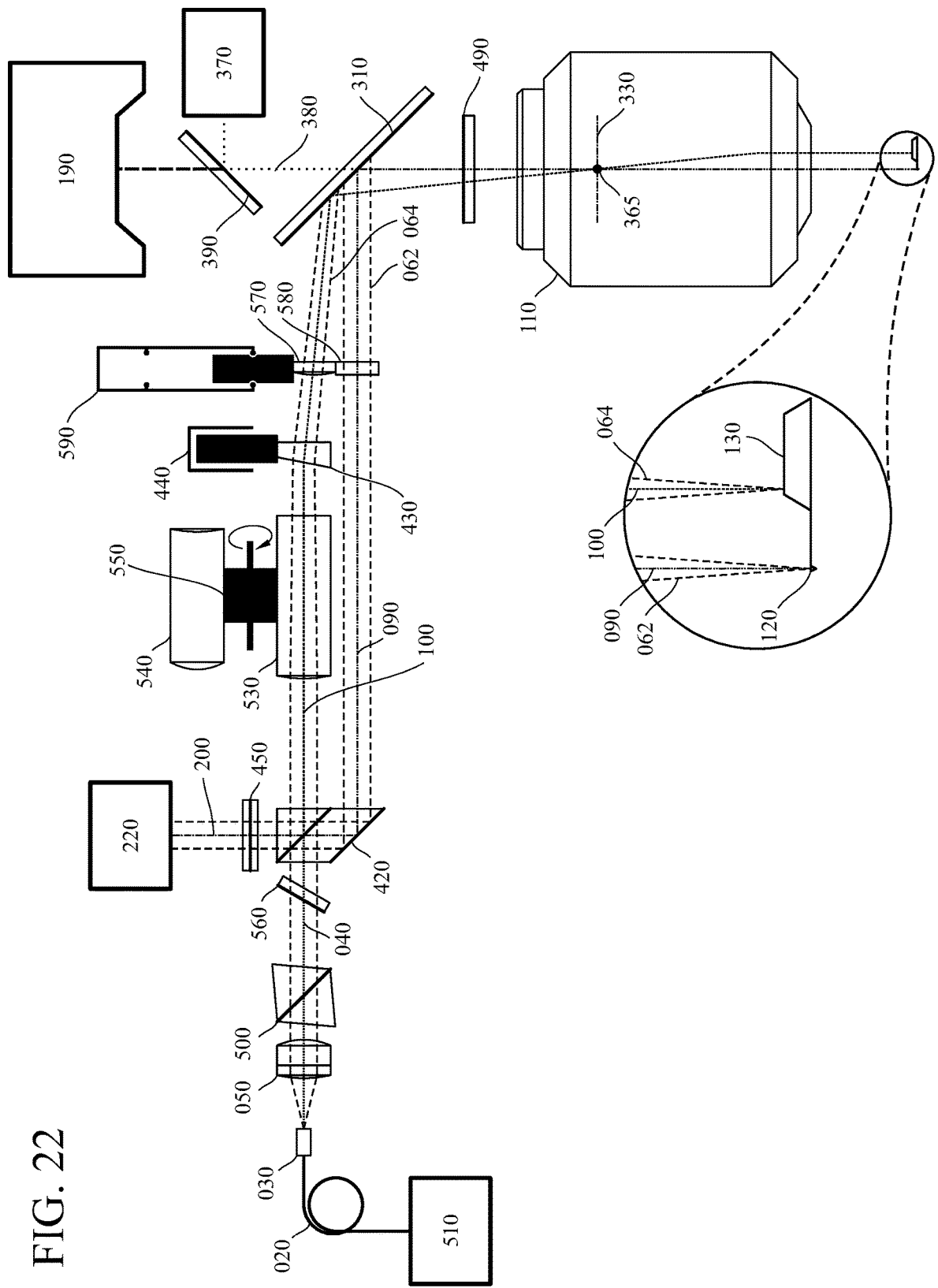
FIG. 22 shows additional optical elements used in the system that can accommodate the changes introduced by the introduction of a fluid around the cantilever.

When introducing fluids around the cantilever other than air, such as water or oil, the optical group path lengths of both the reference light beam 100 and signal light beam 090 are furthermore affected. Another set of the solid beam expander 540 (or solid beam defocuser 530) can be tailored for any combination of cantilever type and surrounding fluid. To accommodate the four permutations possible for two cantilever types and two fluids, four solid beam expanders 540 would potentially need to be manufactured. Alternatively, the embodiment in FIG. 22 proposes the introduction of additional optical elements into the system that can accommodate the changes introduced by the introduction of a fluid around the cantilever. The reference light beam 100 requires a defocusing of the light beam using a fluid defocusing lens 570; meanwhile, any optical group path length discrepancy between both arms is compensated by the introduction a fluid compensator window 580 into the signal light beam 090. Note that the fluid defocusing lens 570 is simply some optical lens with a focal length, thickness, and material, specifically chosen for the application. Also, the fluid compensator window 580 is simply an optical window, whose thickness and material are chosen to compensate for the optical group path length as required by the optical design. The thickness of both the fluid defocusing lens 570 and fluid compensator window 580 must be very carefully controlled during manufacturing to ensure that the optical group path length is matched closely enough as required by the optical system tolerance. In this design, the four permutations may be accommodated by the selection between two solid beam expanders 540, and the insertion or removal of both 570 and 580 together. The fluid compensation slider 590 in in FIG. 22 is a mechanism that allows the user to slide both 570 and 580, together, into and out of the optical system with a single actuation mechanism. The fluid compensation slider 590 may be manually actuated by the user, or by an automated mechanism that may be computer controlled.

Figure 23:
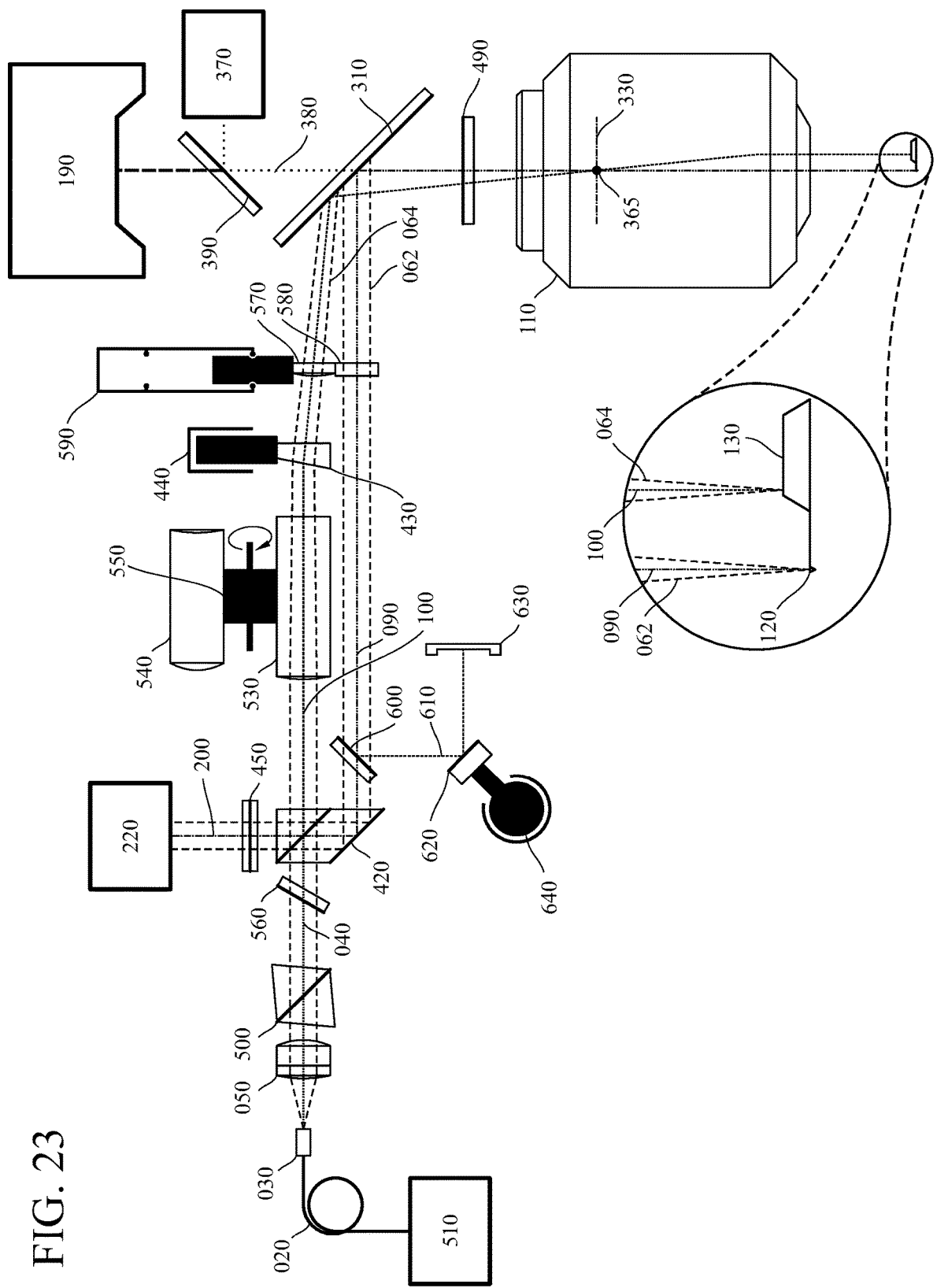
FIG. 23 shows an embodiment where the same light source is used for both the interferometer and the optical beam deflection system.

Despite all the benefits of interferometry, such as signal accuracy and low noise that is independent of cantilever length, optical beam deflection provides a measure of the cantilever angular bending in two directions (normal and lateral) which interferometry cannot measure directly. For this reason, AFM users may benefit from using an OBD in conjunction to an interferometer, such as has been made available commercially via Oxford Instruments in recent years. In that prior-art instrument, two separate light sources and optical beam positioning units 370 are used simultaneously to provide two independent measurement methods to the user, such as described in U.S. Pat. No. 10,338,096B2. On the other hand, in the present invention depicted by FIG. 23, the same light source is used for both the interferometer and the OBD system. There is a clear cost benefit, as well as design simplicity, from using a single light source to fulfill both functions. As shown in FIG. 23, an optical beam deflection beamsplitter 600 is used in the signal light beam 090 path to reflect some light returning from the cantilever for use in an OBD optical path. This optical beam deflection beamsplitter 600 can be any type of beamsplitter, such as a cube beamsplitter or a plate beamsplitter, that splits a light beam into transmitted and reflected light beams. Preferably, the optical beam deflection beamsplitter 600 may be of a polarizing nature, such that a substantial amount of light is reflected only on the returning signal light beam 090, while a minimum amount of light is lost through reflection on the incoming signal light beam 090. The reflected light beam is referred to as the optical beam deflection light beam 610. The optical beam deflection light beam 610 is then reflected off an optical beam mirror 620 that can be used to center the optical beam deflection light beam 610 onto an optical beam photodetector 630 by the use of an optical beam gimbal 640 or other rotation mechanism. Another option, not shown, is to use a translation stage attached to the optical beam photodetector 630 to center it onto the optical beam deflection light beam 610 instead. Centering the optical beam deflection light beam 610 on the optical beam photodetector 630 achieves maximum sensitivity as is known to anyone skilled in the art of the OBD method. A small portion of the optical power of the optical beam deflection light beam 610 suffices to be reflected by the optical beam deflection beamsplitter 600 in order to make measurements of the normal and lateral angular deflection of the cantilever. These two measurements are independent of the interferometric displacement measurement that occurs simultaneously, despite that all three measurements are made from a single light beam focused on the cantilever.

In FIG. 23, the reflection coming off the optical beam deflection beamsplitter 600 is shown to be in-plane to the other light beam reflections in the optical system. However, making use of a polarizing optical beam deflection beamsplitter 600 to avoid loss of light may require this beamsplitter to reflect the light out-of-plane instead of in-plane. This arrangement is not shown in FIG. 23 due to constraints imposed by two-dimensional drawings.

Figure 24:
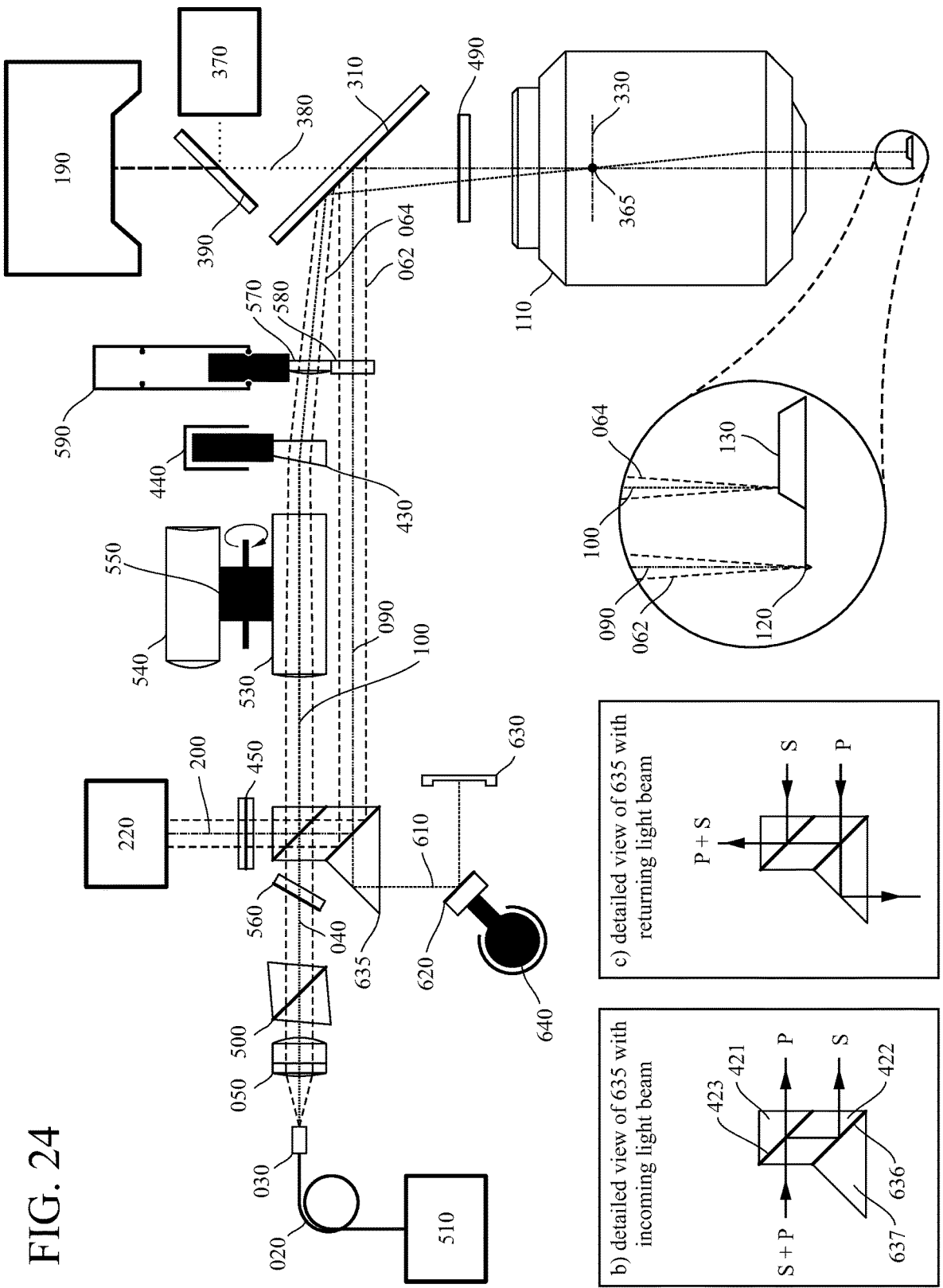
FIG. 24 shows an embodiment where the functionality of the beamsplitter is integrated with the lateral displacement beamsplitter into a single bonded assembly.

Another embodiment of the invention is illustrated in FIG. 24, where the functionality of the previously described optical beam deflection beamsplitter 600 is integrated with the lateral displacement beamsplitter 420 into a single bonded assembly of optical elements: the lateral displacement beamsplitter with pick-off 635. Whereas the lateral displacement beamsplitter 420 uses a fully-reflective optical interface 424, the lateral displacement beamsplitter with pick-off 635 uses a partially-reflective interface 636 instead shown in FIG. 24b, in order to pick off some of the light from the returning signal light beam 090 as shown in FIG. 24c, for use in an optical beam deflection measurement. The partially-reflective interface 636 replaces the functionality performed by the optical beam deflection beamsplitter 600; namely, to deviate some of the returning signal light beam 090 towards the optical beam photodetector 630. The reduction in the number of optical interfaces traversed by the signal light beam 090 used for the interferometric measurement improves the interferometric contrast. Note that introduction of an additional triangular prism 637 (shown in FIG. 24b) in the lateral displacement beamsplitter with pick-off 635 with respect to the lateral displacement beamsplitter 420 is optional. The additional prism may be beneficial for redirecting light towards the photodetector as shown in FIG. 24, and may be beneficial for protecting the partially-reflective interface 636. The partially-reflective interface 636 can be a coating with no specific polarization characteristics. However, in the preferred embodiment, a polarization coating is used that reflects all the light on the incoming signal light beam 090 to avoid loss of light, while it transmits a prescribed portion of the light on the returning signal light beam 090 as shown in FIG. 24c. The transmitted signal light beam 090 portion referred to as the optical beam deflection light beam 610, is redirected out of the lateral displacement beamsplitter with pick-off 635 through an internal reflection, and reflected off an optical beam mirror 620 towards an optical beam photodetector 630, as in the previous embodiment.

Figure 25:
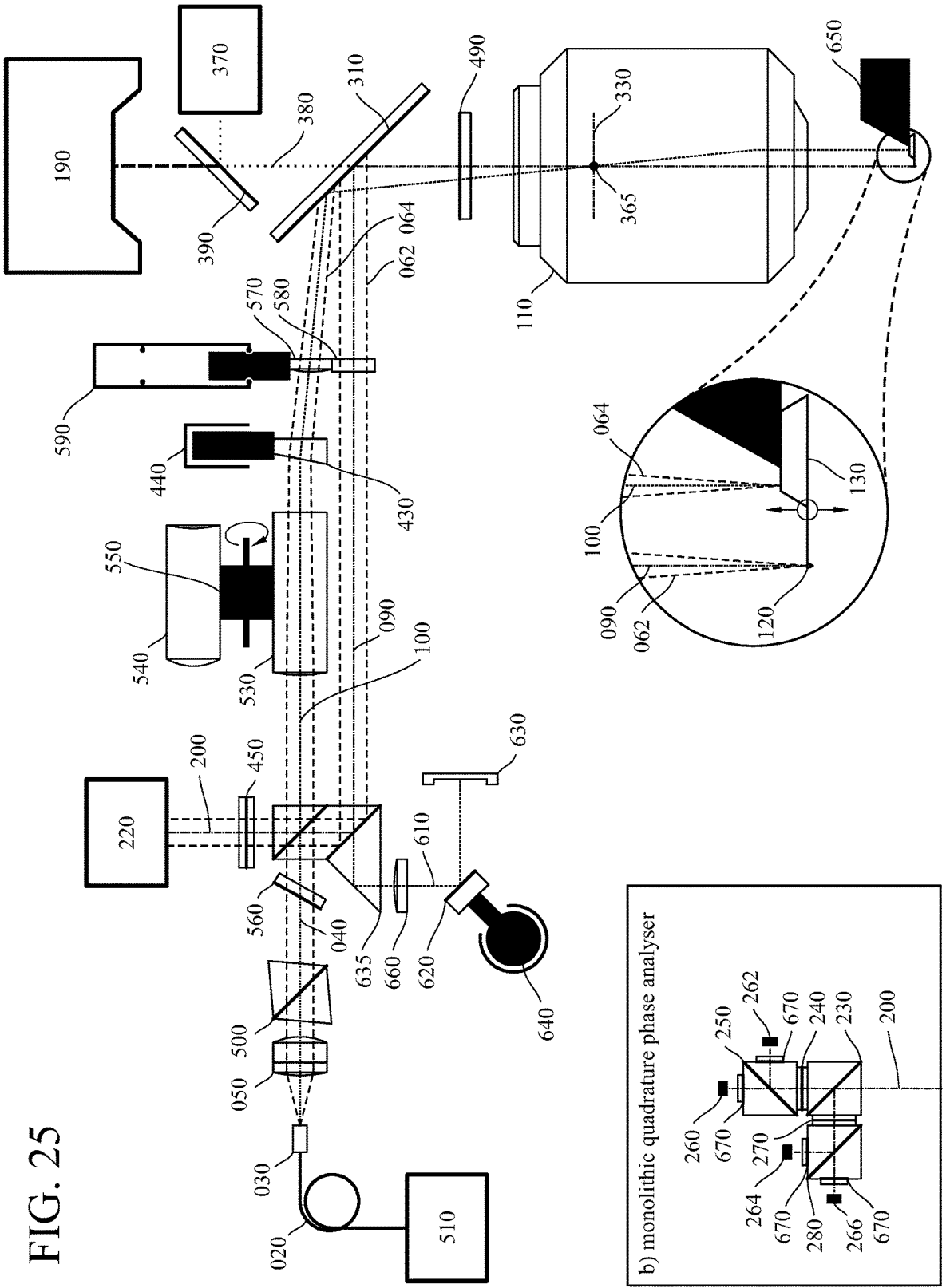
FIG. 25 shows an embodiment where the cantilever is attached to a mechanical actuator.

FIG. 25 shows an embodiment of the invention where the cantilever is attached to a mechanical actuator 650, such as an assembly with a piezoelectric transducer. This allows the cantilever to be moved parallel to the optical axis of the microscope objective 110, or at some angle relative to the optical axis. This mechanical actuator 650 may be used to track the topography of the sample during AFM imaging, for example. Because of the differential nature of the interferometer, the cantilever displacement signal continues to report the displacement difference between the cantilever end and the cantilever support chip. This is the signal of interest to the AFM user, as it is proportional to the force being exerted on the cantilever tip. The usable range of motion for the mechanical actuator 650 is on the order of the depth of field of the focused signal light beam 090 and reference light beam 100. The depth of field is sometimes referred to as the Rayleigh range of the focused light beam. Exceeding this range of motion results in loss of interferometric contrast which leads to higher noise. The depth of field of signal light beam 090 and reference light beam 100 can be tuned, in ways of the present invention described earlier, to match the required range of motion of the mechanical actuator 650.

The mechanical actuator 650 that moves the cantilever along the optical axis near the focal plane of the microscope objective 110 may introduce an artifact in the signal measured by the photodetector caused by crosstalk between the said motion of the cantilever and any cantilever displacement with respect to its chip. The back-focal-plane imaging lens 660, as shown in FIG. 25, can be introduced, and its focal length and location selected, to cast the back focal plane 330 of the microscope objective 110 onto the optical beam photodetector 630 in order to reduce this crosstalk. The back-focal-plane imaging lens 660 ensures that the photodetector measures substantially only the cantilever deflection signal while minimizing effects of motion of the mechanical actuator 650 on the measured signal. Furthermore, the back-focal-plane imaging lens 660 may reduce the range required by the optical beam gimbal 640 to center the optical beam deflection light beam 610 onto the optical beam photodetector 630.

While the use of a superluminescent diode relative to a laser reduces the effects of stray reflections and maintains an accurate measure of cantilever displacement, stray reflections may nevertheless reduce accuracy and increase noise. For this reason, cementing optical components together may be optimal for reducing the number of air-glass interfaces that may lead to back-reflections. The quadrature phase analyzer 220 depicted in FIG. 25*b* is manufactured with cemented optical components: two polarizing beamsplitters, a nonpolarizing beamsplitter, a half-wave plate, and a quarter-wave plate. The cemented design prevents fine tuning of the optical characteristics of the system by rotating and/or tilting the optical elements individually during assembly and testing the AFM. For this reason, ensuring optical interferometric contrast requires careful manufacturing of the waveplates and stringent specification of the phase shifts in the coatings used in the quadrature phase analyzer 220. The benefits of assembling a cemented quadrature phase analyzer include not only reduction of optical interfaces, but also robustness of the optical characteristics of the quadrature phase analyzer by making the optical system less prone to thermal drift, mechanical shock or other forms of disruption. Lastly, the compactness of the cemented design benefits the manufacturability of the instrument. This configuration of quadrature phase analyzer 220 may favorably be employed in any of the arrangements of the present invention.

In one possible embodiment of the quadrature phase analyzer 220, the quarter-wave plate 270 and half-wave plate 240 are manufactured as true-zero-order wave plates. A true-zero-order waveplate is a waveplate that has a phase difference between the ordinary ray and the extraordinary ray that is less than one wavelength, without using cancellation from multiple pieces of birefringent material. Manufacturing true-zero-order wave plates requires grinding and polishing a birefringent material, such as quartz, down to tens of micrometers in thickness with high accuracy. The added cost of this manufacturing step is compensated by the increase in performance of the quadrature phase analyzer 220 and the reduced sensitivity of its performance to angular errors in the input light beam, as well as reduced sensitivity to differences between design wavelength (of the wave plates) and the center wavelength of the light source. The reduction in sensitivity to light beam wavelength is especially important for low-coherence light sources, where broad spectrum of the light source implies that a single-wavelength wave plate can only approximate the desired behavior of the wave plate. Because true-zero-order wave plates are less wavelength dependent, they have higher quality performance across the full spectral bandwidth of the low-coherence light source. For similar reasons of performance, it is favorable for quarter-wave-plate 490, or other quarter-wave plates in the signal light beam and reference light beam, to be of the true-zero-order type.

Additionally, the back-reflections from the photodetectors may be significant and difficult to reduce using anti-reflection coatings. To avoid these back-reflections from entering the optical system, four quarter-wave plates 670 may be placed between the polarizing beamsplitters 280 and 250 and each of the four photodetectors 260, 262, 264 and 266, as shown in FIG. 25*b*. The quarter-wave plates' ordinary and extraordinary axes should be rotated about the optical axis by 45° relative to the beamsplitter axes. In this arrangement, the light reflected off the photodetectors will exit the unused facets of the quadrature phase analyzer rather than interfere with the recombined light beam 200 in the quadrature phase analyzer.

Any drift between the optical path lengths of the reference light beam 100 and the signal light beam 090 can be misinterpreted as a cantilever displacement during an experiment. This drift may be caused by the thermal dependence of the index of refraction of glasses used in the optical system, as well as thermal expansion of materials that hold the lenses relative to each other. A temperature control system may be used to stabilize the temperature of the metal stage that connects all the lenses, thereby keeping the optical system at a constant temperature even as the room temperature fluctuates with time. Such a system may incorporate one or more temperature sensors; one or more elements that can change the temperature, such as a resistive heater or a Peltier thermoelectric cooler; an optional device to control airflow, such as a fan; and a controller that can actuate the temperature-change elements in response to signals from the temperature sensors, such as a proportional-integral-differential controller. Such temperature control systems are well known to those skilled in the art.

So far, the cantilever has been positioned perpendicular to the optical axis of the microscope objective 110. This is a specific scenario that may not be optimal for certain situations. In a preferred embodiment, the light beams enter the back focal plane 330 off center such that they exit the microscope objective 110 with an angle relative to its optical axis, while being focused perpendicularly to the cantilever and chip that are positioned at some non-perpendicular angle with respect to the optical axis of the objective. Such an arrangement is described in detail in U.S. Pat. No. 8,370, 960B2, where the AFM uses an angle of roughly 11° and the light enters the objective off-axis to accommodate this angle. All the embodiments presented in this patent can be modified to achieve such geometry. By fulfilling the condition necessary to accommodate deliberately tilted cantilevers, all the conclusions drawn so far remain valid. For example, any tilt of the cantilever that deviates from the prescribed 0° design angle in the current embodiment can be considered to have similar effects as any tilt deviation from a prescribed 11° cantilever in an embodiment that is optimized for 11°.

In summary, it is desirable in the design of an atomic force microscope to achieve high accuracy, low noise, low drift, good optical access, and equally good position noise performance independent of the user's selection of type of AFM cantilever. For these and other reasons it is advantageous to construct a differential interferometer and configure it such that a lens, herein termed the "objective lens", focuses the signal and reference light beams on or near the AFM cantilever. The objective lens may be a microscope objective lens, a doublet lens, an imaging lens, or other types of lenses known to those skilled in the art. The typical width of an AFM cantilever is between 3 μm and 50 μm; the width of the cantilever sets the maximum size of the signal light spot, which in turn sets the minimum divergence of the signal light beam in the space between the cantilever and the lens. Furthermore, the typical length of an AFM cantilever is between 10 μm and 500 μm, and the diameter of the field of view of a typical microscope objective lens is less than 4 mm. These factors limit the maximum separation of the signal light beam and reference light beam in the space between the AFM cantilever and the objective lens. These factors conspire to cause overlap between the signal light beam and the reference light beam in the far field, making it difficult to manipulate those beams independently to achieve design goals.

The first key element of the present invention is a differential interferometer for use in an atomic force microscope, in which the signal light beam 090 and reference light beam 100 are, by means of a lens 110 (the "objective lens"), focused in the vicinity of an AFM cantilever 120; and, for some portion of the optical space separated from the AFM cantilever 120 by the objective lens (that optical space herein termed "infinity space") the signal light beam and reference light beam do not substantially overlap, allowing the beams to be manipulated independently within that region of infinity space. That is to say, in at least one plane within that region of infinity space, the intersection of the axis of the signal light beam with that plane is separated from the intersection of the axis of the reference light beam with that plane by more than half the sum of their beam diameters. This will be termed a separated-beam differential interferometer, and from this basic innovation derive several refinements and improvements to be discussed below.

In a separated-beam differential interferometer, the signal light beam 090 will typically be focused at or near the end of the AFM cantilever 120, close to the location on the cantilever which interacts with the sample. The reference light beam 100 may be focused at the base of the cantilever 120, on the cantilever support chip 130, or on a reflective object that is rigidly connected to the cantilever support chip. The separated-beam geometry provides the design freedom to manipulate the transverse position, the divergence, and the axial position of the focus of the reference light spot without interposing undesirable optical elements between the objective lens 110 and the AFM cantilever 120.

In an atomic force microscope, it is advantageous to obtain high-resolution, high-contrast optical images of the sample and cantilever, so as to select a region of interest to probe with the AFM cantilever. It is also advantageous for some applications to introduce additional, separate optical paths (e.g. path 380 and optical beam positioning unit 370) for purposes such as illumination of the cantilever 120 with a laser for photothermal actuation of the cantilever bending; illumination of the sample to measure a photovoltaic response of the sample; and/or detection of light emitted from the sample. To that end, it is advantageous to use the separated-beam differential interferometer in one or more of the following combinations: with a microscope objective lens having a numerical aperture greater than 0.25; with a microscope objective lens offering adjustable correction of spherical aberration; with a microscope objective lens having chromatic correction at the level of semi-apochromatic correction or better; with a microscope objective lens, tube lens, and camera system 190 offering a resolution better than 2 μm at the sample plane; with a microscope objective lens, tube lens, and camera system 190 offering a modulation transfer function of 50% or better at 250 line pairs per millimeter at the sample plane; with a microscope objective lens, tube lens, and camera system 190 having a resolution within a factor of two of the diffraction limit for the numerical aperture of the objective lens at the operating wavelength; coupled with one or more optical paths that provide illumination spots that are fixed or movable relative to the cantilever and sample; coupled with an optical path that provides a movable, temporally modulated illumination spot configured for photothermal excitation of a cantilever; coupled with one or more optical paths that are configured for detection of light from the sample or cantilever.

In a differential interferometer, it is necessary to deviate the signal light beam 090 from the reference light beam 100 and then recombine them after reflection from the target object and reference object. In many implementations of the present invention, it is advantageous to split and recombine the signal light beam and the reference light beam using polarization-selective dielectric coatings that are lower cost, more readily available, are easier to configure in a design, and offer larger clear apertures and better transmitted wavefront specifications than the birefringent optics that were used in the prior art to split and recombine these beams. This use of dielectric coatings is only possible because of the separation of beams in infinity space in the separated-beam differential interferometer.

One implementation of the separated-beam differential interferometer with polarization-selective dielectric coatings incorporates a first cube beamsplitter that splits the reference light beam from the signal light beam, and a second cube beamsplitter that redirects the signal light beam such that it is substantially parallel to the reference light beam. Another implementation replaces the second cube beamsplitter with a 45°-45°-90° prism arranged such that its internal reflection redirects the signal light beam parallel to the reference light beam. Another implementation replaces the second cube beamsplitter with a mirror or other reflective optic to accomplish this redirection. Another implementation combines the function of the first cube beamsplitter and the second optic into a monolithic composite prism, termed here the "lateral displacement beamsplitter" 420, where multiple prism elements with suitable coatings are bonded together into an assembly that splits the reference light beam from the signal light beam and directs those two beams substantially parallel to each other. In any of these implementations, a person skilled in the art of optical design may choose to split the reference light beam from the signal light beam and then redirect the signal light beam, or they may instead choose to split the signal light beam from the reference light beam and then redirect the reference light beam, provided that the other optical elements in the system are arranged such that the signal light beam and reference light beam focus correctly to the target object and reference object respectively. The freedom to select and arrange these components to accomplish design goals for the optical system is improved by the separation of the beams in the novel separated-beam differential interferometer.

A separated-beam differential interferometer with a lateral displacement beamsplitter 420 permits further improvements to the design. First, it is desirable to route as much as possible of the returning signal light beam 090 and reference light beam 100 to the photodetectors. This provides the best noise performance of the photodetectors and also the best stability of the optical source. When a lateral displacement beamsplitter, or equivalent optical arrangement as discussed above, is used with the separated beam differential interferometer, substantially all of the returning light can be routed to the photodetectors by interposing one or more waveplates between the objective lens and the lateral displacement beamsplitter. A single quarter-wave plate 490 with its extraordinary axis rotated at 45° may be placed such that both the signal light beam and the reference light beam pass through it. Alternatively, a first quarter-wave plate may be placed in the signal light beam and a second quarter-wave plate may be placed in the reference light beam. Other combinations of optics, such as dielectric coatings, may be used to produce a similar effect to the quarter-wave plates.

Another improvement is that the lateral displacement beamsplitter may be actuated to introduce relative phase shifts between the signal light beam and the reference light beam. This is desirable because it allows the user to calibrate the response of the photodetectors to phase shifts, producing a more accurate interpretation of phase shifts between the signal light beam and the reference light beam. This allows for a more accurate measurement of the distance between the target object and reference object.

In order to produce the desired transverse separation between the reference light beam and the signal light beam in the vicinity of the AFM cantilever, the optical system must be arranged to produce a corresponding angle difference between the reference light beam 100 and the signal light beam 090 in infinity space. In the prior art this is accomplished using birefringent optics, such as 320, to deviate the beams relative to each other. In the present invention, because of the separation between the signal light beam and reference light beam in the separated-beam differential interferometer, the angle difference may instead be generated by introducing an optical wedge prism 430 into the reference light beam and not the signal light beam. By selecting the angle and refractive index of the optical wedge prism, the reference light beam may be deviated by the desired angle relative to the signal light beam. Alternatively, an optical wedge prism may be introduced only into the signal light beam and not the reference light beam, or wedges of different angles and/or refractive indices may be introduced into both signal and reference light beams, so long as the combined effect of these elements is to produce the desired angle difference between the signal and reference light beams in infinity space and to direct the reference and signal light beams correctly to the reference object and target object respectively. An optical wedge prism is less expensive and more readily available for this purpose than a birefringent optic, and the advantages of using an optical wedge prism for this application can only be realized because of the separated beams in the present invention.

Employing an optical wedge prism to produce the desired angle difference in a separated-beam differential interferometer offers additional advantages in the present invention. It may be desirable to configure the design such that the reference light beam and signal light beam are substantially parallel in the vicinity of the cantilever; for example, to maximize the collection of the reflected light, or to minimize the misalignment caused by axial movement of the cantilever or objective lens. Achieving parallel beams in the vicinity of the cantilever requires that the optical system be arranged to cause the signal light beam and the reference light beam to intersect in the back focal plane 330 of the objective lens 110. This intersection must be achieved while maintaining the angular deviation criterion discussed above. In a design employing an optical wedge prism, this can be accomplished by choosing the location of the wedge in combination with the magnitude of lateral displacement between the signal light beam and reference light beam. Alternatively, a plurality of optical wedge prisms, such as 515 and 430, may be disposed in such a way as to yield both the correct angle difference and also the intersection in the back focal plane.

A further advantage is conferred by using one or more optical wedge prisms in a separated-beam differential interferometer of the present invention. Because of the separation of the beams, an optical wedge prism may be present in only the reference light beam (or, alternatively, only in the signal light beam). Such an optical wedge prism may be translated in such a way that it alters the optical group path length in only one of the beams, and does so without creating substantial misalignment of the beam angles or locations. This translation creates an adjustable relative phase shift between the signal light beam and the reference light beam. This capability for adjustment is highly desirable. One application for this is to calibrate the photodetector response to known phase differences between the signal and reference light beams. This allows for more accurate measurements of the height difference between the target object and reference object. A second application is to adjust the initial value of the phase difference between the signal light beam and the reference light beam to any desired value. If the optical wedge prism has a small wedge angle, this adjustment can be made very precise, such as within a small fraction of a wavelength, using ordinary optomechanical components. The translation of the optical wedge prism may be accomplished with an actuator 440, such as a motorized leadscrew translation stage, a piezoelectric actuator, a combination of a leadscrew stage and a piezoelectric actuator, or other translation means known to those skilled in the art.

In the present invention, the separation of the signal light beam from the reference light beam in the separated-beam differential interferometer provides further advantages by enabling the introduction of optical lenses, such as 400 or 460 and 470, in one or both beams. This allows for the desirable control of several characteristics of the light beams. For example, one configuration of the separated-beam differential interferometer directs the signal light beam to the end of the AFM cantilever (target object) and the reference light beam to the cantilever support chip (reference object). In order to preserve the highest contrast, the axial position of the focus of the signal light beam must be on or near the surface of the target object, and the axial position of the focus of the reference light beam must be on or near the surface of the reference object. However, these surfaces are in different axial positions. The optical system must be configured to produce this difference of focus, and it is favorable to do so without introducing optical components between the objective lens and the cantilever. In the separated-beam differential interferometer, because of the separation of beams, one may achieve this difference of focus by introducing one or more lenses into one or both of the signal light beam and the reference light beam, all within the infinity space. For example, a simple or compound lens having net positive optical power may be introduced into the reference light beam in infinity space, shifting the focus of the reference light beam axially toward the objective lens compared with the focus of the signal light beam. Alternatively, a similar effect may be achieved by introducing a lens having net negative optical power into the signal light beam in infinity space. Alternatively, lenses may be introduced into both light beams so long as the combination of lenses produces the desired relative change in focus between the signal light beam at the target object and the reference light beam at the reference object (hereafter "spot focus difference").

In the present invention, the ability to introduce lenses independently into the signal light beam and reference light beam can be employed in specific ways to yield even more advantages for the operation of the separated-beam differential interferometer. A desirable feature for an AFM using such an interferometer is the ability to function with a variety of different cantilever types (such as both silicon cantilevers and silicon nitride cantilevers) and the ability to image samples in a variety of fluids (such as air, water, or oil). Different cantilever types have support chips with different thicknesses, and with different tolerance ranges for the cantilever support chip thickness. Different fluids have different refractive index values, and the refractive index of the fluid affects the axial focus positions of the signal light beam and reference light beam in the vicinity of the AFM cantilever. In combination, these factors mean that it is advantageous to be able to adjust, during operation, the spot focus difference. One way to achieve this adjustability is to introduce into one or both light beams, in infinity space, a combination of lenses (such as 530 and 540, or such as 580 and 570) that may be actuated to produce a variable spot focus difference. Alternately, one may construct one or more fixed lens assemblies, each of which produces a different effect on the spot focus difference, and combine those fixed lens assemblies with one or more selection means, such that the user may introduce one or more of the fixed lens assemblies into one or more of the beams in infinity space. Preferably the selection means would allow the interchange of these assemblies in such a way as to introduce each fixed lens assembly without requiring additional alignment by the user. By selecting one or more of these fixed lens assemblies for introduction into the signal light beam, the reference light beam, or both, the user can then select the desired spot focus difference to provide the best contrast for a particular combination of conditions; for example, optimizing on one day for a silicon cantilever in air and on another day for a silicon nitride cantilever in water.

Particularly in the case of interchangeable fixed lens assemblies, there will be a range of tolerances on the matching of the spot focus difference to the operating conditions. Therefore it may provide further advantage to control the depth of focus of the signal light beam, the reference light beam, or both beams, in the vicinity of the AFM cantilever. This is achieved by controlling the divergence of the signal light beam and the reference light beam in the vicinity of the AFM cantilever. This divergence can, in turn, be controlled by manipulating the diameter of the corresponding beam in infinity space. The present invention provides the advantage of manipulating these divergences freely and independently by introducing lenses independently in one or both beams. This may be done in combination with the variable spot focus difference or selectable spot focus difference designs described above, by adjusting the optical design of the variable combination of lenses or the interchangeable fixed lens assemblies such that they produce not only the desired positive or negative power but also a change of beam diameter—such change being chosen to yield the desired depth of focus for the corresponding light beam in the vicinity of the AFM cantilever.

In contrast to prior art approaches, we have found that operating an interferometer with a low-coherence source, such as a superluminescent diode 510, offers certain advantages. In the case of the invention considered here, surfaces that are substantially further from the AFM cantilever than the coherence length of the source do not contribute to the interference signal. The use of a low-coherence source thereby suppresses periodic errors and artifacts in the interferometer output that would otherwise be caused by partial reflections at other optical surfaces. Such periodic errors and artifacts will herein be called "three-wave mixing" regardless of the precise nature of the partial reflections causing them. In order to operate the present separated-beam differential interferometer with a low-coherence source, it is necessary to match the optical group path lengths of the signal light beam and reference light beam within much less than the coherence length of the source, which is typically shorter than 20 µm for a superluminescent diode. The separated beams of the present invention provide several advantages for accomplishing this matching. One or more optical wedge prisms may be actuated in one or both of the light beams in such a way as to match the optical group path lengths without causing misalignment of the light beams or their focal points on the target object and reference object. With a small wedge angle, the optical group path lengths can be matched within a small fraction of a wavelength using ordinary optomechanical positioners. Additionally, if there is a large mismatch between the optical group path lengths of the signal light beam and reference light beam, a thick optical window 520 may be fixed in one or the other beam, with the thickness and refractive index of the window selected to approximately match the optical group path lengths of the beams. In the case that there are selectable lens assemblies introduced into one or both beams, such as 540 and 530, those lens assemblies can be designed to incorporate thick windows, with the thicknesses and refractive indices selected so as to nearly match the optical group path lengths of the beams under all combinations of lens assemblies that are selectable by the user. In both of these cases, the matching from the thick windows should be close enough that the remaining optical group path length difference can be eliminated by adjustment of the optical wedge prism or prisms.

In some implementations of this invention it may be overly burdensome to match the optical group path length differences precisely as described above. In such a situation it may be desirable to have a light source with an intermediate coherence length: short enough to partially suppress three-wave mixing in comparison to a laser source, yet long enough to easily achieve sufficiently good matching between the optical group path length of the signal light beam and the reference light beam. This light source may not be readily available, as lasers have too long a coherence length and superluminescent diodes too short a coherence length. In this case it is advantageous to configure the separated-beam differential interferometer with a superluminescent diode source 510, and then interpose a bandpass filter 560 between the source and the optic that splits the signal beam and reference beam from each other. This bandpass filter is preferably selected to reduce the spectral width of the emission of the superluminescent diode source, thereby increasing its coherence length to the desired intermediate value. Due to manufacturing variability of the center wavelength of the superluminescent diode and the center wavelength of the bandpass filter, it may further be desirable to provide the bandpass filter with an optomechanical mount that incorporates an adjustable tilt. Because the center wavelength of a bandpass filter depends on its tilt angle, this variable tilt can be adjusted to maximize the spectral overlap between the emission spectrum of the superluminescent diode and the transmission spectrum of the bandpass filter, thereby maximizing the light throughput and the signal-to-noise ratio at the interferometer photodetectors. Alternatively, other means may be used to produce a beam with intermediate coherence length, such as combining a diode laser with an RF modulation source.

The separated-beam differential interferometer of the present invention measures the displacement of the AFM cantilever without regard to the angle of the cantilever. For most applications this is sufficient, but for some applications it is desirable or necessary to measure the angle of the cantilever in the normal or lateral direction. In the separated-beam differential interferometer, this can be realized by introducing an additional beamsplitting element 600 into the signal light beam. This additional beamsplitting element intercepts the light returning from the cantilever, redirecting a fraction of it (that fraction being the "angle detection beam") via centering means (e.g. 640) to a split photodiode, quadrant photodiode, or linear position-sensitive detector ("angle photodetector", 630). The centering means may be a translation stage, a tilt-stage-mounted mirror 640, or some other adjustable element that permits the centering of the light on the angle photodetector. If the separated-beam differential interferometer is provided with a lateral displacement beamsplitter 420 as described above, then the additional beamsplitting element may be incorporated in the assembly of the lateral displacement beamsplitter with pick-off 635, for example by replacing the surface that reflects the signal light beam parallel to the reference light beam with a partially reflective coating that will separate the angle detection beam from the returning signal light beam.

Additionally, if the separated-beam differential interferometer is provided with one or more waveplates that are configured to route substantially all of the return light away from the light source, then the additional beamsplitting element can be designed with a polarization-selective coating so that substantially all of the return light reaches either the interferometer photodetectors or the angle photodetector. Routing the light in this way avoids unnecessary reduction in signal-to-noise ratio on either the interferometer photodetectors 260, 262, 264, 266 or the angle photodetector 630.

For some applications of atomic force microscopy, it is advantageous to actuate the AFM cantilever perpendicular to the sample to track the sample surface during scanning. For example, the sample may be too large or heavy to actuate the sample rapidly, and therefore actuating the AFM cantilever may provide more rapid imaging of the sample. In such cases, it is advantageous to combine the separated-beam interferometer of the present invention with an AFM cantilever that is mounted on a mechanical actuator 650 that moves the cantilever support chip along an axis that is within 20° of the axis of the objective lens used to focus the signal light beam and reference light beam.

In the separated-beam differential interferometer of the present invention, and furthermore in other differential interferometers, it is desirable to calibrate the response of the photodetectors as a function of the phase difference between the signal light beam and reference light beam. It is advantageous to accomplish this by introducing an electrically controlled birefringent liquid crystal device (LCD) 450 into the optical system. There are several arrangements of the LCD that can modulate the phase difference between the signal light beam and the reference light beam. The LCD 450 may be placed in the recombined light beam, between the beamsplitter optic 420 and the quadrature phase analyzer 220, with the LCD oriented preferentially so that it imparts a substantial phase shift to only one of the signal light and the reference light. Alternatively, the LCD may be placed between the light source and the beamsplitter optic, with the LCD oriented preferentially so that it imparts a substantial phase shift to only one of the signal light and the reference light. Alternatively, only in the case of a separated-beam differential interferometer, the LCD may be placed in the signal light beam only or the reference light beam only, within the space of the separated beam paths. It may be further advantageous to electrically activate the LCD to calibrate the Lissajous before measuring the cantilever, then electrically deactivate the LCD by setting its voltage to a voltage much less than 1 V during measurement of the cantilever. This deactivation reduces noise and drift in the measurement.

The present invention incorporates a multiplicity of photodetectors (260, 262, 264, and 266) arranged in combination with an assembly incorporating one or more beamsplitters and one or more waveplates (e.g. 230, 240, 250, 270, 280); this assembly of optical elements is called here the "quadrature phase analyzer". Within the separated-beam differential interferometer, the quadrature phase analyzer 220 interferes the signal light beam with the reference light beam in at least two distinct optical paths, each path having a substantially different added phase shift between the signal light beam and reference light beam. It is advantageous to prepare these optical elements as a monolithic optical assembly wherein each optical element is bonded in direct optical contact with the optical elements adjacent to it, each element being bonded in the correct orientation and alignment. Such a monolithic assembly has lower reflections due to the index-matching at the bonded interfaces compared with reflections at glass-air interfaces in the prior art arrangement. The monolithic assembly thereby reduces unwanted signals and artifacts in the output of the interferometer. Furthermore, the monolithic assembly is more resistant than the prior art to mechanical shock and to thermally-induced mechanical drift of the location of the beamsplitters and waveplates, both of which introduce unwanted artifacts in the output of the interferometer. Implementing this monolithic assembly while maintaining desirably small component dimensions may require unconventional optical component designs, such as a square half-wave plate 240 with its extraordinary axis at an angle of 22.5° to its edges, and a square quarter-wave plate 270 with its extraordinary axis at an angle of 45° to its edges. Construction of the monolithic assembly may require tight tolerances in the specification and alignment of components, since no alignment is possible after bonding. However, once these tolerances are met, the completed monolithic assembly retains stable alignment indefinitely, providing advantages for the operation of the interferometer. The application of the novel monolithic quadrature phase analyzer is not limited to a separated-beam differential interferometer for use in atomic force microscopy. Rather, such a monolithic assembly may find application in other devices that interfere a signal light beam with a reference light beam in at least two distinct optical paths, each path having a substantially different added phase shift between the signal light beam and reference light beam, and which devices also incorporate a multiplicity of photodetectors. Such other applications may include separated-beam differential interferometers for applications other than atomic force microscopy; quadrature interferometers, whether configured differentially or not; and the measurement of quantum states in quantum computing and in quantum cryptography.

More specifically, in the present invention, a particularly useful configuration of the monolithic quadrature phase analyzer combines: a nonpolarizing cube beamsplitter 230 that receives the signal light beam and reference light beam and splits them both between two optical paths; an optional first waveplate 240 that produces a first added phase shift (optionally zero) between the light beams; a first polarizing cube beamsplitter 250 that interferes the light beams with the first added phase shift, splits the light by polarization, and directs each polarization toward a photodetector; a second waveplate 270 that produces a second added phase shift between the light beams; and a second polarizing cube beamsplitter 280 that interferes the light beams with the second added phase shift, splits the light by polarization, and directs each polarization toward a photodetector. In this arrangement the first added phase shift and second added phase shift should differ by a value substantially close to 90°, close to 270°, or close to another odd multiple of 90°. There are many configurations of waveplates that may be chosen by a person skilled in the art to accomplish this combination of added phase shifts. For example, the first waveplate may be a half-wave plate with its extraordinary axis tilted at 22.5° to the plane of the assembly, and the second waveplate may be a quarter-wave plate with its extraordinary axis tilted at 45° to the plane of the assembly. Alternatively, the first waveplate may be omitted, the second waveplate may be a quarter-wave plate with its extraordinary axis tilted at 45° to the plane of the assembly, and the entire monolithic quadrature phase analyzer arranged such that the plane of the assembly is at 45° to the polarization of the signal light beam. Within this assembly, the components are bonded monolithically to suppress unwanted reflections, reduce drift, and improve shock resistance as described above. This particular embodiment of a monolithic quadrature phase analyzer may also find application in areas beyond atomic force microscopy as detailed above.

Despite the advantages of the monolithic quadrature phase analyzer, it may still suffer from artifacts due to the reflections from the surfaces of the photodetectors. In the present invention, there is further advantage to adding a waveplate 670 between each photodetector 260, 262, 264, 266 and the corresponding face of the quadrature phase analyzer 220. This waveplate should be a quarter-wave plate with its extraordinary axis rotated 45° from the plane that is common to all the beams in the quadrature phase analyzer. Such waveplates will alter the polarization of the back-reflection from each photodetector, causing the reflected light to pass to unused faces of the quadrature phase analyzer and thereby mitigating the artifacts that would be caused by that reflected light. These wave plates may be bonded to the previously mentioned monolithic quadrature phase analyzer to further mitigate effects of reflection and reduce the loss of light reaching the photodetectors.

In the present invention, reflections from optical surfaces other than the target object and reference object may cause undesirable signals and artifacts in the output of the interferometer, or may cause light to return to the light source and cause instabilities in the light output. Dielectric polarizing cube beamsplitters, such as the clean-up polarizer 070, can be the source of reflections from their entry and exit faces. In the separated-beam differential interferometer, it is advantageous to suppress these effects of these reflections by replacing a polarizing cube beamsplitter with a polarizing rhombic beamsplitter 500 having the form of a rhombic prism ("rhombic beamsplitter"). A polarizing rhombic beamsplitter may be assembled from, for example, two 50°-50°-80° triangular prisms with at least one having a suitable beamsplitter coating on its wide face. Other angles may be chosen, so long as the polarizing rhombic beamsplitter deviates in shape from a cube sufficiently to cast the reflections outside the ordinary beam paths of the optical system, thereby preventing artifactual interferometric effects, such as three-wave mixing, and thereby also reducing the amount of light returning to the light source. Although the polarizing rhombic beamsplitter 500 replaced the clean-up polarizer 070 in the invention described herein, a non-polarizing rhombic beamsplitter with similar geometry as the polarizing rhombic beamsplitter 500 would be advantageous in replacing non-polarizing cube beamsplitters, such as beamsplitter 180, for example. More generally, a rhombic beamsplitter with any type of optical coating on its internal interface can benefit from the rhombic geometry to reduce the effects of back-reflections from its external interfaces. The optical coating on the internal interface may be polarizing, non-polarizing, dichroic (i.e. wavelength selective), or some combination thereof. Unlike a cube beamsplitter, a rhombic beamsplitter can employ simple optomechanical mounting with its base parallel to the optical axis, and while so mounted the incident angle of the optical beam on the beamsplitter coating can be maintained at its optimal value. Such a rhombic beamsplitter may be advantageous in other optical systems that are adversely affected by reflections, such as optical systems for imaging a field of view (particularly in a dark-field configuration) or for detecting scattered light.

The invention claimed is:

1. An atomic force microscope ("AFM") based interferometer, comprising: a light source, emitting a light beam;
   a splitting optical interface, splitting the light beam into a signal light beam and a reference light beam;
   an AFM cantilever;
   a focusing lens structure, which focuses both the signal and reference light beams in the vicinity of the AFM cantilever;
   a beam displacer, which introduces a lateral displacement between the signal light beam and reference light beam, the lateral displacement being such that, in at least one plane between the beam displacer and the focusing lens structure, the center of the signal light beam is separated from the center of the reference light beam by more than half a sum of their beam diameters on that plane;
   and;
   a detector that operates to determine differences in optical path length between the signal light beam and reference light beam to determine information about movement of the cantilever.

2. The interferometer as in claim 1, where the signal light beam and reference light beam refract differently at the splitting optical interface.

3. The interferometer as in claim 2, where the splitting optical interface is an interface between two materials at least one of which is birefringent.

4. The interferometer as in claim 1, where one of the signal light beam and the reference light beam reflects from the splitting optical interface, and the other light beam passes through the splitting optical interface.

5. The interferometer as in claim 4, where the splitting optical interface is a polarization-selective dielectric coating.

6. The interferometer as in claim 1, where the focusing lens structure is a single lens.

7. The interferometer as in claim 1, where the focusing lens structure is a microscope objective lens.

8. The interferometer as in claim 7, where the microscope objective lens has a numerical aperture greater than 0.25.

9. The interferometer as in claim 1, where a reference location is on the cantilever and both the reference light beam and the signal light beam are focused on the cantilever.

10. The interferometer as in claim 1, where the signal light beam is focused at a location of the AFM cantilever, close to a location on the cantilever which interacts with the sample, and the reference light beam is focused at another location, which is one of a base of the cantilever, on a cantilever support chip, or on a reflective object that is rigidly connected to the cantilever support chip.

11. The interferometer as in claim 1, further comprising additional optics, illumination optics, and an image sensor that operate to provide a user an image of a sample in the vicinity of the AFM cantilever.

12. The interferometer as in claim 11, where the image of the sample has a resolution better than 2 μm measured at the sample plane.

13. The interferometer as in claim 11, where the image of the sample has a modulation transfer function of 50% or higher at a spatial frequency of 250 line pairs per millimeter measured at the sample plane.

14. The interferometer as in claim 1, further comprising additional optics that introduce light from a second light source on the sample in the vicinity of the AFM cantilever.

15. The interferometer as in claim 1, further comprising additional optics and one or more photodetectors that detect light emitted from the sample in the vicinity of the AFM cantilever.

16. The interferometer as in claim 1, further comprising additional optics for introducing light from a second light source such that the light from the second light source focuses on the AFM cantilever;
where the light from the second light source causes a movement of the cantilever.

17. The interferometer as in claim 1, where the beam displacer creates a lateral displacement between the signal light beam and the reference light beam in an infinity space separated from the AFM cantilever by the focusing lens structure, and the lateral displacement between the signal light beam and the reference light beam exceeds half the sum of the beam diameters of the signal light beam and the reference light beam.

18. The interferometer as in claim 17 where the splitting optical interface and the beam displacer are incorporated into a bonded assembly of optical elements.

19. The interferometer as in claim 18 where the bonded assembly creates two substantially parallel light beams by reflecting at least one light beam twice or at least both light beams once.

20. The interferometer as in claim 1, further comprising one or more quarter-wave plates interposed in one or more of the signal light beam and the reference light beam.

21. The interferometer as in claim 20, where a single quarter-wave plate is incorporated in both the signal light beam and the reference light beam.

22. The interferometer as in claim 20, where a first quarter-wave plate is incorporated in the signal light beam and a second quarter-wave plate is incorporated in the reference light beam.

23. The interferometer as in claim 21, where the quarter-wave plate is a true-zero-order quarter-wave plate.

24. The interferometer as in claim 22, where both quarter-wave plates are true- zero-order quarter-wave plates.

25. The interferometer as in claim 18, further comprising an actuator, energized for moving the bonded assembly, such that the actuator changes an optical path length difference between the signal light beam and reference light beam.

26. The interferometer as in claim 18, where the bonded assembly incorporates at least one optical wedge prism.

27. The interferometer as in claim 26, where the optical wedge prism has an angle and wedge position to make the light beams intersect at a back focal plane of the focusing lens structure.

28. The interferometer as in claim 1, further comprising at least one optical wedge prism disposed in at least one of the signal light beam and the reference lightbeam.

29. The interferometer as in claim 28, further comprising an actuator which moves the optical wedge prism, thereby changing an optical path length difference between the signal light beam and reference light beam.

30. The interferometer as in claim 29, where the actuator is electrically operated.

31. The interferometer as in claim 29, where the actuator actuates the wedge by distances on the order of millionths of a meter to calibrate a response of the detector to an optical path length difference between the signal and reference light beam.

32. The interferometer as in claim 1, further comprising one or more optical lenses arranged such that, for each lens, either the signal light beam or the reference light beam passes through the lens and the other light beam does not pass through the lens.

33. The interferometer as in claim 32, where the one or more optical lenses alters any of the divergence, diameter, and axial focus position of the signal light beam, the reference light beam, or both the signal and reference light beams in the vicinity of the AFM cantilever.

34. The interferometer as in claim 33, further comprising an actuator which moves at least one of said optical lenses and thereby changes any of the divergence, diameter, and axial focus position of the signal light beam, the reference light beam, or both the signal and reference light beams in the vicinity of the AFM cantilever.

35. The interferometer as in claim 32, further comprising a mechanism for inserting and removing at least one of the one or more optical lenses into at least one of the signal light beam or the reference light beam.

36. The interferometer as in claim 1, where the light source is a low-coherence light source.

37. The interferometer as in claim 36, where the light source is a low-coherence light source, and further comprising additional matching optical elements introduced into at least one of the signal light beam and reference light beam such that the optical group path length of the signal light beam is equal to the optical group path length of the reference light beam within 200 µm.

38. The interferometer as in claim 37, where the matching optical elements comprise an optical window where the thickness, refractive index, and dispersion of the window are such that the optical group path length of the signal light beam is substantially equal to the optical group path length of the reference light beam.

39. The interferometer as in claim 37, where the low coherence light source is a superluminescent diode.

40. The interferometer as in claim 37, where the additional matching optical elements comprise an optical wedge prism that is placed in either the signal light beam path or the reference light beam path and further comprising an actuator that translates the optical wedge prism with a component of motion that is perpendicular to an axis of propagation of the light beam path in which the optical wedge prism was placed, thereby tuning an optical group path length difference between both light beam paths to within the coherence length of the low-coherence light source.

41. The interferometer as in claim 40, where the optical wedge prism has an angle and wedge position to make the light beams intersect at a back focal plane of the focusing lens structure.

42. The interferometer as in claim 37, where the additional matching optical elements comprise a first optical wedge prism and a second optical wedge prism that are placed in either the signal light beam or the reference light beam, and further comprising one or more actuators that move the wedges simultaneously so as to reduce a translation of the light beam traversing the wedges.

43. The interferometer as in claim 37, where the additional matching optical elements comprise interchangeable windows to discretely change an optical group path length difference between the signal light beam and the reference lightbeam.

44. The interferometer as in claim 37, where the additional matching optical elements comprise interchangeable lenses with specific thicknesses to change an optical group path length, and with specific optical powers and locations to change any of a divergence, diameter, and axial focus position of a light beam in the vicinity of the AFM cantilever.

45. The interferometer as in claim 37, where the additional matching optical elements comprise insertable and removable lenses, and insertable and removable windows, to tune an optical group path length difference between the light beams, and to tune any of a divergence, diameter, and axial focus position of the signal light beam, reference light beam, or both light beams in the vicinity of the AFM cantilever.

46. The interferometer as in claim 45 further comprising an exchange mechanism, where operating the exchange mechanism alters the disposition of additional matching optical elements in at least one of the signal light beam and the reference light beam, and where operating the exchange mechanism selects between two or more desirable combinations of optical group path length and any of a divergence, diameter, and axial focus position of a light beam in the vicinity of the AFM cantilever.

47. The interferometer as in claim 37, further comprising a bandpass filter to increase a coherence length of the light beam, to a value short enough to suppress periodic errors and artifacts partially in comparison to a laser source, yet long enough to exceed a difference between an optical group path length of the signal light beam and an optical group path length of the reference light beam.

48. The interferometer as in claim 47, further comprising an actuator rotating said bandpass filter to match a bandpass center wavelength to the light source center wavelength to maximize light throughput.

49. The interferometer as in claim 1, further comprising a second splitting optical interface and an optical beam photodetector, where the second splitting optical interface separates a part of a light beam and directs it toward the optical beam photodetector, and the optical beam photodetector operates so as to measure an angle of reflection of the signal light beam from the AFM cantilever.

50. The interferometer as in claim 49, where the second splitting optical interface comprises a polarization selective coating, and further comprising at least one quarter-wave plate, where the quarter-wave plate and polarization-selective coating are disposed such that the signal light beam prior to reflection from the AFM cantilever is not split by the second splitting interface, and such that the signal light beam after reflection from the AFM cantilever is split by the second splitting interface into two light beams with one light beam directed toward the optical beam photodetector.

51. The interferometer as in claim 49, where the second splitting optical interface is incorporated into a bonded assembly of optical elements where the bonded assembly of optical elements also incorporates the first splitting optical interface and beam displacer.

52. The interferometer as in claim 1, further comprising an actuator that translates the cantilever support chip along an axis such that the angle between said axis and the axis of the focusing lens structure is less than 20°.

53. The interferometer as in claim 1, the lateral displacement being such that, in at least one plane between the beam displacer and the back focal plane of the focusing lens structure, the center of the signal light beam is separated from the center of the reference light beam by more than half a sum of their beam diameters on that plane.

54. The interferometer as in claim 1, further comprising:
at least one additional optical element in between the splitting optical element and the back focal plane of the focusing lens structure that changes at least one optical property of either the signal light beam or reference light beam, but not both light beams;
where the said optical property is at least one of the divergence, axial focus position, direction, diameter, optical path length, or the polarization state of one of the light beams.

* * * * *

UNITED STATES PATENT AND TRADEMARK OFFICE
CERTIFICATE OF CORRECTION

PATENT NO. : 11,519,935 B2  
APPLICATION NO. : 16/996403  
DATED : December 6, 2022  
INVENTOR(S) : Aleks Labuda et al.

Page 1 of 1

It is certified that error appears in the above-identified patent and that said Letters Patent is hereby corrected as shown below:

On the Title Page

Item (73), Line 1, replace "Oxford Instruments Asylum Research, Inc., Goleta, CA (US)" with "Oxford Instruments Asylum Research, Inc., Goleta, CA (US), Ecole Normale Supérieure de Lyon, Lyon (FR), Université Claude Bernard Lyon 1, Lyon (FR), Centre National de la Recherche Scientifique, Paris (FR)"

Signed and Sealed this  
Twenty-first Day of February, 2023

Katherine Kelly Vidal  
*Director of the United States Patent and Trademark Office*